(12) United States Patent
Hoke et al.

(10) Patent No.: US 6,818,254 B1
(45) Date of Patent: *Nov. 16, 2004

(54) STABLE SLURRIES OF CATALYTICALLY ACTIVE MATERIALS

(75) Inventors: Jeffrey B. Hoke, North Brunswick, NJ (US); Fred M. Allen, Princeton Junction, NJ (US); Patrick W. Blosser, East Windsor, NJ (US); Zhicheng Hu, Edison, NJ (US); Ronald M. Heck, Frenchtown, NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/682,174

(22) Filed: Jul. 16, 1996

Related U.S. Application Data

(63) Continuation-in-part of application No. 08/589,182, filed on Jan. 19, 1996, now abandoned, which is a continuation-in-part of application No. 08/537,206, filed on Sep. 29, 1995, now abandoned, which is a continuation-in-part of application No. 08/410,445, filed on Mar. 24, 1995, now abandoned, which is a continuation-in-part of application No. 08/376,332, filed on Jan. 20, 1995, now abandoned.

(51) Int. Cl.[7] .............................. B01J 23/34; B05D 1/02; B05D 1/18; B05D 1/28
(52) U.S. Cl. .................. 427/421; 427/429; 427/435; 427/443.2; 502/2; 502/324; 502/325; 502/339; 502/506; 502/512

(58) Field of Search .......................... 502/2, 324, 325, 502/439, 506, 512, 514; 427/421, 429, 435, 443.2

(56) References Cited

U.S. PATENT DOCUMENTS

| 1,484,782 A | 2/1924 | Heise |
| 1,628,344 A | 5/1927 | Walsh |
| 1,863,015 A | 6/1932 | Kamrath |
| 1,937,488 A | 11/1933 | Jenness ........................ 23/234 |
| 1,937,489 A | 11/1933 | Jenness ........................ 23/234 |

(List continued on next page.)

FOREIGN PATENT DOCUMENTS

| DE | 822 053 | 11/1951 |
| DE | 1067691 | 10/1959 |
| DE | 1095128 | 12/1960 |
| DE | 1101160 | 3/1961 |
| DE | 1133154 | 7/1962 |

(List continued on next page.)

OTHER PUBLICATIONS

U.S. patent application Ser. No. 08/537,208, filed Sep. 29, 1995.
SAE 931088 Calculation and Design of Cooling Systems by Eichiseder & Raab of Steyr Damler Puchag.
SAE 931089 Charge Air Cooler for Passenger Cars by thierry Collette of Valeo Thermique Moteur.
SAE 931092 State of the Art & Future Developments of Aluminum Radiators for Cars & Trucks by Josef Kern & Jochen Eitel of Behr GmbH & Co.

(List continued on next page.)

*Primary Examiner*—Wayne A. Langel
(74) *Attorney, Agent, or Firm*—Russell G. Lindenfeldar

(57) ABSTRACT

A method and apparatus for treating the atmosphere comprising moving a vehicle through the atmosphere, the vehicle having at least one atmosphere contacting surface and a pollutant treating composition located on said surface. A specific embodiment comprises coating a motor vehicle radiator with pollutant treating catalyst.

28 Claims, 17 Drawing Sheets

U.S. PATENT DOCUMENTS

| | | | |
|---|---|---|---|
| 2,213,017 A | 8/1940 | Perkins ........................ 98/2 |
| 2,455,734 A | 12/1948 | Clausen ....................... 183/53 |
| 2,473,563 A | 6/1949 | Beja et al. ................... 23/145 |
| 2,551,823 A | 5/1951 | Buttner et al. ............... 237/28 |
| 2,658,742 A | 11/1953 | Suter et al. ................... 263/3 |
| 2,701,104 A | 2/1955 | Fox ............................... 241/3 |
| 2,956,860 A | 10/1960 | Welsh .......................... 23/145 |
| 2,966,339 A | 12/1960 | Morgan ......................... 257/1 |
| 3,110,300 A | 11/1963 | Brown et al. ................ 126/109 |
| 3,147,100 A | 9/1964 | Wilber ......................... 55/419 |
| 3,242,013 A | 3/1966 | Mehne et al. ................ 136/138 |
| 3,269,801 A | 8/1966 | Boberg et al. ................ 23/238 |
| 3,356,452 A | 12/1967 | Moore ......................... 23/145 |
| 3,414,440 A | 12/1968 | Moore ......................... 136/107 |
| 3,565,203 A | 2/1971 | Ashton et al. ............... 180/68 |
| 3,596,471 A | 8/1971 | Luedahl ....................... 55/376 |
| 3,640,683 A | 2/1972 | Miyazaki et al. ............ 23/145 |
| 3,685,983 A | 8/1972 | Louzos ........................ 75/0.5 R |
| 3,738,088 A | 6/1973 | Colosimo ..................... 55/104 |
| 3,770,868 A | 11/1973 | Swinkels et al. ............. 423/50 |
| 3,823,533 A | 7/1974 | Alverson et al. ............. 55/493 |
| 3,837,149 A | 9/1974 | West et al. ................... 55/269 |
| 3,859,788 A | 1/1975 | King et al. ................... 60/280 |
| 3,864,118 A | 2/1975 | Schumacher et al. .......... 75/3 |
| 3,883,637 A | 5/1975 | Benedict ..................... 423/230 |
| 3,915,837 A | 10/1975 | Feige, Jr. .................... 204/286 |
| 3,959,021 A | 5/1976 | Nishino et al. .............. 136/138 |
| 3,993,597 A | 11/1976 | Stiles .......................... 252/454 |
| 4,006,217 A | 2/1977 | Faber et al. ................. 423/605 |
| 4,007,875 A | 2/1977 | Stolz et al. ............. 237/12.3 A |
| 4,089,928 A | 5/1978 | Foroglou ..................... 423/49 |
| 4,101,296 A | 7/1978 | Lowther ....................... 55/33 |
| 4,134,860 A | 1/1979 | Hindin et al. ............... 252/466 |
| 4,141,963 A | 2/1979 | Miller ........................ 423/592 |
| 4,160,806 A | 7/1979 | Long et al. ................. 422/223 |
| 4,171,211 A | 10/1979 | Carter ......................... 55/493 |
| 4,173,549 A | 11/1979 | Kent et al. ................... 252/463 |
| 4,184,983 A | 1/1980 | Putz et al. ............. 252/466 PT |
| 4,195,606 A | 4/1980 | Wallis, Jr. et al. .......... 123/119 |
| 4,197,366 A | 4/1980 | Tamura et al. ............... 429/197 |
| 4,200,609 A | 4/1980 | Byrd ........................... 422/122 |
| 4,206,083 A | 6/1980 | Chang ..................... 252/455 R |
| 4,207,291 A | 6/1980 | Byrd et al. ................... 422/122 |
| 4,214,867 A | 7/1980 | Hunter et al. ................ 432/29 |
| 4,234,326 A | 11/1980 | Bailey et al. ................ 55/278 |
| 4,246,253 A | 1/1981 | Hunter ........................ 423/605 |
| 4,261,863 A | 4/1981 | Kent et al. ................... 252/463 |
| 4,277,360 A | 7/1981 | Mellors et al. ........... 252/182.1 |
| 4,284,618 A | 8/1981 | van der Heyden et al. . 423/605 |
| 4,285,913 A | 8/1981 | Soni et al. ................... 423/50 |
| 4,302,490 A | 11/1981 | Byrd ........................... 427/301 |
| 4,310,494 A | 1/1982 | Welsh ......................... 423/49 |
| 4,343,776 A | 8/1982 | Carr et al. ................... 423/210 |
| 4,348,360 A | 9/1982 | Chang et al. ................ 422/122 |
| 4,352,321 A | 10/1982 | Fukui et al. .................. 98/2.11 |
| 4,363,787 A | 12/1982 | Yoon ........................... 422/201 |
| 4,379,129 A | 4/1983 | Abe ............................. 423/210 |
| 4,379,817 A | 4/1983 | Kozawa ....................... 429/224 |
| 4,399,185 A | 8/1983 | Petrow ........................ 428/253 |
| 4,402,931 A | 9/1983 | Tanabe et al. ............... 423/605 |
| 4,405,507 A | 9/1983 | Carr et al. ................... 252/466 |
| 4,405,699 A | 9/1983 | Kruger ........................ 429/224 |
| 4,425,145 A | 1/1984 | Reese ..................... 55/385 B |
| 4,476,104 A | 10/1984 | Mellors ....................... 423/605 |
| 4,477,541 A | 10/1984 | Fraioli ........................ 429/33 |
| 4,483,828 A | 11/1984 | Laughlin et al. ............. 423/49 |
| 4,485,073 A | 11/1984 | Robertson et al. ........... 423/49 |
| 4,489,043 A | 12/1984 | Bowerman et al. .......... 423/49 |
| 4,537,839 A | 8/1985 | Cameron ..................... 429/20 |
| 4,551,254 A | 11/1985 | Imada et al. ................. 210/688 |
| 4,579,723 A | 4/1986 | Weltmer et al. ............. 423/219 |
| 4,581,219 A | 4/1986 | Imada et al. ................. 423/605 |
| 4,585,718 A | 4/1986 | Uedaira et al. .............. 429/224 |
| 4,590,059 A | 5/1986 | Mellors ....................... 423/605 |
| 4,595,643 A | 6/1986 | Koshiba et al. .............. 429/27 |
| 4,604,336 A | 8/1986 | Nardi .......................... 429/224 |
| 4,619,821 A | 10/1986 | Ely ............................. 423/579 |
| 4,657,887 A | 4/1987 | Hardman et al. ............ 502/303 |
| 4,662,065 A | 5/1987 | Marincic et al. ............ 29/623.1 |
| 4,665,973 A | 5/1987 | Limberg et al. ............. 165/133 |
| 4,666,677 A | 5/1987 | Ramus et al. ................ 422/183 |
| 4,670,474 A | 6/1987 | Hinnenkamp et al. ....... 518/713 |
| 4,684,381 A | 8/1987 | Wasylyniuk ................. 55/316 |
| 4,714,694 A | 12/1987 | Wan et al. ................... 502/304 |
| 4,733,605 A | 3/1988 | Hölter et al. ................ 98/2.11 |
| 4,734,113 A | 3/1988 | Takagi et al. ................ 55/504 |
| 4,738,947 A | 4/1988 | Wan et al. ................... 502/304 |
| 4,742,038 A | 5/1988 | Matsumoto .................. 502/303 |
| 4,818,354 A | 4/1989 | Preisler et al. ............... 204/96 |
| 4,824,363 A | 4/1989 | Abthoff et al. .............. 432/222 |
| 4,838,910 A | 6/1989 | Stollenwerk et al. ....... 55/385.2 |
| 4,871,709 A | 10/1989 | Tatsushima et al. ......... 502/324 |
| 4,909,815 A | 3/1990 | Meyer ......................... 55/316 |
| 4,921,689 A | 5/1990 | Walker et al. ............... 423/605 |
| 4,961,762 A | 10/1990 | Howeth ....................... 55/302 |
| 4,975,346 A | 12/1990 | Lecerf et al. ................ 429/197 |
| 5,004,487 A | 4/1991 | Kowalczyk .................. 55/269 |
| 5,010,051 A | 4/1991 | Rudy ........................... 502/304 |
| 5,057,483 A | 10/1991 | Wan ............................ 502/304 |
| 5,080,882 A | 1/1992 | Yoshimoto et al. .......... 423/579 |
| 5,082,570 A | 1/1992 | Higgins et al. .............. 210/683 |
| 5,085,266 A | 2/1992 | Arold et al. ................. 165/1 |
| 5,092,396 A | 3/1992 | Murano et al. .............. 165/119 |
| 5,113,836 A | 5/1992 | Sweeten ...................... 123/573 |
| 5,130,109 A | 7/1992 | Wan ............................ 423/213 |
| 5,135,780 A * | 8/1992 | Kissel ......................... 427/404 |
| 5,139,992 A | 8/1992 | Tauster et al. ............... 502/304 |
| 5,142,864 A | 9/1992 | Dunne ......................... 60/274 |
| 5,145,657 A | 9/1992 | Kobayashi et al. .......... 423/219 |
| 5,145,822 A | 9/1992 | Falke et al. .................. 502/150 |
| 5,145,825 A | 9/1992 | Deeba et al. ................. 502/242 |
| 5,147,429 A | 9/1992 | Bartholomew et al. ....... 55/356 |
| 5,160,586 A | 11/1992 | Yoshimoto et al. ........ 204/59 R |
| 5,162,274 A | 11/1992 | Deitz .......................... 502/51 |
| 5,176,833 A | 1/1993 | Vaughn et al. ............... 210/638 |
| 5,180,502 A | 1/1993 | Nishiki et al. ............... 210/748 |
| 5,187,137 A | 2/1993 | Terui et al. .................. 502/241 |
| 5,194,233 A | 3/1993 | Kitahara et al. ............. 423/210 |
| 5,212,140 A | 5/1993 | Yoshimoto et al. .......... 502/300 |
| 5,214,014 A | 5/1993 | Yoshimoto et al. ........... 502/84 |
| 5,221,649 A | 6/1993 | Yoshimoto et al. ........... 502/84 |
| 5,221,652 A | 6/1993 | Tierney et al. ............... 502/170 |
| 5,227,144 A | 7/1993 | Perez de la Garza ....... 423/210 |
| 5,232,882 A | 8/1993 | Yoshimoto et al. ........... 502/5 |
| 5,232,886 A | 8/1993 | Yoshimoto et al. ........... 502/84 |
| 5,250,487 A | 10/1993 | Wirtz et al. .................. 502/243 |
| 5,252,299 A | 10/1993 | Retallick ..................... 422/174 |
| 5,262,129 A | 11/1993 | Terada et al. ................ 422/122 |
| 5,277,890 A | 1/1994 | Wang et al. ................. 423/605 |
| 5,283,041 A | 2/1994 | Nguyen et al. .............. 423/240 |
| 5,283,139 A | 2/1994 | Newman et al. ............. 429/224 |
| 5,294,499 A | 3/1994 | Furukawa et al. ........... 429/164 |
| 5,296,435 A | 3/1994 | Kitaguchi et al. ........... 502/174 |
| 5,308,591 A | 5/1994 | Whittenberger ............. 422/174 |
| 5,312,863 A * | 5/1994 | Van Rheenen et al. ...... 524/555 |
| 5,317,869 A | 6/1994 | Takeuchi ..................... 60/300 |
| 5,340,562 A | 8/1994 | O'Young et al. ............ 423/599 |
| 5,348,726 A | 9/1994 | Wang et al. ................. 423/605 |
| 5,356,457 A | 10/1994 | Pincheira Alvarez et al. . 75/710 |
| 5,382,417 A | 1/1995 | Haase .......................... 423/219 |
| 5,391,365 A | 2/1995 | Wang et al. ................. 423/605 |

| | | | | |
|---|---|---|---|---|
| 5,395,534 A | 3/1995 | Smith | | 210/688 |
| 5,401,477 A | 3/1995 | Cawlfield et al. | | 423/50 |
| 5,405,594 A | 4/1995 | Andersen et al. | | 423/605 |
| 5,411,643 A | 5/1995 | Cawlfield et al. | | 204/115 |
| 5,419,882 A | 5/1995 | Jibiki | | 423/111 |
| 5,422,331 A | 6/1995 | Galligan et al. | | 502/333 |
| 5,431,956 A | * 7/1995 | Robb et al. | | 427/220 |
| 5,433,772 A | 7/1995 | Sikora | | 96/87 |
| 5,447,693 A | 9/1995 | Ohta et al. | | 422/122 |
| 5,620,672 A | 4/1997 | Galligan et al. | | 423/219 |
| 5,676,913 A | 10/1997 | Cirillo et al. | | 423/219 |

FOREIGN PATENT DOCUMENTS

| | | | | |
|---|---|---|---|---|
| DE | 2155738 | 1/1973 | | B60H/3/06 |
| DE | 2155738 | 5/1973 | | |
| DE | 25 49 621 B2 | 5/1977 | | |
| DE | 25 49 621 A1 | 5/1977 | | H01M/4/90 |
| DE | 30 19 828 | 11/1980 | | C09D/7/12 |
| DE | 33 34 992 A1 | 4/1985 | | B60H/3/00 |
| DE | 37 13 035 A1 | 10/1988 | | B65D/90/28 |
| DE | 40 07 964 A1 | 9/1991 | | B01J/23/72 |
| DE | 40 07 965 C2 | 9/1991 | | B01J/23/72 |
| DE | 40 07 965 A1 | 9/1991 | | B01J/23/84 |
| DE | 40 17 892 A1 | 12/1991 | | |
| DE | 42 09 196 C1 | 7/1993 | | |
| DE | 40 07 965 C2 | 3/1994 | | B01J/23/72 |
| DE | 43 18 738 C1 | 7/1994 | | B01D/53/36 |
| DE | 44 20 224 A1 | 1/1995 | | B01D/53/86 |
| DE | 44 23 329 A1 | 1/1995 | | B01D/53/86 |
| DE | 94 15 457.0 | 1/1995 | | B01D/53/86 |
| EP | 097 287 | 1/1984 | | F28D/1/04 |
| EP | 0 186 477 B1 | 7/1986 | | |
| EP | 186 477 | 7/1989 | | F24F/3/12 |
| EP | 351 036 | 1/1990 | | B01J/35/02 |
| EP | 373 648 | 6/1990 | | B01D/53/36 |
| EP | 0 431 648 A1 | 6/1991 | | |
| EP | 470 330 A1 | 2/1992 | | F02M/35/024 |
| EP | 537 815 | 4/1993 | | C10G/47/14 |
| EP | 0 561 484 A1 | 9/1993 | | B01D/53/36 |
| EP | 0 628 338 A1 | 12/1994 | | |
| EP | 0 634 205 A1 | 1/1995 | | |
| EP | 0 635 685 A1 | 1/1995 | | |
| EP | 0 653 956 B1 | 5/1995 | | |
| EP | 0 666 776 B1 | 8/1995 | | |
| GB | 2 009 392 | 6/1979 | | |
| GB | 2 056 424 B | 3/1981 | | |
| GB | 2 056 424 A | 3/1981 | | |
| GB | 2 037 607 B | 5/1983 | | |
| GB | 2 110 174 A | 6/1983 | | B60K/13/02 |
| GB | 2 218 354 A | 11/1989 | | B01D/50/00 |
| JP | 4011141 B | 3/1974 | | |
| JP | 52148468 | 12/1977 | | B01D/53/34 |
| JP | 55106813 | 8/1980 | | B60H/1/24 |
| JP | 56059671 | 5/1981 | | B01J/20/06 |
| JP | 57122924 | 7/1982 | | B01D/53/36 |
| JP | 61035853 | 2/1986 | | B01J/23/89 |
| JP | 3-229645 | 10/1991 | | |
| JP | 4110045 | 4/1992 | | B01D/53/36 |
| JP | H4-176316 | 6/1992 | | |
| JP | 4297341 | 10/1992 | | B60P/3/00 |
| JP | H4-297341 | 10/1992 | | |
| JP | 5-7776 | 1/1993 | | |
| JP | 5023590 | 2/1993 | | B01D/53/36 |
| JP | 5038443 | 2/1993 | | B01J/23/89 |
| JP | H6-13204 | 1/1994 | | |
| SU | 1 703 173 | 1/1992 | | B01J/37/30 |
| WO | WO 90/11433 | 10/1990 | | F01N/3/10 |
| WO | WO 91/09755 A | 7/1991 | | |
| WO | WO 93/05821 | 4/1993 | | A61L/9/20 |
| WO | WO 94/27709 | 12/1994 | | B01D/53/36 |
| WO | WO 95/22395 | 8/1995 | | B01D/57/75 |
| WO | WO 96/09109 | 3/1996 | | B01D/53/88 |
| WO | WO 96/22146 | 7/1996 | | B01D/53/68 |
| WO | WO 96/22148 | 7/1996 | | B01D/53/88 |
| WO | WO 97/41948 | 11/1997 | | |
| WO | WO 98/06479 | 2/1998 | | |
| WO | WO 98/06480 | 2/1998 | | |

OTHER PUBLICATIONS

SAE 931112 Air Mix versus Coolant Flow to Control Discharge Air Temperature in Vehicle Heating and Air Conditioning Systems by Gary Rolling and Robert Cummings of Behr of America, Inc. and Gebhard Schweizer of Behr GmbH & Co.

SAE 931115 Engine Cooling Module Development Using Air Flow Management Technique by Refki El–Bourini & Samuel Chen of Calsonic Technical Center.

SAE 931125 Durability Concerns of Aluminum Air to Air Charge Air Coolers by Paul Richard Smith of Valeo Engine Cooling Inc.

Taylor, The Internal Combustion Engine in Theory and Practice, vol. I: Thermo Dynamics, Fluid Flow, Performance, Second Edition, Rev.

Bosch Automotive Handbook, Second Edition, pp. 301–303, 320 and 349–351 published by Robert Bosch GmbH, 1986.

O'Young, Hydrothermal Synthesis of Manganese Oxides with Tunnel Structures, Modern Analytical Techniques for Analysis of Petroleum, presented at Symposium on Advances in Zeolites and Pillared Clay Structures before the Division of Petroleum Chemistry, Inc., American Chemical Society, NYC Meeting, Aug. 25–30, 1991 beginning at p. 348.

McKenzie, The Synthesis of Birnessite, Cryptomelane, and Some Other Oxides and Hydroxides of Manganese, Mineralogical Magazine, December 1971, vol. 38, pp 493–502.

Additives for Dispersion Technology, published by Rhone Poulenc.

Mark, et al., Kirk–Othmer Encyclopedia of Chemical Technology, Ed. 3, vol. 5, Castor Oil to Chlorosulfuric Acid, 1989, Wiley & Sons, NY, pp. 22–23, 40, 49–51.

Gerhartz, et al., Ullmann's Encyclopedia of Industrial Chemistry, Ed. 5, vol. A5, Cancer Chemotherapy to Ceramic Colorants, 1986, VCH Verlag, De, Weinheim, pp. 336, 347–353.

Derwent Abstracts (see Attached).

Manganese Compounds, vol. 15, pp. 1003–1050.

SAE 931120 A New Zeolite Energy Storage Concept for Cooling & Heating Sleeping Cabins in Trucks by Manfred Nonnenman & Noureddine Khellifa of Behr GmbH & Co. pp. 405–413.

SAE 931121 Automotive Evaporator and Condenser Modeling by Francisco Castro, Francisco Tinaut & A.A. Rahman Ali of Universidad de Valladolid. pp. 415–421.

Taylor "The Internal–Combustion Engine in Theory and Practice vol. I: Thermodynamics, Fluid Flow, Performance" 2nd Edition The MIT Press, 1985 at pp. 304–306 for radiator and fin design; and p. 392 for after coolers.

Outside submission from Litman Law Offices, Ltd. In the Application of Leo K. Brown for an Environmental Air Filtration System for Vehicles.

Outside submission from Attorney Conrad O. Gardner in the Application of A System for Ambient Air Pollution Processing by Motor Vehicles.

Newspaper Article with Informal Translation—Mobile Air Purification.

Newspaper Article with Informal Translation—Super–Kat in Cars ensures clean air forever.

* cited by examiner

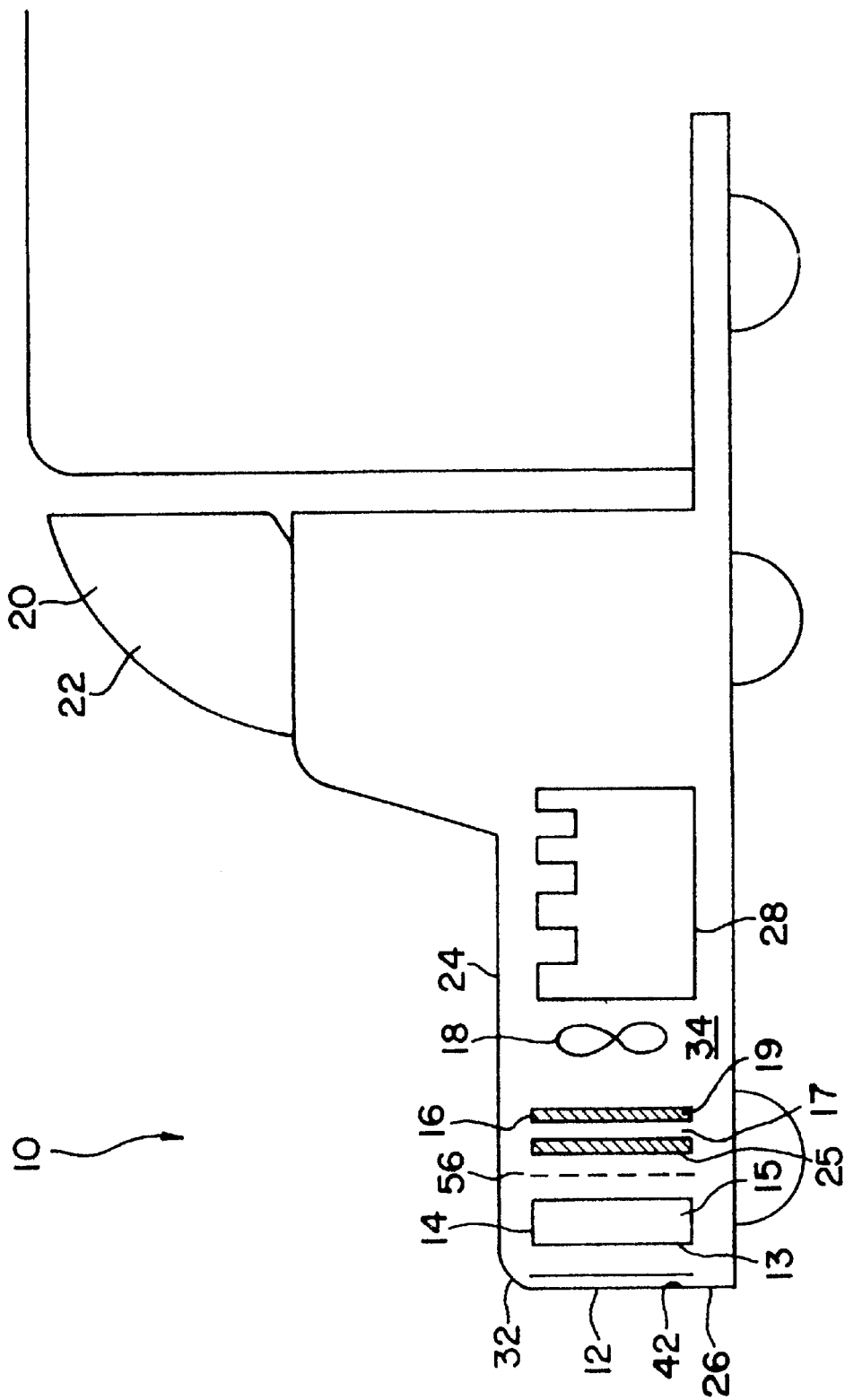

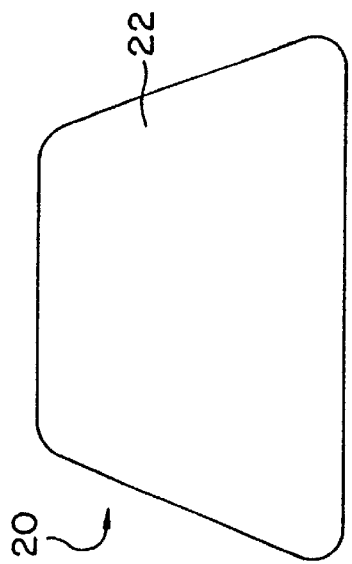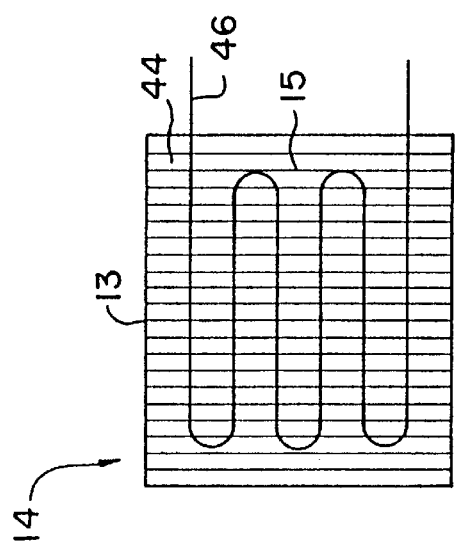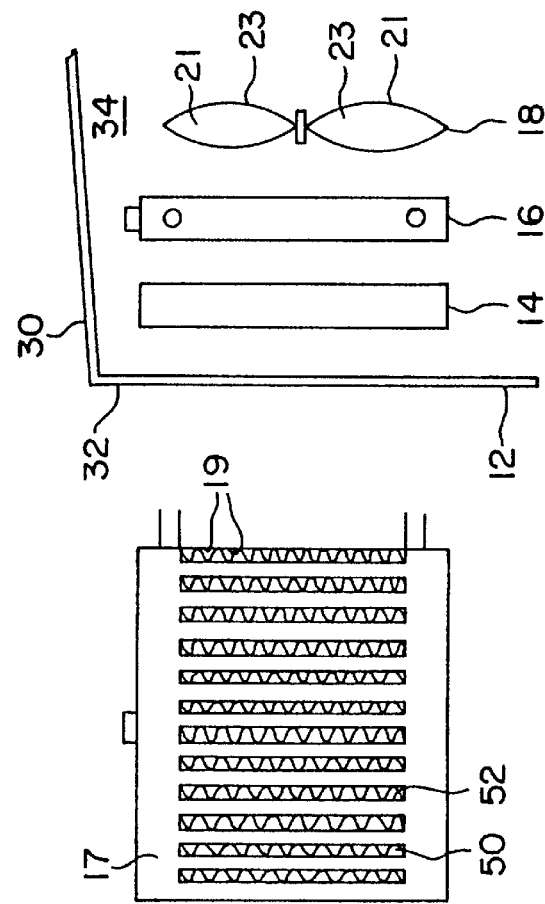

STABLE SLURRIES OF CATALYTICALLY ACTIVE MATERIALS

RELATED APPLICATION

This is a continuation-in-part application of U.S. Ser. No. 08/589,182 filed Jan. 19, 1996 now abandoned which is a continuation-in-part of U.S. Ser. No. 08/537,206 filed Sep. 29, 1995 now abandoned which is a continuation-in-part of U.S. Ser. No. 08/410,445 filed Mar. 24, 1995 now abandoned which is a continuation-in-part of U.S. Ser. No. 08/376,332 filed Jan. 20, 1995, now abandoned all of said applications are herein incorporated by reference.

BACKGROUND OF THE INVENTION

1. Field of The Invention

The present invention relates to an apparatus for cleaning the atmosphere; and more particularly to a vehicle comprising at least one atmosphere contacting surface having a pollution treating composition thereon, and a related method and composition.

2. Discussion of the Related Art

A review of literature relating to pollution control reveals that the general approach is to reactively clean waste streams entering the environment. If too much of one pollutant or another is detected or being discharged, the tendency has been to focus on the source of the pollutant, the cause of the pollutant or the waste stream containing the pollutant. For the most part gaseous streams are treated to reduce the pollutants prior to entering the atmosphere.

It has been disclosed to treat atmospheric air directed into a confined space to remove undesirable components in the air. However, there has been little effort to treat pollutants which are already in the environment; the environment has been left to its own self cleansing systems. References are known which disclose proactively cleaning the environment. U.S. Pat. No. 3,738,088 discloses an air filtering assembly for cleaning pollution from the ambient air by utilizing a vehicle as a mobile cleaning device. A variety of elements are disclosed to be used in combination with a vehicle to clean the ambient air as the vehicle is driven through the environment. In particular, there is disclosed ducting to control air stream velocity and direct the air to various filter means. The filter means can include filters and electronic precipitators. Catalyzed postfilters are disclosed to be useful to treat nonparticulate or aerosol pollution such as carbon monoxide, unburned hydrocarbons, nitrous oxide and/or sulfur oxides, and the like. German Patent DE 43 18 738 C1 also discloses a process for the physical and chemical cleaning of outside air. Motor vehicles are used as carriers of conventional filters and/or catalysts, which do not constitute operational components of the vehicle but are used to directly clean atmospheric air.

Another approach is disclosed in U.S. Pat. No. 5,147,429. There is disclosed a mobile airborne air cleaning station. In particular this patent features a dirigible for collecting air. The dirigible has a plurality of different types of air cleaning devices contained therein. The air cleaning devices disclosed include wet scrubbers, filtration machines, and cyclonic spray scrubbers.

The difficulty with the above recited devices disclosed to proactively clean the atmospheric air is that they require new and additional equipment. Even the modified vehicle disclosed in U.S. Pat. No. 3,738,088 requires ducting and filters which can include catalytic filters.

DE 40 07 965 C2 to Klaus Hager discloses a catalyst comprising copper oxides for converting ozone and a mixture of copper oxides and manganese oxides for converting carbon monoxide. The catalyst can be applied as a coating to a self heating radiator, oil coolers or charged-air coolers. The catalyst coating comprises heat resistant binders which are also gas permeable. It is indicated that the copper oxides and manganese oxides are widely used in gas mask filters and have the disadvantage of being poisoned by water vapor. However, the heating of the surfaces of the automobile during operation evaporates the water. In this way, continuous use of the catalyst is possible since no drying agent is necessary.

Manganese oxides are known to catalyze the oxidation of ozone to form oxygen. Many commercially available types of manganese compound and compositions, including alpha manganese oxide are disclosed to catalyze the reaction of ozone to form oxygen. In particular, it is known to use the cryptomelane form of alpha manganese oxide to catalyze the reaction of ozone to form oxygen.

Alpha manganese oxides are disclosed in references such as O'Young, Hydrothermal Synthesis of Manganese Oxides with Tunnel Structures, Modern Analytical Techniques for Analysis of Petroleum, presented at the Symposium on Advances in Zeolites and Pillared Clay Structures before the Division of Petroleum Chemistry, Inc. American Chemical Society New York City Meeting, Aug. 25–30, 1991 beginning at page 348. Such materials are also disclosed in U.S. Pat. No. 5,340,562 to O'Young, et al. Additionally, forms of $\alpha$-$MnO_2$ are disclosed in McKenzie, the Synthesis of Birnessite, Cryptomelane, and Some Other Oxides and Hydroxides of Manganese, Mineralogical Magazine, December 1971, Vol. 38, pp. 493–502. For the purposes of the present invention, $\alpha$-$MnO_2$ is defined to include hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$). O'Young discloses these materials to have a three dimensional framework tunnel structure (U.S. Pat. No. 5,340,562 and O'Young Hydrothermal Synthesis of Manganese Oxides with Tunnel Structures both hereby incorporated by reference). For the purposes of the present invention, $\alpha$-$MnO_2$ is considered to have a 2×2 tunnel structure and to include hollandite, cryptomelane, manjiroite and coronadite.

SUMMARY OF THE INVENTION

The present invention relates to an apparatus, method and composition to treat the atmosphere. For the purposes of the present invention atmosphere is defined as the mass of air surrounding the earth.

The present invention is directed to an apparatus and related method for treating the atmosphere comprising a vehicle and a means such as a motor to translate the vehicle from one place to another through the atmosphere. The vehicle comprises at least one atmosphere contacting vehicle surface and a pollutant treating composition located on that surface. The atmosphere contacting surface is a surface of a component of the vehicle that is in direct contact with the atmosphere. Preferred and useful atmosphere contacting surfaces include body surfaces, wind deflector surfaces, grill surfaces, mirror backs and the surfaces of "under the hood" components. Preferred atmosphere contacting surfaces are located within the body of the motor vehicle, typically in proximity to the engine, i.e., the engine compartment. The surfaces are preferably the surfaces of cooling means which comprise an in flow path for liquids or gases through a coolant walled enclosure such as tubes or a housing and an outer surface on which is located fins to enhance heat transfer. Preferred atmosphere contacting surfaces comprise a finned outer surface and are selected from the outer surfaces of the radiator, air conditioner condenser, the surfaces of the radiator fan, engine oil cooler, transmission oil cooler, power steering fluid cooler and air charge cooler also referred to as an intercooler or after cooler. The most preferred atmosphere contacting surfaces are the outer surfaces of the air conditioner condenser and radiator due to their large surface area and relatively high ambient operating temperatures of from about 40° C. to 135° C. and typically up to 110° C.

An advantage of the present invention is that the atmosphere contacting surface useful to support a pollution treating composition can be the surface of existing vehicle components. No additional filter, or apparatus to support a pollutant treating composition, is required. Accordingly, the apparatus and method of the present invention can be located on existing components of new cars or retrofitted onto old cars. Retrofitting may comprise coating a suitable pollutant treating composition on an existing vehicle surface which comes in contact with atmospheric air as the vehicle is driven through the atmosphere.

The present invention is directed to compositions, methods and articles to treat pollutants in air. Such pollutants may typically comprise from 0 to 400 parts, more typically 1 to 300, and yet more typically 1 to 200, parts per billion (ppb) ozone; 0 to 30 parts, and more typically 1 to 20, parts per million (ppm) carbon monoxide; and 2 to 3000 ppb unsaturated hydrocarbon compounds such as $C_2$ to about $C_{20}$ olefins and partially oxygenated hydrocarbons such as alcohols, aldehydes, esters, ethers, ketones and the like. Typical hydrocarbons which can be treated include, but are not limited to, propylene, butylene, formaldehyde and other airborne hydrocarbon gases and vapors. Other pollutants present may include nitrogen oxides and sulfur oxides. The National Ambient Air Quality Standard for ozone is 120 ppb, and for carbon monoxide is 9 ppm.

Pollutant treating compositions include catalyst compositions useful for catalyzing the conversion of pollutants present in the atmosphere to non-objectionable materials. Alternatively, adsorption compositions can be used as the pollutant treating composition to absorb pollutants which can be destroyed upon adsorption, or stored for further treatment at a later time.

Catalyst compositions can be used which can assist in the conversion of the pollutants to harmless compounds or to less harmful compounds. Useful and preferred catalyst compositions include compositions which catalyze the reaction of ozone to form oxygen, catalyze the reaction of carbon monoxide to form carbon dioxide, and/or catalyze the reaction of hydrocarbons to form water and carbon dioxide. Specific and preferred catalysts to catalyze the reaction of hydrocarbons are useful for catalyzing the reaction of low molecular weight unsaturated hydrocarbons having from two to twenty carbons and at least one double bond, such as $C_2$ to about $C_8$ mono-olefins. Such low molecular weight hydrocarbons have been identified as being sufficiently reactive to cause smog. Particular olefins which can be reacted include propylene and butylene. A useful and preferred catalyst can catalyze the reactions of both ozone and carbon monoxide; and preferably ozone, carbon monoxide and hydrocarbons.

Ozone—Useful and preferred catalyst compositions to treat ozone include a composition comprising manganese compounds including oxides such as $Mn_2O_3$ and $MnO_2$ with a preferred composition comprising α-$MnO_2$, and cryptomelane being most preferred. Other useful and preferred compositions include a mixture of $MnO_2$ and CuO. Specific and preferred compositions comprise hopcalite which contains CuO and $MnO_2$ and, more preferably Carulite® which contains $MnO_2$, CuO and $Al_2O_3$ and sold by the Carus Chemical Co. An alternative composition comprises a refractory metal oxide support on which is dispersed a catalytically effective amount of a palladium component and preferably also includes a manganese component. Also useful is a catalyst comprising a precious metal component, preferably a platinum component on a support of coprecipitated zirconia and manganese oxide. The use of this coprecipitated support has been found to be particularly effective to enable a platinum component to be used to treat ozone. Yet another composition which can result in the conversion of ozone to oxygen comprises carbon, and palladium or platinum supported on carbon, manganese dioxide, Carulite® and/or hopcalite. Manganese supported on a refractory oxide such as alumina has also been found to be useful.

Carbon Monoxide—Useful and preferred catalyst compositions to treat carbon monoxide include a composition comprising a refractory metal oxide support on which is dispersed a catalytically effective amount of a platinum and/or palladium component, preferably a platinum component. A most preferred catalyst composition to treat carbon monoxide comprises a reduced platinum group component supported on a refractory metal oxide, preferably titania. Useful catalytic materials include precious metal components including platinum group components which include the metals and their compounds. Such metals can be selected from platinum, palladium, rhodium and ruthenium, gold and/or silver components. Platinum will also result in the catalytic reaction of ozone. Also useful is a catalyst comprising a precious metal component, preferably a platinum component on a support of coprecipitated zirconia and manganese dioxide. Preferably, this catalyst embodiment is reduced. Other useful compositions which can convert carbon monoxide to carbon dioxide include a platinum component supported on carbon or a support comprising manganese dioxide. Preferred catalysts to treat such pollutants are reduced. Another composition useful to treat carbon monoxide comprises a platinum group metal component, preferably a platinum component, a refractory oxide support, preferably alumina and titania and at least one metal component selected from a tungsten component and rhenium component, preferably in the metal oxide form.

Hydrocarbons—Useful and preferred catalyst compositions to treat unsaturated hydrocarbons including $C_2$ to about $C_{20}$ olefins and typically $C_2$ to $C_8$ mono-olefins such as propylene and partially oxygenated hydrocarbons as recited have been found to be the same type as recited for use in catalyzing the reaction of carbon monoxide with the preferred compositions for unsaturated hydrocarbons comprising a reduced platinum and/or palladium component and a refractory metal oxide support for the platinum component. A preferred refractory metal oxide support is titania. Other useful compositions which can convert hydrocarbons to carbon dioxide and water include a platinum component supported on carbon or a support comprising manganese dioxide. Preferred catalysts to treat such pollutants are reduced. Another composition useful to convert hydrocarbons comprises a platinum group metal component, preferably a platinum component, a refractory oxide support, preferably alumina and titania and at least one metal component selected from a tungsten component and rhenium component, preferably in the metal oxide form. A combination of a platinum component and a palladium component results in improved CO conversion at an increase in cost and is most preferred where greater conversion is desired and cost increase is acceptable.

Ozone and Carbon Monoxide—A useful and preferred catalyst which can treat both ozone and carbon monoxide comprises a support such as a refractory metal oxide support on which is dispersed a precious metal component. The refractory oxide support can comprise a support component selected from the group consisting of ceria, alumina, silica, titania, zirconia, and mixtures thereof. Also useful as a support for precious metal catalyst components is a coprecipitate of zirconia and manganese oxides. Most preferably, this support is used with a platinum component and the catalyst is in reduced form. This single catalyst has been found to effectively treat both ozone and carbon monoxide. Other useful and preferred precious metal components are comprised of precious metal components selected from palladium and also platinum components with palladium preferred. A combination of a ceria support with a palladium component results in an effective catalyst for treating both ozone and carbon monoxide. Other useful and preferred catalysts to treat both ozone and carbon monoxide include a platinum group component, preferably a platinum component and/or palladium component and more preferably a platinum component, on titania or on a combination of zirconia and silica. A combination of a platinum component and a palladium component results in improved CO conversion at an increase in cost and is most preferred where greater conversion is desired and cost increase is acceptable. Other useful compositions which can convert ozone to oxygen and carbon monoxide to carbon dioxide include a platinum component supported on carbon or on a support comprising manganese dioxide. Preferred catalysts are reduced.

Ozone, Carbon Monoxide and Hydrocarbons—A useful and preferred catalyst which can treat ozone, carbon monoxide and hydrocarbons, typically low molecular weight olefins ($C_2$ to about $C_{20}$) and typically $C_2$ to $C_8$ mono-olefins and partially oxygenated hydrocarbons as recited comprises a support, preferably a refractory metal oxide support on which is dispersed a precious metal component. The refractory metal oxide support can comprise a support component selected from the group consisting of ceria, alumina, titania, zirconia and mixtures thereof with titania most preferred. Useful and preferred precious metal components are comprised of precious metal components selected from platinum group components including palladium and/or platinum components with platinum most preferred. It has been found that a combination of a titania support with a platinum component results in the most effective catalyst for treating ozone, carbon monoxide and low molecular weight gaseous olefin compounds. A combination of a platinum component and a palladium component results in improved CO and hydrocarbon conversion at an increase in cost and is most preferred where greater conversion is desired and cost increase is acceptable. It is preferred to reduce the platinum group components with a suitable reducing agent. Other useful compositions which can convert ozone to oxygen, carbon monoxide to carbon dioxide, and hydrocarbons to carbon dioxide include a platinum component supported on carbon, a support comprising manganese dioxide, or a support comprising a coprecipitate of manganese oxides and zirconia. Preferred catalysts are reduced.

The above compositions can be applied by coating to at least one atmosphere contacting vehicle surface. Particularly preferred compositions catalyze the destruction of ozone, carbon monoxide and/or unsaturated low molecular weight olefinic compounds at ambient conditions or ambient operating conditions. Ambient conditions are the conditions of the atmosphere. By ambient operating conditions it is meant the conditions, such as temperature, of the atmosphere contacting surface during normal operation of the vehicle without the use of additional energy directed to heating the pollutant treating composition. Certain atmosphere contacting surfaces such as a grill or wind deflector can be at the same or similar temperature as the atmosphere. It has been found that preferred catalysts which catalyze the reaction of ozone can catalyze the reaction of ozone at ambient conditions in ranges as low as 5° C. to 30° C.

Atmosphere contacting surfaces may have higher temperatures than the ambient atmospheric temperatures due to the nature of the operation of the component underlying the surface. For example, preferred atmosphere contacting surfaces are the surfaces of the air conditioning condenser and the radiator due to their high surface area. Where vehicles use air charge coolers, these are preferred due to high surface area and operating temperatures of from ambient to 250° F. Normally, during ambient operating conditions the surfaces of these components increase to higher temperature levels than the ambient environment due to the nature of their operation. After the vehicle motor has warmed up, these components are typically at temperatures which range up to about 130° C. and typically from 40° C. to 110° C. The temperature range of these atmosphere contacting surfaces helps to enhance the conversion rates of the ozone, carbon monoxide and hydrocarbon catalysts supported on such surfaces. Air charge coolers operate at temperatures up to about 130° C. and typically from 60° C. to 130° C.

Various of the catalyst compositions can be combined, and a combined coating applied to the atmosphere contacting surface. Alternatively, different surfaces or different parts of the same surface can be coated with different catalyst compositions.

The method and apparatus of the present invention are designed so that the pollutants can be treated at ambient atmospheric conditions or at the ambient operating conditions of the vehicle atmosphere contacting surface. The present invention is particularly useful for treating ozone by coating motor vehicle atmosphere contacting surfaces with suitable catalysts useful to destroy such pollutants even at ambient conditions, and at vehicle surface temperatures typically from at least 0° C., preferably from 10° C. to 105° C., and more preferably from 40° C. to 100° C. Carbon monoxide is preferably treated at atmosphere contacting surface temperatures from 40° C. to 105° C. Low molecular weight hydrocarbons, typically unsaturated hydrocarbons having at least one unsaturated bond, such as $C_2$ to about $C_{20}$ olefins and typically $C_2$ to $C_8$ mono-olefins, are preferably treated at atmosphere contacting surface temperatures of from 40° C. to 105° C. The percent conversion of ozone, carbon monoxide and/or hydrocarbons depends on the temperature and space velocity of the atmospheric air relative to the atmosphere contacting surface, and the temperature of the atmosphere contacting surface.

Accordingly, the present invention, in most preferred embodiments can result in at least reducing the ozone, carbon monoxide and/or hydrocarbon levels present in the atmosphere without the addition of any mechanical features or energy source to existing vehicles, particularly motor vehicles. Additionally, the catalytic reaction takes place at the normal ambient operating conditions experienced by the surfaces of these motor vehicle elements so that no changes in the construction or method of operation of the motor vehicle are required.

While the apparatus and method of the present invention are generally directed to treating the atmosphere, it will be appreciated that variations of the apparatus are contemplated for use to treat volumes of air in enclosed spaces. For example, a motor vehicle having an atmosphere contacting surface supporting a pollutant treating composition can be used to treat the air within factories, mines and tunnels. Such apparatus can include vehicles used in such environments.

While the preferred embodiments of the present invention are directed to the destruction of pollutants at the ambient operating temperatures of the atmosphere contacting surface, it is also desirable to treat pollutants which have a catalyzed reaction temperature higher than the ambient temperature or ambient operating temperature of the atmosphere contacting surface. Such pollutants include hydrocarbons and nitrogen oxides and any carbon monoxide which bypasses or is not treated at the atmosphere contacting surface. These pollutants can be treated at higher temperatures typically in the range of at least 100° C. to 450° C. This can be accomplished, for example, by the use of an auxiliary heated catalyzed surface. By an auxiliary heated surface, it is meant that there are supplemental means to heat the surface. A preferred auxiliary heated surface is the surface of an electrically heated catalyzed monolith such as an electrically heated catalyzed metal honeycomb of the type known to those skilled in the art. Electricity can be provided by batteries or a generator such as are present in motor vehicles. The catalyst composition can be any well known oxidation and/or reduction catalyst, preferably a three way catalyst (TWC) comprising precious group metals such as platinum, palladium, rhodium and the like supported on refractory oxide supports. An auxiliary heated catalyzed surface can be used in combination with, and preferably downstream of, the vehicle atmosphere contacting surface to further treat the pollutants.

As previously stated, adsorption compositions can also be used to adsorb pollutants such as hydrocarbons and/or particulate matter for later oxidation or subsequent removal. Useful and preferred adsorption compositions include zeolites, other molecular sieves, carbon, and Group IIA alkaline earth metal oxides such as calcium oxide. Hydrocarbons and particulate matter can be adsorbed from 0° C. to 110° C. and subsequently treated by desorption followed by catalytic reaction or incineration.

It is preferred to coat areas of the vehicle that have a relatively high surface area exposed to a large flow rate of atmospheric air as the motor vehicle is driven through the environment. For land use motor vehicles, particularly preferred atmosphere contacting surfaces include the radiator, fan blades, the air conditioning condenser or heat exchanger, air charge cooler, engine oil cooler, transmission oil cooler, and wind deflectors of the type used on the roof of truck cabs.

Most preferably, the atmosphere contacting surface is a surface of a radiator. The radiator has a large surface area for enhanced cooling of internal combustion engine fluid coolants. By applying a catalyst to be supported on the radiator surface, advantage can be taken of the large honeycomb-like surface area, usually with little or no effect on the cooling function of the radiator. The high honeycomb-like surface area enables a maximization of contact of the catalyst with the air passing through the honeycomb-like design of the radiator. Additionally, radiators in many automobiles are located behind the air conditioner condenser and are thereby protected by the air conditioner condenser.

The present invention includes methods to coat pollutant treating compositions on to atmosphere contacting surfaces of motor vehicles. In particular, the present invention includes a method to coat catalyst compositions onto finned elements such as radiators, air conditioner condensers, and air charge coolers.

Calculations suggest that in motor vehicle traffic congested areas, there are a sufficient number of motor vehicles to significantly impact pollutants treated in accordance with the present invention. For example, in Southern California's South Coast Air Quality Management District, there are approximately eight million cars. It has been calculated that if each car travels 20 miles per day, all of the air in this region to an altitude of 100 feet can be cycled through radiators in one week.

BRIEF DESCRIPTION OF THE DRAWINGS

FIG. 1 is a side schematic view of a truck showing a grill, air conditioner condenser, electrically heated catalyst, air charge cooler, radiator, fan and engine with a wind deflector on the roof of the truck cab.

FIG. 2 is a partial schematic view of a motor vehicle showing the grill, air conditioner condenser, radiator and fan.

FIG. 3 is a front view of the radiator.

FIG. 4 is a front view of the air conditioner condenser.

FIG. 5 is a front view of a wind deflector of the type illustrated in FIG. 1.

DETAILED DESCRIPTION OF THE PREFERRED EMBODIMENTS

Figure 6:
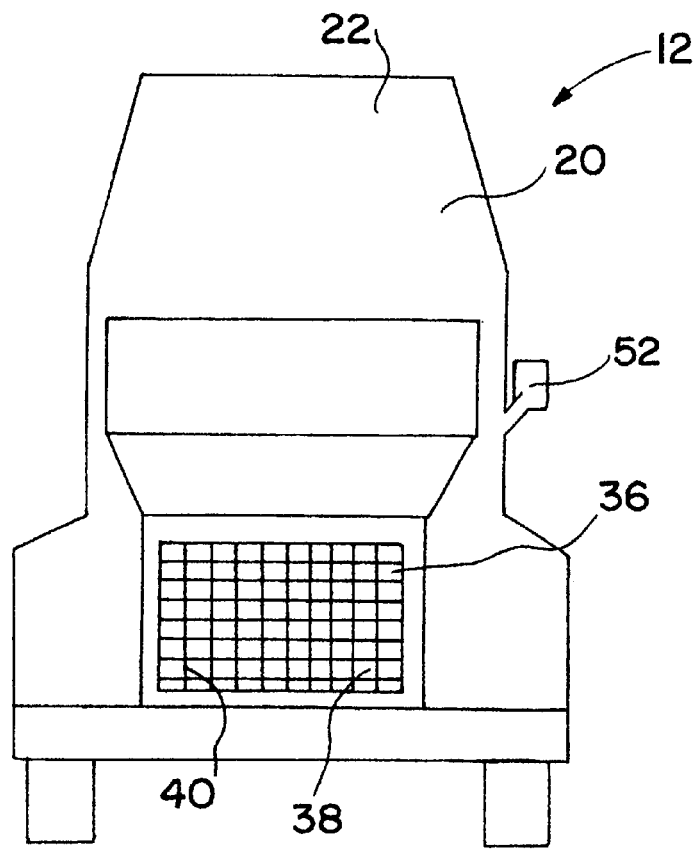
FIG. 6 is a front view of the truck of FIG. 1.

The present invention relates to apparatus and methods for cleaning the atmosphere useful with vehicles having means to convey the vehicle through the atmosphere. As the vehicle moves through the atmosphere, at least one atmosphere contacting surface comprising a pollutant treating composition (e.g., a catalyst or an adsorber) located thereon contacts atmospheric air. As the atmospheric air encounters the pollutant treating composition, various pollutants including particulate matter and/or gaseous pollutants carried in the air can be catalytically reacted or adsorbed by the pollutant treating composition located on the atmosphere contacting surface.

It will be appreciated by those skilled in the art that the vehicle can be any suitable vehicle which has a translation means to propel the vehicle such as wheels, sails, belts, tracks or the like. Such means can be powered by any suitable power means including engines which use fossil fuel such as gasoline or diesel fuel, ethanol, methanol, gas engines powered by fuels such as by methane gas, wind power such as by wind driving sails or propellers, solar power or electric power such as in battery operated automobiles. Vehicles include cars, trucks, buses, trains, boats, ships, airplanes, dirigibles, balloons and the like.

The atmosphere contacting surface can be any suitable surface that encounters and contacts air as the vehicle moves through the atmosphere. Preferably in a motor vehicle, preferably cars, trucks and buses, the contact means is a surface located toward the front of the vehicle and can contact air as the vehicle proceeds in a forward direction. Useful contact surfaces should have a relatively large surface area. Preferred contact surfaces are at least partially enclosed in the vehicle. Preferred atmosphere contacting surfaces are located under the hood and are located within the body of the motor vehicle, typically in proximity to the engine, i.e., the engine compartment. The surfaces are preferably the outer surfaces of cooling means which comprise a flow path for liquids or gases through a coolant walled enclosure such as tubes or a housing and an outer surface on which is located fins to enhance heat transfer. Useful contact surfaces include the outside surfaces of means to cool fluids, including liquids and/or gases used in the vehicle such as the air conditioner condenser, the radiator, air charge cooler, engine oil cooler, transmission oil cooler, power steering fluid cooler, the fan shroud, and the radiator fan which are all located and supported within the housing of the vehicle. A useful contact surface outside of the vehicle can be the grill typically located and supported on the front of the housing, or wind deflectors commonly supported on the roof of the cabs of large trucks. It is preferred that the contacting surface is a forward facing surface, side facing surface or surface facing the top or bottom of the vehicle. The front facing surfaces face the front of the vehicle, surfaces such as the fins of the radiator and condenser elements face the side, top and bottom of the vehicle. Even surfaces directed to face away from the front and toward the back of the vehicle which contact air can be atmosphere contacting surfaces, such as the back surface of fan blades. Surfaces of airplane engines such as wings, propellers and jet engine parts including turbine rotors and/or stators can be coated.

Preferred atmosphere contacting surfaces in motor vehicles are located on engine cooling elements such as motor vehicle radiators, air conditioner condensers, air charge coolers, also known as intercoolers or after coolers, engine oil coolers and transmission oil coolers. Such elements typically have high surface area structures associated with them to have improved heat transfer. The high surface areas are useful for maximizing the contact of the atmospheric air with the pollutant treating composition. All such elements are well known in the automotive arts. Reference is made to *Bosch Automotive Handbook*, Second Edition, pages 301–303, 320 and 349–351, published by Robert Bosch GmbH, 1986, herein incorporated by reference. This reference illustrates a truck diesel engine with a radiator, an intercooler and a fan. Such elements may be coated with a pollutant treating surface of the present invention. The radiator and intercooler typically operate at temperatures higher than that of the atmospheric air. Reference is also made to Taylor, *The Internal Combustion Engine in Theory and Practice*, Vol. 1: Thermo Dynamics, Fluid Flow, Performance, Second Edition, Rev. The MIT Press, 1985 at pages 304–306 for radiator and fin design; and page 392 for after coolers. The above pages in Taylor are herein incorporated by reference.

Reference is also made to a collection of papers in 1993 *Vehicle Thermal Management Systems Conference Proceedings*, SAE P:263 published by the Society of Automotive Engineers, Inc., 1993. The following papers are herein incorporated by reference. SAE Paper No. 931088 beginning at page 157 entitled, *Calculation and Design of Cooling Systems* by Eichlseder and Raab of Steyr Damler Puchag and *Charge Air Cooler for Passenger Cars* by Collette of Valeo Thermique Moteur; SAE Paper No. 931092 entitled, *State of the Art and Future Developments of Aluminum Radiators for Cars and Trucks* by Kern and Eitel of Behr GmbH and Co. beginning at page 187; SAE Paper 931112 entitled, *Air Mix vs. Coolant Flow to Control Discharge Air Temperature and Vehicle Heating Air Conditioning Systems* by Rolling and Cummings of Behr of America, Inc. and Schweizer of Behr GmbH & Co. The above papers include descriptions of radiator, air conditioner and air charge cooler structures for use in the motor vehicles. Reference is additionally made to SAE Paper 931115 entitled, *Engine Cooling Module Development Using Air Flow Management Techniques* by El-Bourini and Chen of Calsonic Technical Center beginning at page 379 and hereby incorporated by reference. Of interest are Appendices 1 and 2 which illustrate typical radiator and condenser structures useful in motor vehicle applications. Reference is also made to SAE Paper 931125 entitled, *Durability Concerns of Aluminum Air to Air Charged Coolers* by Smith, Valeo Engine Cooling Inc. which discloses air charge coolers and is hereby incorporated by reference.

The present invention will be understood by those skilled in the art by reference to the accompanying FIGS. 1–7.

FIG. 1 illustrates a truck 10 schematically containing a variety of vehicle components comprising atmosphere contacting surfaces. These surfaces include the surfaces of grill 12, the air conditioner condenser 14, an air charge cooler 25, the radiator 16, and the radiator fan 18. Also shown on this truck is a wind deflector 20 having a front deflecting surface 22. It is recognized that the various components can have different relative locations on different vehicles.

Referring to FIGS. 1 to 4 the preferred contacting surfaces include the surface of the front 13 and side 15 surfaces of the air conditioner condenser 14, the front 17 and side 19 surfaces of the radiator 16, corresponding surfaces of the air charge cooler 25 and the front 21 and back 23 surfaces of the radiator fan 18. These surfaces are located within the housing 24 of the truck. They are typically under the hood 24 of the truck between the front 26 of the truck and the engine 28. The air conditioner condenser, air charge cooler, radiator and radiator fan can be directly or indirectly supported by housing 24 or a frame (not shown) within the housing.

FIG. 2 generally shows a schematic view of an automobile assembly. Corresponding elements in FIGS. 1 and 2 have common reference characters. The automobile comprises a housing 30. There is a motor vehicle front 32 having a grill 12 supported on the front of the housing 30. An air conditioner condenser 14, a radiator 16, and a radiator fan 18 can be located within the housing 30.

Referring to embodiments in FIGS. 1, 2 and 6, the contacting surface on the front and sides of least one of the grill 12, air conditioner condenser 14, the air charge cooler 25, and radiator 16; the front and back of the radiator fan 18; and the front of the wind deflector 20 can have a pollutant treating composition located thereon. The grill 12 can have a suitable grill grid type design which provides for openings 36 through which air passes as the truck 12 is operated and moves through the atmosphere. The openings are defined by the grill grid 38. The grill grid 38 has a front grill surface 40 and a side grill surface 42. The front and side grill grid surfaces 40 and 42 can be used as atmosphere contacting surfaces on which pollutant treating compositions are located.

Referring to FIGS. 1 and 4, the air conditioning condenser 14 comprises a plurality of air conditioning condenser fins 44. Additionally, there is an air conditioning fluid conduit 46 which conducts the air conditioning fluid through condenser 14. The front and side surfaces of the air conditioning fins 44, as well as the front surface of the air conditioning conduit 46 can be the atmosphere contacting surfaces on which a pollutant treating composition is located. As indicated, both the front 21 and back 23 surfaces of the radiator fan 18 can be a contacting surface to support a pollutant treating composition.

The most preferred atmosphere contacting surface is on radiator 16 as shown in FIG. 3. A typical radiator 16 has a frontal radiator surface 17 as well as a plurality of radiator corrugated plates or fins 50 located in corresponding radiator plate or fin channels 52 which pass through the radiator 16. It is preferred to coat the front surface 17 as well as the side surfaces of the radiator plates 50 and channel 52 surfaces. The radiator is most preferred because it is located within the housing 24 or 30 and is protected from the front by at least the grill 12 and preferably an air conditioner condenser 14. In addition to air entering into the hood chamber 34 as the motor vehicle moves through the atmosphere, radiator fan 18 draws air in and through the channels 52. Therefore, the radiator 16 is located and protected by the grill 12, the air conditioner condenser 19 and is in front of the radiator fan 18. Additionally, as indicated above, the radiator has a large surface area for heat transfer purposes. In accordance with the present invention, pollutant treating composition can be effectively located on, and take advantage of, such a large surface area without significantly adversely impacting on the heat transfer function of the radiator.

The above description is particularly directed to and illustrates the use of atmosphere treating surfaces on apparatus such as radiator 16 and air conditioner condenser 14. As indicated the atmosphere contacting surface can be on other suitable means to cool engine fluids including well known articles such as the above referenced air charge cooler 25 as well as engine oil coolers, transmission oil coolers and power steering oil coolers. A commonality of all such cooling means is a housing or conduit through which the fluid passes. The housing comprises a wall having an inner surface in contact with the fluid and an outer surface typically in contact with the atmosphere within the frame of the vehicle and typically within the engine compartment. In order to efficiently transfer heat from the fluid in these various apparatus, there are fins or plates extending from the outer surface of the cooling, housing or conduit.

Figure 7:
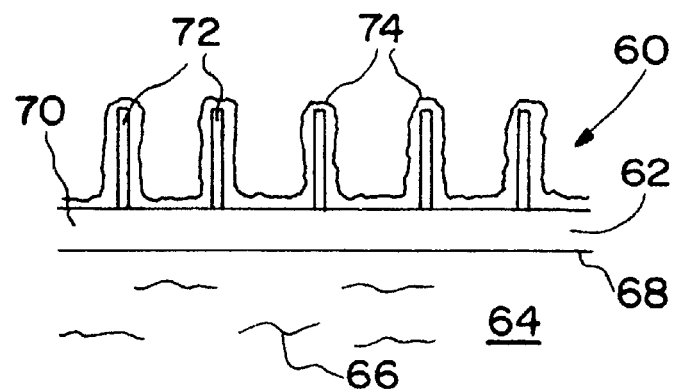
FIG. 7 is a partial schematic sectional view of coated finned cooling element.

A useful and preferred embodiment with each of these cooling means is illustrated in FIG. 7. FIG. 7 is a schematic sectional view of a coated finned cooling element 60. The element comprises a housing or conduit defined by a housing or conduit wall 62. Located within the conduit is a passageway or chamber 64 through which fluid such as oils or cooling liquids or air conditioning fluids pass. Such fluids are shown as referenced character 66. The housing wall comprises an inner surface 68 and an outer surface 70. Located and attached to the outer surface are plates or fins 72. In accordance with the present invention, there is a pollutant treating composition 74 which can be located on the outer surface 70 and the fins or plates 72. During operation air streams contact the pollutant treating composition to cause various of the pollutants to be treated.

Applicant herein incorporates by reference commonly assigned patent application entitled, "Pollution Treating Device and Methods of Making the Same", filed as U.S. Ser. No. 08/537,208. Additionally, any of the embodiments of the apparatus of the present invention and method of use thereof can optionally further incorporate a replaceable pollution treating device as disclosed therein.

Pollutant treating compositions can also be located on outer surfaces of the vehicle. As indicated, such compositions can be located on the grill 12 and in the case of the truck shown in FIGS. 1 and 6, on the wind deflector 20 frontal wind deflector surface 22. Additionally, pollution treatment compositions can be located on the front of the mirror 54 as well as any of a variety of front facing surfaces.

The use of an air charge cooler 25 represents a particularly effective atmosphere contacting surface on which pollutant treating compositions can be supported. The operating temperatures can reach as high as 250° F. At such temperatures, the catalyst compositions of the present invention can more effectively treat ozone, hydrocarbons, and carbon monoxide pollutants. Particularly useful are compositions containing precious metals such as platinum, palladium, gold or silver components. Alternatively, the catalyst can include manganese compounds such as manganese dioxide and copper compounds including copper oxide such Carulite or hopcalite.

During normal operation, the vehicle moves in a forward direction with the front 26 of the vehicle 10 initially contacting the atmospheric air. Typically, vehicles move through the air at velocities of up to about 1,000 miles per hour for jet planes. Land vehicles and water vehicles typically move at velocities of up to 300 miles per hour, more typically up to 200 miles per hour with motor vehicles moving at velocities up to 100 miles per hour and typically from 5 to 75 miles per hour. Seagoing vehicles, such as boats, typically move through the water at velocities up to 30 miles per hour and typically from 2 to 20 miles per hour. In accordance with method of the present invention the relative velocity (or face velocity) between the atmosphere contacting surface and the atmosphere, as the vehicle, typically an automobile or land based vehicle, moves through the atmosphere, is from 0 to 100 miles per hour, and typically from 2 to 75 miles per hour in an automobile typically from 5 to 60 miles per hour. The face velocity is the velocity of the air relative to the pollutant treating surface.

In motor vehicles such as trucks 10 which have a radiator fan 18, the fan draws atmospheric air through the grill 12, air conditioner condenser 14, air charge cooler 25 and/or radiator 16 in addition to air which passes across these elements as the motor vehicle moves through the atmosphere. When the motor vehicle is idling the relative face velocity of air drawn into the radiator typically ranges from about 5 to 15 mph. The radiator fan moderates the flow rate of air through radiator as the motor vehicle moves through the atmosphere. When a typical car is moving through the atmosphere at speeds approaching 70 mph, the inlet face velocity of air is at about 25 mph. Depending on the design of a motor vehicle using a radiator fan, cars have a face velocity as low as when the fan is used during idle up to about 100% of the face velocity corresponding to the velocity of the motor vehicle. However, typically, the face velocity of the air relative to the atmosphere contacting surface is equal to the idle face velocity plus from 0.1 to 1.0 and more typically 0.2 to 0.8 times the velocity of the vehicle.

In accordance with the present invention, large volumes of air can be treated at relatively low temperatures. This occurs as vehicles move through the atmosphere. High surface area components of vehicles including radiators, air conditioner condensers and charge air coolers typically have a large frontal surface area which encounters the air stream. However, these devices are relatively narrow, typically ranging from about ¾ of an inch deep up to about 2 inches deep and usually in the range of ¾ to 1 ½ inches deep. The linear velocity of the atmospheric air contacting the frontal surface of such devices is typically in the range of up to 20, and more typically 5 to 15 miles per hour. An indication of the amount of air being treated as it passes across the catalyzed vehicle component is commonly referred to space velocity or more precisely volume hourly space velocity (VHSV). This is measured as volume (corresponding to the volume of the catalyzed element) of air per hour which passes across the volume of the catalytic article. It is based on the cubic feet per hour of air divided by the cubic feet of catalyst substrate. The volume of the catalyst substrate is the frontal area times the depth or axial length in the direction of the air flow. Alternatively, volume hourly space velocity is the number of catalyst volumes based on the volume of the catalytic article being treated per hour. Because of the relatively short axial depth of the catalyzed elements of the present invention, the space velocities are relatively high. The volume hourly space velocities of air which can be treated in accordance with the present invention can be a million or more reciprocal hours. A face velocity of air against one of these elements at 5 miles per hour can result in a space velocity of as high as 300,000 reciprocal hours. In accordance with the present invention, the catalysts are designed to treat pollutants in the atmosphere at space velocities in ranges as high as from 250,000 to 750,000 and typically 300,000 to 600,000 reciprocal hours. This is accomplished even at the relatively low ambient temperatures and ambient operating temperatures of the vehicle elements containing pollutant treating compositions in accordance with the present invention.

The ambient operating temperature of the atmosphere contacting surfaces can vary depending on whether they are located in the proximity of heat sources within the vehicle or are the surfaces of elements which function to cool parts of the vehicle. However, contacting surfaces such as grill 12, wind deflector 20 are at ambient conditions. During typical operation, the means to cool operates at above ambient atmospheric temperature, with the contacting surfaces such as the surfaces of the air conditioner condenser 14, and radiator 16 and air charge cooler 25 can range up to 130° C. and typically up to 105° C. and are typically in the range of from 10° C. to 105° C., more typically from 40° C. to 100° C. and can be from 10° C. to 75° C. The air charge cooler 25 typically operates at temperatures of from 750 to 130° C. The amount of contacting surface can vary with air conditioner condensers, radiators and air charge coolers typically having from 20 to 2,000 square feet and fan blades 18 typically having from 0.2 to up to about 40 square feet when considering front and back surfaces.

The pollutant treating composition is preferably a catalytic composition or adsorption composition. Useful and preferred catalyst compositions are compositions which can catalytically cause the reaction of targeted pollutants at the space velocity of the air as it contacts the surface, and at the temperature of the surface at the point of contact. Typically, these catalyzed reactions will be in the temperature range at the atmosphere contacting surface of from 0° C. to 130° C., more typically 20° C. to 105° C. and yet more typically from about 40° C. to 100° C. There is no limit on the efficiency of the reaction as long as some reaction takes place.

Preferably, there is at least a 1% conversion efficiency with as high a conversion efficiency as possible. Useful conversion efficiencies are preferably at least about 5% and more preferably at least about 10%. Preferred conversions depend on the particular pollutant and pollutant treating composition. Where ozone is treated with a catalytic composition on an atmosphere contacting surface it is preferred that the conversion efficiency be greater than about from 30% to 40%, preferably greater than 50%, and more preferably greater than 70%. Preferred conversion for carbon monoxide is greater than 30% and preferably greater than 50%. Preferred conversion efficiency for hydrocarbons and partially oxygenated hydrocarbons is at least 10%, preferably at least 15%, and most preferably at least 25%. These conversion rates are particularly preferred where the atmosphere contacting surface is at ambient operating conditions of up to about 110° C. These temperatures are the surface temperatures typically experienced during normal operation of atmosphere contacting surfaces of the vehicle including the surfaces of the radiator and air conditioning condenser. Where there is supplemental heating of the atmosphere contacting surface such as by having an electrically heated catalytic monolith, grid, screen, gauze or the like, it is preferred that the conversion efficiency be greater than 90% and more preferably greater than 95%. The conversion efficiency is based on the mole percent of the particular pollutants in the air which react in the presence of the catalyst composition.

Ozone treating catalyst compositions comprise manganese compounds including manganese dioxide, including non stoichiometric manganese dioxide (e.g., $MnO_{(1.5-2.0)}$, and/or $Mn_2O_3$. Preferred manganese dioxides, which are nominally referred to as $MnO_2$ have a chemical formula wherein the molar ratio of manganese to oxide is about from 1.5 to 2.0, such as $Mn_8O_{16}$. Up to 100 percent by weight of manganese dioxide $MnO_2$ can be used in catalyst compositions to treat ozone. Alternative compositions which are available comprise manganese dioxide and compounds such as copper oxide alone or copper oxide and alumina.

Useful and preferred manganese dioxides are alpha manganese dioxides nominally having a molar ratio of manganese to oxygen of from 1 to 2. Useful alpha manganese dioxides are disclosed in U.S. Pat. No. 5,340,562 to O'Young, et al.; also in O'Young, Hydrothermal Synthesis of Manganese Oxides with Tunnel Structures presented at the Symposium on Advances in Zeolites and Pillared Clay Structures presented before the Division of Petroleum Chemistry, Inc. American Chemical Society New York City Meeting, Aug. 25–30, 1991 beginning at page 342, and in McKenzie, the Synthesis of Birnessite, Cryptomelane, and Some Other Oxides and Hydroxides of Manganese, Mineralogical Magazine, December 1971, Vol. 38, pp. 493–502. For the purposes of the present invention, the preferred alpha manganese dioxide is a 2×2 tunnel structure which can be hollandite ($BaMn_8O_{16} \cdot xH_2O$), cryptomelane ($KMn_8O_{16} \cdot xH_2O$), manjiroite ($NaMn_8O_{16} \cdot xH_2O$) and coronadite ($PbMn_8O_{16} \cdot xH_2O$).

The manganese dioxides of the present invention preferably have a surface area, measured by BET $N_2$ adsorption, of greater than 150 $m^2/g$, more preferably greater than 200 $m^2/g$, and more preferably greater than 220 $m^2/g$. The upper range can be as high as 300 $m^2/g$, 325 $m^2/g$ or even 350 $m^2/g$. Preferred materials are in the range of 200–350 $m^2/g$, preferably 200–275 $m^2/g$ and most preferably 220–250 $m^2/g$. The composition preferably comprises a binder as described below with preferred binders being polymeric binders. The composition can further comprise precious metal components with preferred precious metal components being the oxides of precious metal, preferably the oxides of platinum group metals and most preferably the oxides of palladium or platinum also referred to as palladium black or platinum black. The amount of palladium or platinum black can range from 0 to 25%, with useful amounts being in ranges of from about 1 to 25 and 5 to 15% by weight based on the weight of the manganese component and the precious component.

It has been found that the use of compositions comprising the cryptomelane form of alpha manganese oxide, which also contain a polymeric binder can result in greater than 50%, preferably greater than 60% and most preferably from 75–85% conversion of ozone in a concentration range of from 0 to 400 parts per billion (ppb) and an air stream moving across a radiator at space velocity of from 300,000 to 650,000 reciprocal hours. Where a portion of the cryptomelane is replaced by up to 25% and preferably from 15–25% parts by weight of palladium black (PdO), ozone conversion rates at the above conditions range from 95–100% using a powder reactor.

The preferred cryptomelane manganese dioxide has from 1.0 to 3.0 weight percent potassium, typically as $K_2O$, and a crystallite size ranging from 2 to 10 and preferably from less than 5 nm. It can be calcined at a temperature range of from 250° C. to 550° C. and preferably below 500° C. and greater than 300° C. for at least 1.5 hours and preferably at least 2 hours up to about 6 hours.

The preferred cryptomelane can be made in accordance described in the above referenced articles and patents to O'Young and McKenzie. The cryptomelane can be made by reacting a manganese salt including salts selected from the group consisting $MnCl_2$, $Mn(NO_3)_2$, $MnSO_4$ and $Mn(CH_3COO)_2$ with a permanganate compound. Cryptomelane is made using potassium permanganate; hollandite is made using barium permanganate; coronadite is made using lead permanganate; and manjiroite is made using sodium permanganate. It is recognized that the alpha manganese useful in the present invention can contain one or more of hollandite, cryptomelane, manjiroite or coronadite compounds. Even when making cryptomelane minor amounts of other metal ions such as sodium may be present. Useful methods to form the alpha manganese dioxide are described in the above references which are incorporated by reference.

The preferred alpha manganese for use in accordance with the present invention is cryptomelane. The preferred cryptomelane is "clean" or substantially free of inorganic anions, particularly on the surface. Such anions could include chlorides, sulfates and nitrates which are introduced during the method to form cryptomelane. An alternate method to make the clean cryptomelane is to react a manganese carboxylate, preferably manganese acetate, with potassium permanganate. It has been found that the use of such a material which has been calcined is "clean". The use of material containing inorganic anions can result in conversion of ozone to oxygen of up to about 60%. The use of cryptomelane with a "clean" surface results in conversions of up about 80%.

Figure 19:
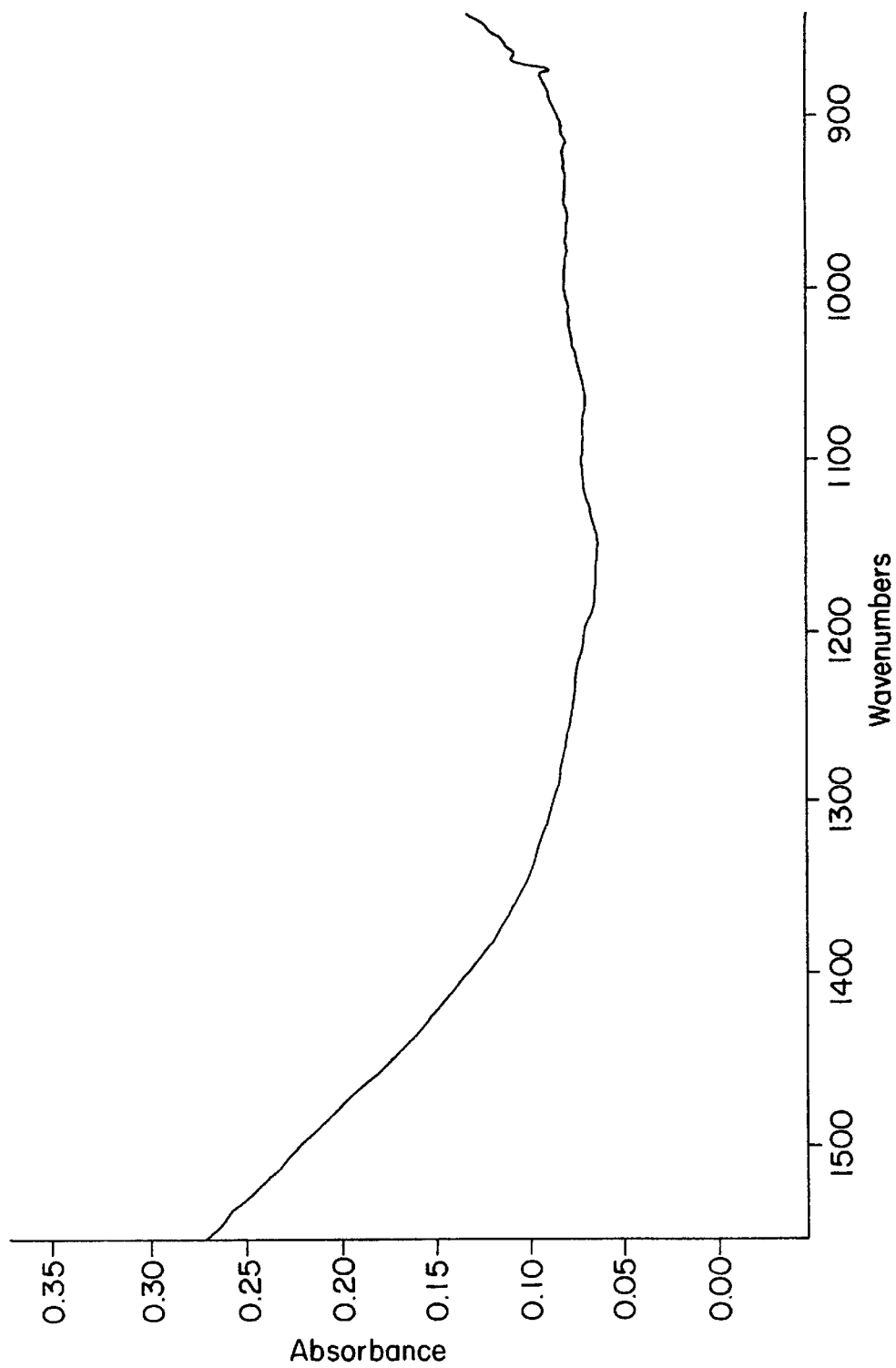
FIG. 19 is an IR spectrum for cryptomelane.
Figure 20:
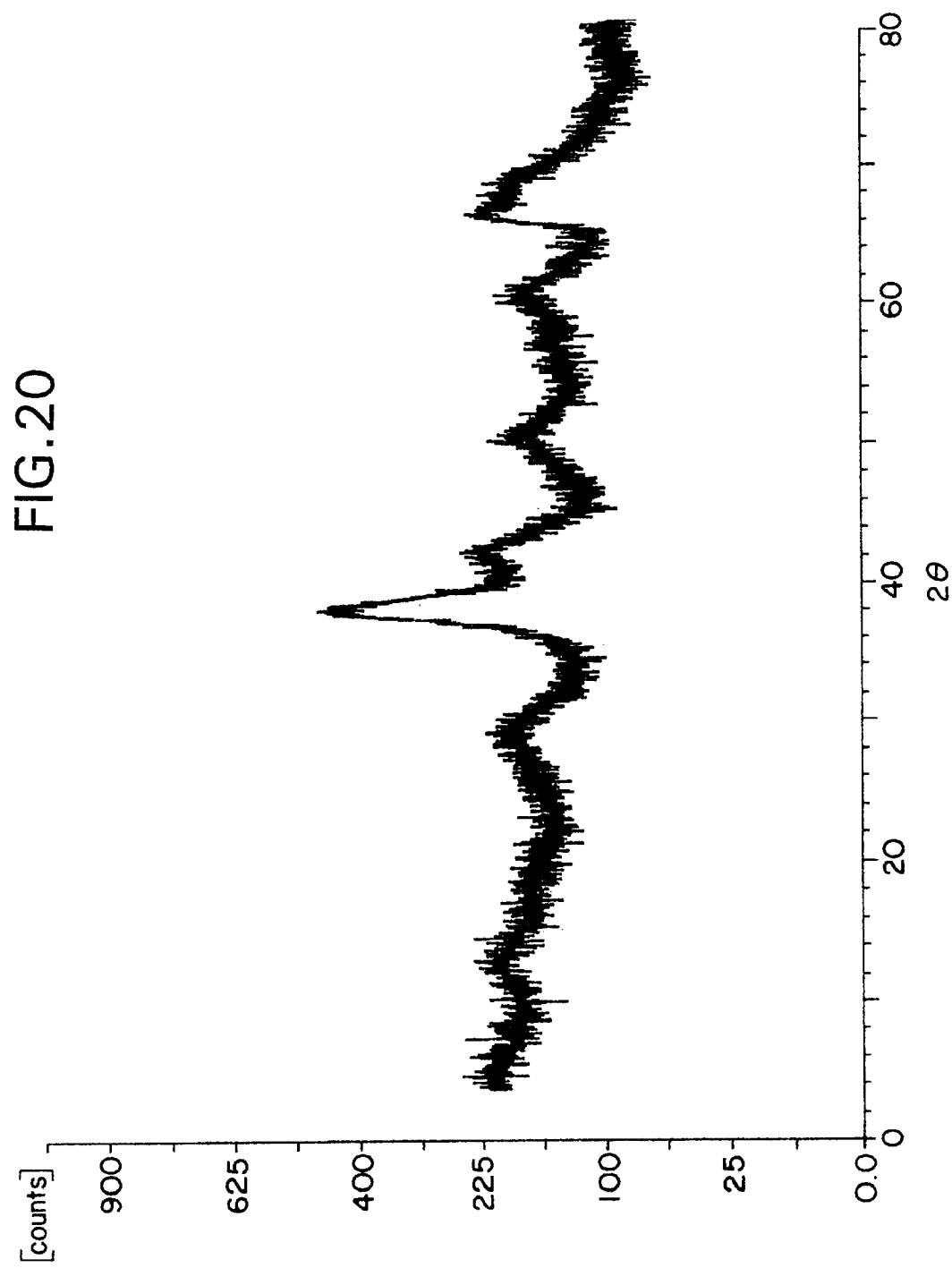
FIG. 20 is an XRD pattern for cryptomelane shown as counts using a square root scale versus the Bragg angle, 2θ.

It is believed that the carboxylates are burned off during the calcination process. However, inorganic anions remain on the surface even during calcination. The inorganic anions such as sulfates can be washed away with an aqueous solution or a slightly acidic aqueous solution. Preferably the alpha manganese dioxide is a "clean" alpha manganese dioxide. The cryptomelane can be washed at from about 60° C. to 100° C. for about one-half hour to remove a significant amount of sulfate anions. The washing also lowers the level of potassium present. The nitrate anions may be removed in a similar manner. The "clean" alpha manganese dioxide is characterized as having an IR spectrum as illustrated in FIG. 19 and in X-ray diffraction (XRD) pattern as illustrated in FIG. 20. Such a cryptomelane preferably has a surface area greater than 200 $m^2/g$ and more preferably greater than 250 $m^2/g$. A review of the IR spectrum for the most preferred cryptomelane, shown in FIG. 19 is characterized by the absence of peaks assignable to carbonate, sulfate and nitrate groups. Expected peaks for carbonate groups appear in the range of from 1320 to 1520 wavenumbers; and for sulfate groups appear in the range of from 950 to 1250 wavenumbers. FIG. 20 is a powder X-ray diffraction pattern for high surface area cryptomelane prepared in Example 23. The X-ray pattern for cryptomelane useful in the present invention is characterized by broad peaks resulting from small crystallite size (~5–10 nm). Approximate peak positions (±0.15°2θ) and approximate relative intensities (±5) for cryptomelane using $CuK_\alpha$ radiation as shown in FIG. 20 are: 2θ/Relative Intensities—12.1/9; 18/9; 28.3/10; 37.5/100; 41.8/32; 49.7/16; 53.8/5; 60.1/13; 55.7/38; and 68.0/23.

A preferred method of making cryptomelane useful in the present invention comprises mixing an aqueous acidic manganese salt solution with a potassium permanganate solution. The acidic manganese salt solution preferably has a pH of from 0.5 to 3.0 and can be made acidic using any common acid, preferably acetic acid at a concentration of from 0.5 to 5.0 normal and more preferably from 1.0 to 2.0 normal. The mixture forms a slurry which is stirred at a temperature range of from 50° C. to 110° C. The slurry is filtered and the filtrate is dried at a temperature range of from 75° C. to 200° C. The resulting cryptomelane crystals have a surface area of typically in the range of from 200 $m^2/g$ to 350 $m^2/g$.

Another useful composition comprising manganese dioxide is a composition comprising manganese dioxide and minor amounts of silica, typically up to 2%, more typically up to 1% with preferred amounts being from 0.4 to 0.8% based on the weight of the manganese dioxide and the silica. The presence of silica in the preferred amounts has been found to effect the crystalline morphology of manganese dioxide, particularly the cryptomelane form of manganese dioxide. It is speculated that the presence of minor amounts of silica, particularly in the preferred range, may provide certain advantages to the composition of the present invention. The presence of silica is believed to make the composition more hydrophobic, particularly when used as a coating on a substrate such as a coating on a radiator. Secondly, it is believed that the presence of silica in coating compositions comprising manganese dioxide increases the pH to help the compatibility of the manganese dioxide with latex binders. A preferred and useful composition for use as a coating material comprises cryptomelane and silica. Such a material comprises cryptomelane having a surface area from 200 to 340 and preferably 220 to 250 $m^2/g$, a weight percent of potassium of from 1 to 3% less than 0.1% sulphur and a measured loss on ignition of 13 to 18% by weight primarily due to moisture. The pH of the composition is about 3. Surface area is measured by a BET nitrogen adsorption and desorption test. As the amount of sulphur is reduced, the pH typically increases slightly. Additionally, typically the pH increases with the amount of potassium present with preferred amounts of potassium being from 1.2 to 2.8 weight percent.

Other useful compositions comprise manganese dioxide and optionally copper oxide and alumina and at least one precious metal component such as a platinum group metal supported on the manganese dioxide and where present copper oxide and alumina. Useful compositions contain up to 100, from 40 to 80 and preferably 50 to 70 weight percent manganese dioxide and 10 to 60 and typically 30 to 50 percent copper oxide. Useful compositions include hopcalite which is about 60 percent manganese dioxide and about 40 percent copper oxide; and Carulite® 200 (sold by Carus Chemical Co.) which is reported to have 60 to 75 weight percent manganese dioxide, 11 to 14 percent copper oxide and 15 to 16 percent aluminum oxide. The surface area of Carulite® is reported to be about 180 $m^2/g$. Calcining at 450° C. reduces the surface area of the Carulite® by about fifty percent (50%) without significantly affecting activity. It is preferred to calcine manganese compounds at from 300° C. to 500° C. and more preferably 350° C. to 450° C. Calcining at 550° C. causes a great loss of surface area and ozone treatment activity. Calcining the Carulite® after ball milling with acetic acid and coating on a substrate can improve adhesion of the coating to a substrate.

Other compositions to treat ozone can comprise a manganese dioxide component and precious metal components such as platinum group metal components. While both components are catalytically active, the manganese dioxide can also support the precious metal component. The platinum group metal component preferably is a palladium and/or platinum component. The amount of platinum group metal compound preferably ranges from about 0.1 to about 10 weight percent (based on the weight of the platinum group metal) of the composition. Preferably, where platinum is present it is in amounts of from 0.1 to 5 weight percent, with useful and preferred amounts on pollutant treating catalyst volume, based on the volume of the supporting article, ranging from about 0.5 to about 70 $g/ft^3$. The amount of palladium component preferably ranges from about 2 to about 10 weight percent of the composition, with useful and preferred amounts on pollutant treating catalyst volume ranging from about 10 to about 250 $g/ft^3$.

Various useful and preferred pollutant treating catalyst compositions, especially those containing a catalytically active component such as a precious metal catalytic component, can comprise a suitable support material such as a refractory oxide support. The preferred refractory oxide can be selected from the group consisting of silica, alumina, titania, ceria, zirconia and chromia, and mixtures thereof. More preferably, the support is at least one activated, high surface area compound selected from the group consisting of alumina, silica, titania, silica-alumina, silica-zirconia, alumina silicates, alumina zirconia, alumina-chromia and alumina-ceria. The refractory oxide can be in suitable form including bulk particulate form typically having particle sizes ranging from about 0.1 to about 100 and preferably 1 to 10 µm or in sol form also having a particle size ranging from about 1 to about 50 and preferably about 1 to about 10 nm. A preferred titania sol support comprises titania having a particle size ranging from about 1 to about 10, and typically from about 2 to 5 nm.

Also useful as a preferred support is a coprecipitate of a manganese oxide and zirconia. This composition can be made as recited in U.S. Pat. No. 5,283,041 incorporated herein by reference. Briefly, this coprecipitated support material preferably comprises in a ratio based on the weight of manganese and zirconium metals from 5:95 to 95:5; preferably 10:90 to 75:25; more preferably 10:90 to 50:50; and most preferably from 15:85 to 50:50. A useful and preferred embodiment comprises a Mn:Zr weight ratio of 20:80. U.S. Pat. No. 5,283,041 describes a preferred method to make a coprecipitate of a manganese oxide component and a zirconia component. As recited in U.S. Pat. No. 5,283,041 a zirconia oxide and manganese oxide material may be prepared by mixing aqueous solutions of suitable zirconium oxide precursors such as zirconium oxynitrate, zirconium acetate, zirconium oxychloride, or zirconium oxysulfate and a suitable manganese oxide precursor such as manganese nitrate, manganese acetate, manganese dichloride or manganese dibromide, adding a sufficient amount of a base such as ammonium hydroxide to obtain a pH of 8–9, filtering the resulting precipitate, washing with water, and drying at 450°–500° C.

A useful support for a catalyst to treat ozone is selected from a refractory oxide support, preferably alumina and silica-alumina with a more preferred support being a silica-alumina support comprising from about 1% to 10% by weight of silica and from 90% to 99% by weight of alumina.

Useful refractory oxide supports for a catalyst comprising a platinum group metal to treat carbon monoxide are selected from alumina, titania, silica-zirconia, and manganese-zirconia. Preferred supports for a catalyst composition to treat carbon monoxide is a zirconia-silica support as recited in U.S. Pat. No. 5,145,825, a manganese-zirconia support as recited in U.S. Pat. No. 5,283,041 and high surface area alumina. Most preferred for treatment of carbon monoxide is titania. Reduced catalysts having titania supports resulted in greater carbon monoxide conversion than corresponding non reduced catalysts.

The support for catalyst to treat hydrocarbons, such as low molecular weight hydrocarbons, particularly low molecular weight olefinic hydrocarbons having about from two up to about twenty carbons and typically two to about eight carbon atoms, as well as partially oxygenated hydrocarbons is preferably selected from refractory metal oxides including alumina and titania. As with catalysts to treat carbon monoxide reduced catalysts results in greater hydrocarbon conversion. Particularly preferred is a titania support which has been found useful since it results in a catalyst composition having enhanced ozone conversion as well as significant conversion of carbon monoxide and low molecular weight olefins. Also useful are high surface area, macroporous refractory oxides, preferably alumina and titania having a surface area of greater than 150 $m^2/g$ and preferably ranging from about 150 to 350, preferably from 200 to 300, and more preferably from 225 to 275 $m^2/g$; a porosity of greater than 0.5 cc/g, typically ranging from 0.5 to 4.0 and preferably about from 1 to 2 cc/g measured based on mercury porosometry; and particle sizes range from 0.1 to 10 µm. A useful material is Versal GL alumina having a surface area of about 260 $m^2/g$, a porosity of 1.4 to 1.5 cc/g and supplied by LaRoche Industries.

A preferred refractory support for platinum group metals, preferably platinum and/or palladium for use in treating carbon monoxide and/or hydrocarbons is titania dioxide. The titania can be used in bulk powder form or in the form of titania dioxide sol. Also useful is nano particle size (nanometer) titania. The catalyst composition can be prepared by adding a platinum group metal in a liquid media preferably in the form of a solution such as platinum nitrate with the titania sol, with the sol most preferred. The obtained slurry can then be coated onto a suitable substrate such as an atmosphere treating surface such as a radiator, metal monolith substrate or ceramic substrate. The preferred platinum group metal is a platinum compound. The platinum titania sol catalyst obtained from the above procedure has high activity for carbon monoxide and/or hydrocarbon oxidation at ambient operating temperature. Metal components other than platinum components which can be combined with the titania sol include gold, palladium, rhodium, silver components and mixtures thereof. A reduced platinum group component, preferably a platinum component on titanium catalyst which is indicated to be preferred for treating carbon monoxide, has also been found to be useful and preferred for treating hydrocarbons, particularly olefinic hydrocarbons.

A preferred titania sol support comprises titania having a particle size ranging from about 1 to about 10, and typically from about 2 to 5 nm.

A preferred bulk titania has a surface area of about from 25 to 120 $m^2/g$, and preferably from 50 to 100 $m^2/g$; and a particle size of about from 0.1 to 10 $\mu m$. A specific and preferred bulk titania support has a surface area of 45–50 $m^2/g$, a particle size of about 1 $\mu m$, and is sold by DeGussa as P-25. Useful nano particle size titanium comprises having a particle size ranging from about 5 to 100 and typically greater 10 to about 50 nm.

A preferred silica-zirconia support comprises from 1 to 10 percent silica and 90 to 99 percent zirconia. Preferred support particles have high surface area, e.g. from 100 to 500 square meters per gram ($m^2/g$) surface area, preferably from 150 to 450 $m^2/g$, more preferably from 200 to 400 $m^2/g$, to enhance dispersion of the catalytic metal component or components thereon. The preferred refractory metal oxide support also has a high porosity with pores of up to about 145 nm radius, e.g., from about 0.75 to 1.5 cubic centimeters per gram ($cm^3/g$), preferably from about 0.9 to 1.2 $cm^3/g$, and a pore size range of at least about 50% of the porosity being provided by pores of 5 to 100 nm in radius.

A useful ozone treating catalyst comprises at least one precious metal component, preferably a palladium component dispersed on a suitable support such as a refractory oxide support. The composition comprises from 0.1 to 20.0 weight percent, and preferably 0.5 to 15 weight percent of precious metal on the support, such as a refractory oxide support, based on the weight of the precious metal (metal and not oxide) and the support. Palladium is preferably used in amounts of from 2 to 15, more preferably 5 to and yet more preferably 8 to 12 weight percent. Platinum is preferably used at 0.1 to 10, more preferably 0.1 to 5.0, and yet more preferably 2 to 5 weight percent. Palladium is most preferred to catalyze the reaction of ozone to form oxygen. The support materials can be selected from the group recited above. In preferred embodiments, there can additionally be a bulk manganese component as recited above, or a manganese component dispersed on the same or different refractory oxide support as the precious metal, preferably palladium component. There can be up to 80, preferably up to 50, more preferably from 1 to 40 and yet more preferably 5 to 35 weight percent of a manganese component based on the weight of palladium and manganese metal in the pollutant treating composition. Stated another way, there is preferably about 2 to 30 and preferably 2 to 10 weight percent of a manganese component. The catalyst loading is from 20 to 250 grams and preferably about 50 to 250 grams of palladium per cubic foot ($g/ft^3$) of catalyst volume. The catalyst volume is the total volume of the finished catalyst composition and therefore includes the total volume of air conditioner condenser or radiator including void spaces provided by the gas flow passages. Generally, the higher loading of palladium results in a greater ozone conversion, i.e., a greater percentage of ozone decomposition in the treated air stream.

Conversions of ozone to oxygen attained with a palladium/manganese catalyst on alumina support compositions at a temperature of about 40° C. to 50° C. have been about 50 mole percent where the ozone concentrations range from 0.1 to 0.4 ppm and the face velocity was about 10 miles per hour. Lower conversions were attained using a platinum on alumina catalyst.

Of particular interest is the use of a support comprising the above described coprecipitated product of a manganese oxide, and zirconia which is used to support a precious metal, preferably selected from platinum and palladium, and most preferably platinum. Platinum is of particular interest in that it has been found that platinum is particularly effective when used on this coprecipitated support. The amount of platinum can range from 0.1 to 6, preferably 0.5 to 4, more preferably 1 to 4, and most preferably 2 to 4 weight percent based on metallic platinum and the coprecipitated support. The use of platinum to treat ozone has been found to be particularly effective on this support. Additionally, as discussed below, this catalyst is useful to treat carbon monoxide. Preferably the precious metal is platinum and the catalyst is reduced.

Other useful catalysts to catalytically convert ozone to oxygen are described in U.S. Pat. Nos. 4,343,776 and 4,405,507, both hereby incorporated by reference. A useful and most preferred composition is disclosed in commonly assigned U.S. Ser. No. 08/202,397 filed Feb. 25, 1994, now U.S. Pat. No. 5,422,331 and entitled, "Light Weight, Low Pressure Drop Ozone Decomposition Catalyst for. Aircraft Applications" hereby incorporated by reference. Yet other compositions which can result in the conversion of ozone to oxygen comprises carbon, and palladium or platinum supported on carbon, manganese dioxide, Carulite®, and/or hopcalite. Manganese supported on a refractory oxide such as recited above has also been found to be useful.

Carbon monoxide treating catalysts preferably comprise at least one precious metal component, preferably selected from platinum and/or palladium components with platinum components being most preferred. A combination of a platinum component and a palladium component results in improved CO conversion at an increase in cost and is most preferred where greater conversion is desired and cost increase is acceptable. The composition comprises from 0.01 to 20 weight percent, and preferably 0.5 to 15 weight percent of the precious metal component on a suitable support such as refractory oxide support, with the amount of precious metal being based on the weight of precious metal (metal and not the metal component) and the support. Platinum is most preferred and is preferably used in amounts of from 0.01 to 10 weight percent and more preferably 0.1 to 5 weight percent, and most preferably 1.0 to 5.0 weight percent. Palladium is useful in amounts from 2 to 15, preferably 5 to 15 and yet more preferably 8 to 12 weight percent. The preferred support is titania, with titania sol most preferred as recited above. When loaded onto a monolithic structure such as a radiator or onto other atmosphere contacting surfaces the catalyst loading is preferably about 1 to 150, and more preferably 10 to 100 grams of platinum per cubic foot ($g/ft^3$) of catalyst volume and/or 20 to 250 and preferably 50 to 250 grams of palladium per $g/ft^3$ of catalyst volume. When platinum and palladium are used in combination, there is from about 25 to 100 $g/ft^3$ of platinum and 50 to 250 g/ft 3of palladium. A preferred composition comprises about 50 to 90 $g/ft^3$ of platinum and 100 to 225 $g/ft^3$ of palladium. Preferred catalysts are reduced. Conversions of 5 to 80 mole percent of carbon monoxide to carbon dioxide were attained using coated core samples from automotive radiator having from 1 to 6 weight percent (based on metal) of platinum on titania compositions at temperatures from 25° to 90° C. where the carbon monoxide concentration was 15 to 25 parts per million and the space velocity was 300,000 to 500,000 reciprocal hours. Also, conversions of 5 to 65 mole percent of carbon monoxide to carbon dioxide were attained using 1.5 to 4.0 weight percent platinum on alumina support compositions at a temperature of about up to 95° C. where the carbon monoxide concentration was about 15 parts per million and the space velocity was about 300,000 reciprocal hours. Lower conversions have been attained with palladium on a ceria support.

An alternate and preferred catalyst composition to treat carbon monoxide comprises a precious metal component supported on the above described coprecipitate of a manganese oxide and zirconia. The coprecipitate is formed as described above. The preferred ratios of manganese to zirconia are 5:95 to 95:5; 10:90 to 75:25; 10:90 to 50:50; and 15:85 to 25:75 with a preferred coprecipitate having a manganese oxides to zirconia of 20:80. The percent of platinum supported on the coprecipitate based on platinum metal ranges from 0.1 to 6, preferably 0.5 to 4, more preferably 1 to 4, and most preferably 2–4 weight percent. Preferably the catalyst is reduced. The catalyst can be reduced in powder form or after it has been coated onto a supporting substrate. Other useful compositions which can convert carbon monoxide to carbon dioxide include a platinum component supported on carbon or a support comprising manganese dioxide.

Catalysts to treat hydrocarbons, typically unsaturated hydrocarbons, more typically unsaturated mono-olefins having from two to about twenty carbon atoms and, in particular, from two to eight carbon atoms, and partially oxygenated hydrocarbons of the type referred to above, comprise at least one precious metal component, preferably selected from platinum and palladium with platinum being most preferred. A combination of a platinum component and a palladium component results in improved hydrocarbons conversion at an increase in cost and is most preferred where greater conversion is desired and cost increase is acceptable. Useful catalyst compositions include those described for use to treat carbon monoxide. Composition to treat hydrocarbons comprise from 0.01 to 20 wt. % and preferably 0.5 to 15 wt. % of the precious metal component on a suitable support such as a refractory oxide support, with the amount of precious metal being based on the weight of the precious metal, (not the metal component) and the support. Platinum is the most preferred and is preferably used in amounts of from 0.01 to 10 wt. % and more preferably 0.1 to 5 wt. % and most preferably 1.0 to 5 wt. %. When loaded onto a monolithic structure such as a motor vehicle radiator or on to other atmospheric contacting surfaces, the catalyst loading is preferably about 1 to 150, and more preferably 10 to 100 grams of platinum per cubic foot ($g/ft^3$) of catalyst volume. When platinum and palladium are used in combination, there is from about 25 to 100 $g/ft^3$ of platinum and 50 to 250 $g/ft^3$ of palladium. A preferred composition comprises about 50 to 90 $g/ft^3$ of platinum and 100 to 225 $g/ft^3$ of palladium. The preferred refractory oxide support is a metal oxide refractory which is preferably selected from ceria, silica, zirconia, alumina, titania and mixtures thereof with alumina and titania being most preferred. The preferred titania is characterized by as recited above with titania sol most preferred. The preferred catalyst is reduced. Testing on a coated automotive radiator resulted in conversions of a low molecular weight mono-olefin such as propylene to water and carbon dioxide with 1.5 to 4 wt. % of platinum on an alumina or titania support have been between 15 and 25% where the propylene concentration was about 10 parts per million propylene and the space velocity was about 320,000 reciprocal hours. These catalysts were not reduced. Reduction of the catalyst improves conversion.

Catalysts useful for the oxidation of both carbon monoxide and hydrocarbons generally include those recited above as useful to treat either carbon monoxide or hydrocarbons. Most preferred catalysts which have been found to have good activity for the treatment of both carbon monoxide and hydrocarbon such as unsaturated olefins comprise platinum component supported on a preferred titania support. The composition preferably comprises a binder and can be coated on a suitable support structure in amounts of from 0.8 to 1.0 g/in. A preferred platinum concentration ranges from 2 to 6% and preferably 3 to 5% by weight of platinum metal on the titania support. Useful and preferred substrate cell densities are equivalent to about 300 to 400 cells per square inch. The catalyst is preferably reduced as a powder or on the coated article using a suitable reducing agent. Preferably the catalyst is reduced in the gas stream comprising about 7% hydrogen with the balance nitrogen at from 200° to 500° C. or from 1 to 12 hours. The most preferred reduction or forming temperature is 400° C. for 2–6 hours. This catalyst has been found to maintain high activity in air and humidified air at elevated temperatures of up to 100° C. after prolonged exposure.

Useful catalysts which can treat both ozone and carbon monoxide comprise at least one precious metal component, most preferably a precious metal selected from palladium, platinum and mixtures thereof on a suitable support such as a refractory oxide support. A combination of a platinum component and a palladium component results in improved Co conversion at an increase in cost and is most preferred where greater conversion is desired and cost increase is acceptable. Useful refractory oxide supports comprise ceria, zirconia, alumina, titania, silica and mixtures thereof including a mixture of zirconia and silica as recited above. Also useful and preferred as a support are the above described coprecipitates of manganese oxides and zirconia. The composition comprises from 0.1 to 20.0, preferably 0.5 to 15, and more preferably from 1 to 10 weight percent of the precious metal component on the support based on the weight of the precious metal and the support. Palladium is preferably used in amounts from 2 to and more preferably from 3 to 8 weight percent. Platinum is preferably used in amounts of from 0.1 to 6 percent and more preferably 2 to 5 weight percent. A preferred composition is a composition wherein the refractory component comprises ceria and the precious metal component comprises palladium. This composition has resulted in relatively high ozone and carbon monoxide conversions. More particularly, testing of this composition on a coated radiator has resulted in a 21% conversion of carbon monoxide in an air stream comprising 16 ppm of carbon monoxide contacting a surface at 95° C. with a face velocity of the gas stream being 5 miles per hour. The same catalyst resulted in a 55% ozone conversion where the stream contained 0.25 ppm of ozone and the treating surface was at 25° C. with an air stream face velocity of 10 miles per hour. Also preferred is a composition comprising a precious metal, preferably a platinum group metal, more preferably selected from platinum and palladium components, and most preferably a platinum component and the above recited coprecipitate of manganese oxide and zirconia. This above recited precious metal containing catalyst in the form of a catalyst powder or coating on a suitable substrate is in reduced form. Preferred reduction conditions include those recited above with the most preferred condition being from 250° to 350° C. for from 2 to 4 hours in a reducing gas comprising 7% hydrogen and 93% nitrogen.

This catalyst has been found to be particularly useful in treating both carbon monoxide and ozone. Other useful compositions to convert ozone to oxygen and carbon monoxide to carbon dioxide comprise a platinum component supported on carbon, manganese dioxide, or a refractory oxide support, and optionally having an additional manganese component.

A useful and preferred catalyst which can treat ozone, carbon monoxide and hydrocarbons, as well as partially oxygenated hydrocarbons, comprises a precious metal component, preferably a platinum component on a suitable support such as a refractory oxide support. A combination of a platinum component and a palladium component results in improved Co conversion at an increase in cost and is most preferred where greater conversion is desired and cost increase is acceptable. Useful refractory oxide supports comprise ceria, zirconia, alumina, titania, silica and mixtures thereof including a mixture of zirconia and silica as recited above. Also useful is a support including the above-recited coprecipitate of manganese oxide and zirconia. The composition comprises from 0.1 to 20, preferably 0.5 to 15 and more preferably 1 to 10 wt. % of the precious metal component on the refractory support based on the weight of the precious metal and the support. Where the hydrocarbon component is sought to be converted to carbon dioxide and water, platinum is the most preferred catalyst and is preferably used in amounts of from 0.1 to 5% and more preferably 2 to 5% by weight.

In specific embodiments, there can be a combination of catalysts including the above recited catalyst as well as a catalyst which is particularly preferred for the treatment of ozone such as a catalyst comprising a manganese component. The manganese component can be optionally combined with a platinum component. The manganese and platinum can be on the same or different supports. There can be up to 80, preferably up to 50, more preferably from 1 to 40 and yet more preferably from 10 to 35 wt. % of the manganese component based on the weight of the precious metal and manganese in the pollutant treating composition. The catalyst loading is the same at that recited above with regard to the ozone catalyst. A preferred composition is a composition wherein the refractory component comprises an alumina or titania support and the precious metal component comprises a platinum component. Testing of such a composition coated onto a radiator has resulted in 68 to 72% conversion of carbon monoxide, 8 to 15% conversion of ozone and 17 to 18% conversion of propylene when contacting a surface at 95° C. with a face velocity of the gas stream being about ten miles per hour (hourly space velocity of 320,000 per reciprocal hours) with air dew point at 35° F. Generally, as the contacting surface temperature decreases and the space velocity or face velocity of the atmosphere air flow over the pollutant contacting surface increases, the percent conversion decreases.

Catalyst activity, particularly to treat carbon monoxide and hydrocarbons can be further enhanced by reducing the catalyst in a forming gas such as hydrogen, carbon monoxide, methane or hydrocarbon plus nitrogen gas. Alternatively, the reducing agent can be in the form of a liquid such as a hydrazine, formic acid, and formate salts such as sodium formate solution. The catalyst can be reduced as a powder or after coating onto a substrate. The reduction can be conducted in gas at from $150°-500°$ C., preferably $200°-400°$ C. for 1 to 12 hours, preferably 2 to 8 hours. In a preferred process, coated article or powder can be reduced in a gas comprising 7% hydrogen in nitrogen at $275°-350°$ C. for 2 to 4 hours.

An alternate composition for use in the method and apparatus of the present invention comprises a catalytically active material selected from the group consisting of precious metal components including platinum group metal components, gold components and silver components and a metal component selected from the group consisting of tungsten components and rhenium components. The relative amounts of catalytically active material to the tungsten component and /or rhenium component based on the weight of the metal are from 1 to 25, to 15 to 1.

The composition containing a tungsten component and/or a rhenium component preferably comprises tungsten and/or rhenium in the oxide form. The oxide can be obtained by forming the composition using tungsten or rhenium salts and the composition can subsequently be calcined to form tungsten and/or rhenium oxide. The composition can comprise further components such as supports including refractory oxide supports, manganese components, carbon, and coprecipitates of a manganese oxide and zirconia. Useful refractory metal oxides include alumina, silica, titania, ceria, zirconia, chromia and mixtures thereof. The composition can additionally comprise a binder material, such as metal sols including alumina or titania sols or polymeric binder which can be provided in the form of a polymeric latex binder.

In preferred compositions, there are from 0.5 to 15, preferably 1 to 10, and most preferably from 3 to 5 percent by weight of the catalytically active material. The preferred catalytically active materials are platinum group metals with platinum and palladium being more preferred and platinum being most preferred. The amount of tungsten and/or rhenium component based on the metals ranges 1 to 25, preferably 2 to 15 and most preferably 3 to 10 weight percent. The amount of binder can vary from 0 to 20 weight percent, preferably 0.5 to 20, more preferably 2 to 10 and most preferably 2 to 5 weight percent. Depending on the support material a binder is not necessary in this composition. Preferred compositions comprise from 60 to 98.5 weight percent of a refractory oxide support, from 0.5 to 15 weight percent of the catalytically active material, from 1 to 25 weight of the tungsten and/or rhenium component, and from 0 to 10 weight percent binder.

Compositions containing the tungsten component and rhenium component can be calcined under conditions as recited above. Additionally, the composition can be reduced. However, as shown in the examples below, the compositions need not be reduced and the presence of the tungsten and/or rhenium component can result in conversions of carbon monoxide and hydrocarbons comparable to compositions containing platinum group metals which have been reduced.

The pollutant treating compositions of the present invention preferably comprise a binder which acts to adhere the composition and to provide adhesion to the atmosphere contacting surface. It has been found that a preferred binder is a polymeric binder used in amounts of from 0.5 to 20, more preferably 2 to 10, and most preferably to 2 to 5 percent by weight of binder based on the weight of the composition. Preferably, the binder is a polymeric binder which can be a thermosetting or thermoplastic polymeric binder. The polymeric binder can have suitable stabilizers and age resistors known in the polymeric art. The polymer can be a plastic or elastomeric polymer. Most preferred are thermosetting, elastomeric polymers introduced as a latex into the catalyst into a slurry of the catalyst composition, preferably an aqueous slurry. Upon application of the composition and heating the binder material can crosslink providing a suitable support which enhances the integrity of the coating, its adhesion to the atmosphere contacting surface and provides structural stability under vibrations encountered in motor vehicles. The use of preferred polymeric binder enables the pollutant treating composition to adhere to the atmosphere contacting surface without the necessity of an undercoat layer. The binder can comprise water resistant additives to improve water resistance and improve adhesion. Such additives can include fluorocarbon emulsions and petroleum wax emulsions.

Useful polymeric compositions include polyethylene, polypropylene, polyolefin copolymers, polyisoprene, polybutadiene, polybutadiene copolymers, chlorinated rubber, nitrile rubber, polychloroprene, ethylene-propylene-diene elastomers, polystyrene, polyacrylate, polymethacrylate, polyacrylonitrile, poly(vinyl esters), poly (vinyl halides), polyamides, cellulosic polymers, polyimides, acrylics, vinyl acrylics and styrene acrylics, poly vinyl alcohol, thermoplastic polyesters, thermosetting polyesters, poly(phenylene oxide), poly(phenylene sulfide), fluorinated polymers such as poly(tetrafluoroethylene) poly-vinylidene fluoride, poly(vinylfluoride) and chloro/fluoro copolymers such as ethylene chlorotrifluoroethylene copolymer, polyamide, phenolic resins and epoxy resins, polyurethane, and silicone polymers. A most preferred polymeric material is an acrylic polymeric latex as described in the accompanying examples.

Particularly preferred polymers and copolymers are vinyl acrylic polymers and ethylene vinyl acetate copolymers. A preferred vinyl acrylic polymer is a cross linking polymer sold by National Starch and Chemical Company as Xlink 2833. It is described as a vinyl acrylic polymer having a Tg of −15° C., 45% solids, a pH of 4.5 and a viscosity of 300 cps. In particular, it is indicated to have vinyl acetate CAS No. 108-05-4 in a concentration range of less than 0.5 percent. It is indicated to be a vinyl acetate copolymer. Other preferred vinyl acetate copolymers which are sold by the National Starch and Chemical Company include Dur-O-Set E-623 and Dur-O-Set E-646. Dur-O-Set E-623 is indicated to be ethylene vinyl acetate copolymers having a Tg of 0° C., 52% solids, a pH of 5.5 and a viscosity of 200 cps. Dur-O-Set E-646 is indicated to be an ethylene vinyl acetate copolymer with a Tg of −12° C., 52% solids, a pH of 5.5 and a viscosity of 300 cps. A useful and preferred binder is a crosslinking acrylic copolymer sold by National Starch and Chemical Company as X-4280. It is described as a milk white aqueous emulsion having a pH of 2.6; a boiling point of 212° F., a freezing point of 32° F.; a specific gravity of 1.060; a viscosity of 100 cps.

An alternate and useful binding material is the use of a zirconium compound. Zirconyl acetate is preferred zirconium compound used. It is believed that zirconia acts as a high temperature stabilizer, promotes catalytic activity, and improves catalyst adhesion. Upon calcination, zirconium compounds such as zirconyl acetate are converted to $ZrO_2$ which is believed to be the binding material. Various useful zirconium compounds include acetates, hydroxides, nitrates, etc. for generating $ZrO_2$ in catalysts. In the case of using zirconyl acetate as a binder for the present catalysts, $ZrO_2$ will not be formed unless the radiator coating is calcined. Since good adhesion has been attained at a "calcination" temperature of only 120° C., it is believed that the zirconyl acetate has not decomposed to zirconium oxide but instead has formed a cross linked network with the pollutant treating material such as Carulite® particles and the acetates which were formed from ball milling with acetic acid. Accordingly, the use of any zirconium containing compounds in the present catalysts are not restricted only to zirconia. Additionally, the zirconium compounds can be used with other binders such as the polymeric binder recited above.

An alternate pollutant treating catalyst composition can comprise activated carbon composition. The carbon composition comprises activated carbon, a binder, such as a polymeric binder, and optionally conventional additives such as defoamers and the like. A useful activated carbon composition comprises from 75 to 85 weight percent activated carbon such as "coconut shell" carbon or carbon from wood and a binder such as an acrylic binder with a defoamer. Useful slurries comprise from 10 to 50 weight percent solids. The activated carbon can catalyze reduction of ozone to oxygen, as well as adsorb other pollutants.

Pollutant treating catalyst compositions of the present invention can be prepared in any suitable process. A preferred process is disclosed in U.S. Pat. No. 4,134,860 herein incorporated by reference. In accordance with this method, the refractory oxide support such as activated alumina, titania or activated silica alumina is jet milled, impregnated with a catalytic metal salt, preferably precious metal salt solution and calcined at a suitable temperature, typically from about 300° C. to about 600° C., preferably from about 350° C. to about 550° C., and more preferably from about 400° C. to about 500° C. for from about 0.5 to about 12 hours. Palladium salts are preferably a palladium nitrate or a palladium amine such as palladium tetraamine acetate, or palladium tetraamine hydroxide. Platinum salts preferably include platinum hydroxide solubilized in an amine. In specific and preferred embodiments the calcined catalyst is reduced as recited above.

In an ozone treating composition, a manganese salt, such as manganese nitrate, can then be mixed with the dried and calcined alumina supported palladium in the presence of deionized water. The amount of water added should be an amount up to the point of incipient wetness. Reference is made to the method reviewed in the above referenced and incorporated U.S. Pat. No. 4,134,860. The point of incipient wetness is the point at which the amount of liquid added is the lowest concentration at which the powdered mixture is sufficiently dry so as to absorb essentially all of the liquid. In this way a soluble manganese salt such as $Mn(NO_3)_2$ in water can be added into the calcined supported catalytic precious metal. The mixture is then dried and calcined at a suitable temperature, preferably 400 to 500° C. for about 0.5 to about 12 hours.

Alternatively, the supported catalytic powder (i.e., palladium supported on alumina) can be combined with a liquid, preferably water, to form a slurry to which a solution of a manganese salt, such as $Mn(NO_3)_2$ is added. Preferably, the manganese component and palladium supported on a refractory support such as activated alumina, more preferably activated silica-alumina is mixed with a suitable amount of water to result in a slurry having from 15 to 40% and preferable 20 to 35 weight percent solids. The combined mixture can be coated onto a carrier such as a radiator and the radiator dried in air at suitable conditions such as 50° C. to 150° C. for 1 to 12 hours. The substrate which supports the coating can then be heated in an oven at suitable conditions typically from 300° C. to 550° C., preferably 350° C. to 500° C., more preferably 350° C. to 450° C. and most preferably from 400° C. and 500° C. in an oxygen containing atmosphere, preferably air for about 0.5 to about 12 hours to calcine the components and help to secure the coating to the substrate atmosphere contacting surface. Where the composition further comprises a precious metal component, it is preferably reduced after calcining.

A method of the present invention includes forming a mixture comprising a catalytically active material selected from at least one platinum group metal component, a gold component, a silver component, a manganese component and mixtures thereof and water. The catalytically active material can be on a suitable support, preferably a refractory oxide support. The mixture can be milled, and then optionally be calcined and reduced when using precious metal catalytic material. The calcining step can be conducted prior to milling and adding the polymeric binder. It is also preferred to reduce the catalytically active material prior to milling, calcining and adding the polymeric binder. The slurry comprises a carboxylic acid compound or polymer containing carboxylic acid groups or derivatives thereof in an amount to result in a pH of about from 3 to 7, typically 3 to 6. Preferably the acid comprises from 0.5 to 15 weight percent of glacial acetic acid based on the weight of the catalytically active material and acetic acid. The amount of water can be added as suited to attain a slurry of the desired solids concentration and/or viscosity. The percent solids are typically 20 to 50 and preferably 30 to 40 percent by weight. The preferred vehicle is deionized water (D.I.). The acetic acid can be added upon forming the mixture of the catalytically active material, which may have been calcined, with water. Alternatively, the acetic acid can be added with the polymeric binder. A preferred composition to treat ozone using manganese dioxide as the catalyst can be made using about 1,500 g of manganese dioxide which is mixed with 2,250 g of deionized water and 75 g of acetic acid. The mixture is combined in a 1 gallon ballmill and ballmilled for about 4 hours until approximately 90% of the particles are less than 8 micrometers. The ballmill is drained and 150 g of polymeric binder is added. The mixture is then blended on a rollmill for 30 minutes. The resulting mixture is ready for coating onto a suitable substrate such as an automobile radiator according to the methods described below.

It has been found that compatibility of the components of a slurry comprising a catalytic material and a polymeric binder, such as a latex emulsion, is desirable to maintain slurry stability and uniformity. For the purpose of the present invention compatibility means that the binder and the catalytic material remain as a mixture of separate particles in the slurry. It is believed that where the polymeric binder is a latex emulsion and the catalytic material have electrical charges which cause them to repel each other, they are compatible and the slurry is stable and has a uniform distribution of the catalytic material and the polymer latex in the liquid vehicle, e.g. aqueous fluid such as water. If the catalytic material and latex emulsion particles do not mutually repel each other, irreversible agglomeration of the latex on the catalytic material will occur. These materials are therefore incompatible and the latex comes out of the emulsion.

Compatibility of a high surface area catalyst with the organic latex binder is a key property in preparing a stable, uniform slurry. If the catalyst and latex emulsion particles do not mutually repel each other, irreversible agglomeration will occur. The result of this will be an unstable, non-uniform slurry which will produce a poorly adherent coating. Although the mutual repulsion of the catalyst and binder particles is controlled by a variety physical factors, surface charge plays a key role. Since latex emulsion particles are typically negatively charged, catalyst particles must be similarly charged. Zeta potential measurements have shown, however, that catalyst particles, such as $MnO_2$ are only slightly negatively or even positively charged, and as a result, irreversible coagulation of the catalyst and latex occurs (i.e. catalyst and latex are not compatible). It has been found that although the above described method of adding acetic acid provides certain advantages to the slurries of the present invention, such as viscosity control, it does not enhance compatibility and may even be detrimental to aged slurry stability.

Where the catalytically material is positively or slightly negatively charged, improved compatibility can be achieved by making the slurry more basic. The pH of the slurry can be controlled depending on the acidity of the catalytic material, with preferred pH levels being at least 6, preferably at least 7, more preferably at least 8.5. Generally, the slurry should not be too caustic and a preferred upper limit is about 11. A preferred range is from 8.5 to 11.

Maintaining a pH≧8.5 of a slurry comprising a latex emulsion and $MnO_2$(cryptomelane) is critical. If the pH drops below 8.5 for an extended period of time (days), the binder and catalyst will irreversibly coagulate. Despite the large negative charge on the cryptomelane particles at this pH, long term stability of cryptomelane containing slurries has been difficult to achieve. Preferred binders are poly (acrylic) acid derivative based binders with a particularly preferred binder which has long term stability under these conditions being an acrylic latex sold by National Starch as x-4280 acrylic latex. The difficulty in achieving long term compatibility even with basic slurries containing negatively charged latex and catalyst particles indicates that although surface charge is important, it is not the only factor in determining binder/catalyst compatibility. Other factors which play a role include emulsion particle size, surfactant package, etc. The present method involves raising the pH of the ball milled catalyst slurry to pH≧8.5 and preferably 9 to enhance stability.

An alternative method to enhance slurry stability involves adding a surfactant such as a polymeric dispersant to the slurry instead of or in addition to increasing the pH. In the second case, binder/catalyst compatibility is achieved by adding a polymeric acrylate derived dispersant (ca. 3% solids basis) instead of increasing the pH. The result is the same, however, in that the catalyst particle is given a large negative charge which can repel the like charged latex particles. The dispersant can be added during the ball milling operation or after. Despite generating a large negative charge on the catalyst particles, not all dispersants work equally as well. Preferred dispersants comprise polymers containing carboxylic acid groups or derivatives thereof such as esters and salts. Preferred dispersants include Accusol 445 (from Rohm & Haas) and Colloid 226/35 (from Rhone-Poulenc). Useful dispersants and a review of dispersion technology are presented in, *Additives for Dispersion* Technology, published by Rhone-Poulenc, Surfactants & Specialties hereby incorporated by reference. Useful polymeric dispersants include but are not limited to polyacrylic acid partial sodium salts and anionic copolymer sodium salts sold by Rhone-Poulenc as Colloid™ polymeric dispersants. Again, although surface charge is an important factor in determining catalyst/binder compatibility, it is not the only factor. In general, the dispersant (particularly Colloid 226) does a good job of stabilizing the slurry since a greater variety of latex binders (e.g. acrylics, styrene acrylics, and EVA's) are compatible. Long term compatibility problems may be addressed by increasing the quantity of dispersant, raising the pH somewhat, or both.

The above recited methods enhance compatibility and result in a stable catalyst slurry. Both methods generate a large negative surface charge on the catalyst particle which in turn stabilizes the catalyst in the presence of the like charged (anionic) latex emulsion particles. For both systems, good adhesion has been observed(i.e. catalyst cannot be wiped off the face of a coated monolith) with a 10% by weight loading (solids basis) of the polymeric binder. At 5%, adhesion is not as good, so the optimum loading is probably somewhere in between.

While these methods have been shown to enhance compatability of $MnO_2$/latex slurries, the present invention is not limited to systems using negatively charged latex emulsions. Those skilled in the art will understand that slurry compatability can likewise be achieved using cationic latex emulsions, using cationic surfactant and/or dispersant packages to stabilize the catalyst particles.

The polymeric slurries of the present, particularly polymer latex slurries, can contain conventional additives such as thickeners, biocides, antioxidants and the like.

The pollutant treating composition can be applied to the atmosphere contacting vehicle surface by any suitable means such as spray coating, powder coating, or brushing or dipping the surface into a catalyst slurry.

The atmosphere contacting surface is preferably cleaned to remove surface dirt, particularly oils which could result in poor adhesion of the pollutant treating composition to the surface. Where possible, it is preferred to heat the substrate on which the surface is located to a high enough temperature to volatilize or burn off surface debris and oils.

Where the substrate on which there is an atmosphere contacting surface is made of a material which can withstand elevated temperatures such as an aluminum radiator, the substrate surface can be treated in such a manner as to improve adhesion to the catalyst composition, preferably the ozone carbon monoxide, and/or hydrocarbon catalyst composition. One method is to heat the aluminum substrate such as the radiator to a sufficient temperature in air for a sufficient time to form a thin layer of aluminum oxide on the surface. This helps clean the surface by removing oils which may be detrimental to adhesion. Additionally, if the surface is aluminum a sufficient layer of oxidized aluminum has been found to be able to be formed by heating the radiator in air for from 0.5 to 24 hours, preferably from 8 to 24 hours and more preferably from 12 to hours at from 350° C. to 500° C., preferably from 400 to 500° C. and more preferably 425 to 475° C. In some cases, sufficient adhesion without the use of an undercoat layer has been attained where an aluminum radiator has been heated at 450° C. for 16 hours in air. This method is particularly useful when applying the coating to new surfaces such as radiators or air conditioner condensers prior to assembly in a motor vehicle either as original equipment or replacement.

Adhesion may improve by applying an undercoat or precoat to the substrate. Useful undercoats or precoats include refractory oxide supports of the type discussed above, with alumina preferred. A preferred undercoat to increase adhesion between the atmosphere contacting surface and an overcoat of an ozone catalyst composition is described in commonly assigned U.S. Pat. No. 5,422,331 herein incorporated herein by reference. The undercoat layer is disclosed as comprising a mixture of fine particulate refractory metal oxide and a sol selected from silica, alumina, zirconia and titania sols. In accordance with the method of the present invention, surfaces on existing vehicles can be coated while the substrate such as the radiator, radiator fan or air conditioner condenser is located on the vehicle. The catalyst composition can be applied directly to the surface. Where additional adhesion is desired, an undercoat can be used as recited above.

Where it is practical to separate the radiator from the vehicle, a support material such as activated alumina, silica-alumina, bulk titania, titanium sol, silica zirconia, manganese zirconia and others as recited can be formed into a slurry and coated on the substrate preferably with a silica sol to improve adhesion. The precoated substrate can subsequently be coated with soluble precious metal salts such as the platinum and/or palladium salts, and optionally manganese nitrate. The coated substrate can then be heated in an oven in air for sufficient time (0.5 to 12 hours at 350° C. to 550° C.) to calcine the palladium and manganese components to form the oxides thereof.

The present invention can comprise adsorption compositions supported on the atmosphere contacting surface. The adsorption compositions can be used to adsorb gaseous pollutants such as hydrocarbons and sulfur dioxide as well as particulate matter such as particulate hydrocarbon, soot, pollen, bacteria and germs. Useful supported compositions can include adsorbents such as zeolite to adsorb hydrocarbons. Useful zeolitic compositions are described in Publication No. WO 94/27709 published Dec. 8, 1994 and entitled Nitrous Oxide Decomposition Catalyst hereby incorporated by reference. Particularly preferred zeolites are Beta zeolite, and dealuminated Zeolite Y.

Carbon, preferably activated carbon, can be formed into carbon adsorption compositions comprising activated carbon and binders such as polymers as known in the art. The carbon adsorption composition can be applied to the atmosphere contacting surface. Activated carbon can adsorb hydrocarbons, volatile organic components, bacteria, pollen and the like. Yet another adsorption composition can include components which can adsorb $SO_3$. A particularly useful $SO_3$ adsorbent is calcium oxide. The calcium oxide is converted to calcium sulfate. The calcium oxide adsorbent compositions can also contain a vanadium or platinum catalyst which can be used to convert sulfur dioxide to sulfur trioxide which can then be adsorbed onto the calcium oxide to form calcium sulfate.

In addition to treatment of atmospheric air containing pollutants at ambient condition or ambient operating conditions, the present invention contemplates the catalytic oxidation and/or reduction of hydrocarbons, nitrogen oxides and residual carbon monoxide using conventional three way catalysts supported on electrically heated catalysts such as are known in the art. The electrically heated catalysts can be located on electrically heated catalyst monolith 56 illustrated in FIG. 1. Such electrically heated catalyst substrates are known in the art and are disclosed in references such as U.S. Pat. Nos. 5,308,591 and 5,317,869 hereby incorporated by reference. For the purposes of the present invention, the electrically heated catalyst is a metal honeycomb having a suitable thickness to fit in the flow direction, preferably of from ⅛ inch to 12 inches, and more preferably 0.5 to 3 inches. Where the electrically heated catalyst must fit into a narrow space, it can be from 0.25 to 1.5 inches thick. Preferred supports are monolithic carriers of the type having a plurality of fine, parallel gas flow passages extending therethrough from an inlet face to an outlet face of the carrier so that the passages are open to air flow entering from the front 26 and passing through the monolith 56 in the direction toward the fan 20. Preferably the passages are essentially straight from their inlet to their outlet and are defined by walls in which the catalytic material is coated as a wash coat so that the gases flowing through the passages contact the catalytic material. The flow passages of the monolithic carrier are thin wall channels which can be of any suitable cross-sectional shape and size such as trapezoidal, rectangular, square, sinusoidal, hexagonal, oval, circular or formed from metallic components which are corrugated and flat as are known in the art. Such structures may contain from about 60 to 600 or more gas inlet openings ("cells") per square inch of cross section. The monolith may be made of any suitable material and is preferably capable of being heated upon application of an electric current. A useful catalyst to apply is the three way catalyst (TWC) as recited above which can enhance the oxidation of hydrocarbons and carbon monoxide as well as the reduction of nitrogen oxides. Useful TWC catalysts are recited in U.S. Pat. Nos. 4,714,694; 4,738,947; 5,010,051; 5,057,483; and 5,139,992.

The present invention is illustrated further by the following examples which are not intended to limit the scope of this invention.

EXAMPLES

Example 1

A 1993 Nissan Altima radiator core (Nissan part number 21460-1E400) was heat treated in air to 450° C. for 16 hours to clean and oxidize the surface and then a portion coated with high surface area silica-alumina undercoat (dry loading=0.23 g/in$^3$) by pouring a water slurry containing the silica-alumina through the radiator channels, blowing out the excess with an air gun, drying at room temperature with a fan, and then calcining to 450° C. The silica-alumina slurry was prepared by ball milling high surface area calcined SRS-II alumina (Davison) with acetic acid (0.5% based on alumina) and water (total solids ca. 20%) to a particle size of 90% <4 μm. The ball milled material was then blended with Nalco silica sol (#91SJ06S—28% solids) in a ratio of 25%/75%. The SRS-II alumina is specified to have a structure of $xSiO_2 \cdot yAl_2O_3 \cdot zH_2O$ with 92–95% by weight $Al_2O_3$ and 4–7% by weight $SiO_2$ after activation. BET surface area is specified to be a minimum of 260 m$^2$/g after calcination.

Figure 8:
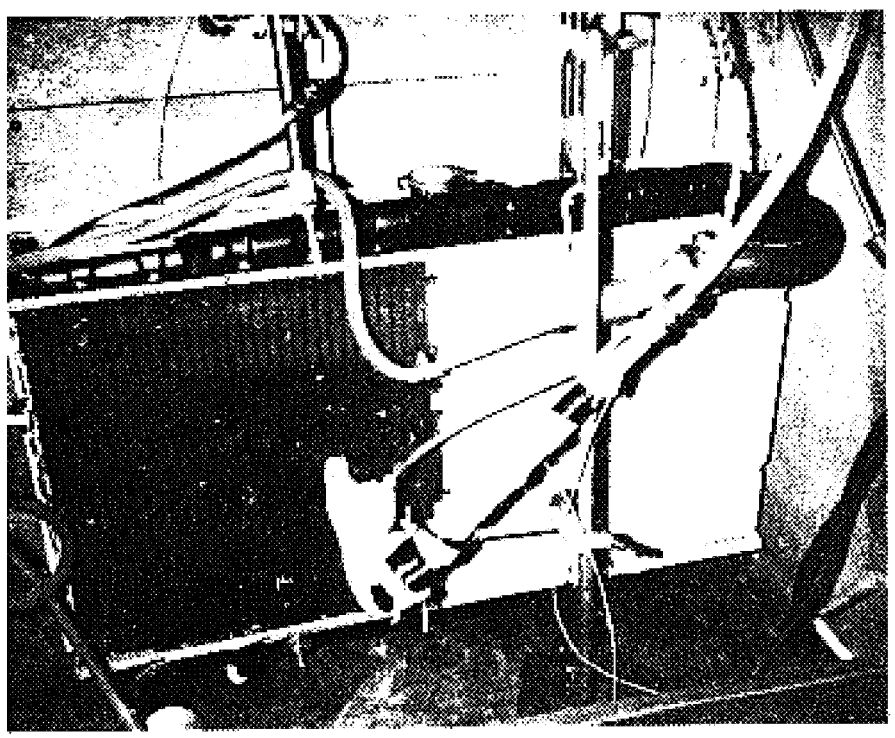
FIG. 8 is a photograph of the coated radiator from Examples 1 and 2.

A $Pd/Mn/Al_2O_3$ catalyst slurry (nominally 10% by weight palladium on alumina) was prepared by impregnating high surface area SRS-II alumina (Davison) to the point of incipient wetness with a water solution containing sufficient palladium tetraamine acetate. The resulting powder was dried and then calcined for 1 hour at 450° C. The powder was subsequently mixed under high shear with a water solution of manganese nitrate (amount equivalent to 5.5% by weight $MnO_2$ on the alumina powder) and sufficient dilution water to yield a slurry of 32–34% solids. The radiator was coated with the slurry, dried in air using a fan, and then calcined in air at 450° C. for 16 hours. This ozone destruction catalyst contained palladium (dry loading=263 g/ft$^3$ of radiator volume) and manganese dioxide (dry loading=142 g/ft$^3$) on high surface area SRS-II alumina. The partially coated radiator reassembled with the coolant tanks, also referred to as headers is shown in FIG. 8.

Ozone destruction performance of the coated catalyst was determined by blowing an air stream containing a given concentration of ozone through the radiator channels at face velocities typical of driving speeds and then measuring the concentration of ozone exiting the back face of the radiator. The air used was at about 20° C. and had a dew point of about 35° F. Coolant fluid was circulated through the radiator at a temperature of about 50° C. Ozone concentrations ranged from 0.1–0.4 ppm. Ozone conversion was measured at linear air velocities (face velocities) equivalent to 12.5 miles per hour to be 43%; at 25 mph to be 33%; at 37.5 mph to be 30% and at 49 mph to be 24%.

Example 2 (Comparative)

A portion of the same radiator used in Example 1 which was not coated with catalyst was similarly evaluated for ozone destruction performance (i.e. control experiment). No conversion of ozone was observed.

Example 3

After heat treatment for 60 hours in air at 450° C., a Lincoln Town Car radiator core (part #F1VY-8005-A) was coated sequentially in 6"×6" square patches with a variety of different ozone destruction catalyst compositions (i.e., different catalysts; catalyst loadings, binder formulations, and heat treatments). Several of the radiator patches were pre-coated with a high surface area alumina or silica-alumina and calcined to 450° C. prior to coating with the catalyst. The actual coating was accomplished similarly to Example 1 by pouring a water slurry containing the specific catalyst formulation through the radiator channels, blowing out the excess with an air gun, and drying at room temperature with a fan. The radiator core was then dried to 120° C., or dried to 120° C. and then calcined to 400 to 450° C. The radiator core was then reattached to its plastic tanks and ozone destruction performance of the various catalysts was determined at a radiator surface temperature of about 40° C. to 50° C. and a face velocity of 10 mph as described in Example 1.

Table I summarizes the variety of catalysts coated onto the radiator. Details of the catalyst slurry preparations are given below.

A $Pt/Al_2O_3$ catalyst (nominally 2% by weight Pt on $Al_2O_3$) was prepared by impregnating 114 g of a platinum salt solution derived from $H_2Pt(OH)_6$ solubilized in an amine, (17.9% Pt), dissolved in 520 g of water to 1000 g of Condea SBA-150 high surface area (specified to be about 150 m$^2$/g) alumina powder. Subsequently 49.5 g of acetic acid was added. The powder was then dried at 110° C. for 1 hour and calcined at 550° C. for 2 hours. A catalyst slurry was then prepared by adding 875 g of the powder to 1069 g of water and 44.6 g of acetic acid in a ball mill and milling the mixture to a particle size 90%<10 μm. (Patches 1 and 4)

A carbon catalyst slurry was a formulation (29% solids) purchased from Grant Industries, Inc., Elmwood Park, N.J. The carbon is derived from coconut shell. There is an acrylic binder and a defoamer. (Patches 8 and 12)

The Carulite® 200 catalyst ($CuO/MnO_2$) was prepared by first ball milling 1000 g of Carulite® 200 (purchased from Carus Chemical Co., Chicago, Ill.) with 1500 g of water to a particle size 90%<6 μm. Carulite® 200 is specified as containing 60 to 75 weight percent $MnO_2$, 11–14 percent CuO and 15–16 percent $Al_2O_3$. The resulting slurry was diluted to ca. 28% solids and then mixed with either 3% (solids basis) of Nalco #1056 silica sol or 2% (solids basis) National Starch #x4260 acrylic copolymer. (Patches 5, 9 and 10)

The $Pd/Mn/Al_2O_3$ catalyst slurry (nominally 10% by weight palladium on alumina) was prepared as described in Example 1. (Patches 2, 3 and 6)

An I.W. (incipient wetness) $Pd/Mn/Al_2O_3$ catalyst (nominally 8% palladium and 5.5% $MnO_2$ based on alumina) was prepared similarly by first impregnating high surface area SRS-II alumina (Davison) to the point of incipient wetness with a water solution containing palladium tetraamine acetate. After drying and then calcining the powder for two hours at 450° C., the powder was reimpregnated to the point of incipient wetness with a water solution containing manganese nitrate. Again, after drying and calcination at 450° C. for two hours, the powder was mixed in a ball mill with acetic acid (3% by weight of catalyst powder) and enough water to create a slurry of 35% solids.

The mixture was then milled until the particle size was 90%<8 µm. (Patches 7 and 11)

The $SiO_2/Al_2O_3$ precoat slurry was prepared as described in Example 1. (Patches 3 and 11)

The $Al_2O_3$ precoat slurry was prepared by ball milling high surface area Condea SBA-150 alumina with acetic acid (5% by weight based on alumina) and water (total solids ca. 44%) to a particle size of 90%<10 µm. (Patches 9 and 12)

Results are summarized in Table I. The conversion of carbon monoxide after being on the automobile for 5,000 miles was also measured at the conditions recited in Example 1 for patch #4. At a radiator temperature of 50° C. and a linear velocity of 10 mph no conversion was observed.

TABLE I

CATALYST SUMMARY

| PATCH # | CATALYST | OZONE CONVERSION (%) |
|---|---|---|
| 1 | $Pt/Al_2O_3$<br>0.67 g/in³ (23 g/ft³ Pt)<br>No Precoat<br>No Calcine (120° C. only) | 12 |
| 2 | $Pd/Mn/Al_2O_3$<br>0.97 g/in³ (171 g/ft³ Pd)<br>No Precoat<br>Calcined 450° C. | 25 |
| 3 | $Pd/Mn/Al_2O_3$<br>1.19 g/in³ (209 g/ft³ Pd)<br>$SiO_2/Pt/Al_2O_3$ Precoat<br>(0.16 g/in³)<br>Calcined 450° C. | 24 |
| 4 | $Pt/Al_2O_3$<br>0.79 g/in³ (27 g/ft³ Pt)<br>No Precoat<br>Calcined 450° C. | 8 |
| 5 | Carulite 200<br>0.49 g/in³<br>3% $SiO_2/Pt/Al_2O_3$ Binder<br>No Precoat<br>Calcined 400° C. | 50 |
| 6 | $Pd/Mn/Al_2O_3$<br>0.39 g/in³ (70 g/ft³ Pd)<br>No Precoat<br>Calcined 450° C. | 28 |
| 7 | I.W. $Pd/Mn/Al_2O_3$<br>0.69 g/in³ (95 g/ft³ Pd)<br>No Precoat<br>No Calcine (120° C. only) | 50 |
| 8 | Carbon<br>0.80 g/in³<br>No Precoat<br>No Calcine (120° C. only) | 22 |
| 9 | Carulite 200<br>0.65 g/in³<br>3% $SiO_2/Al_2O_3$ Binder<br>$Al_2O_3$ Precoat (0.25 g/in³)<br>Calcined 450° C. | 38 |
| 10 | Carulite 200<br>0.70 g/in³<br>2% Latex Binder<br>No Precoat<br>No Calcine (120° C. only) | 42 |
| 11 | I.W. $Pd/Mn/Al_2O_3$<br>0.59 g/in³ (82 g/ft³ Pd)<br>$SiO_2/Al_2O_3$ precoat<br>(0.59 g/in³)<br>No Calcine either Coat<br>(120° C. only) | 46 |
| 12 | Carbon<br>1.07 g/in³<br>$Al_2O_3$ Precoat (0.52 g/in³)<br>calcined to 450° C.<br>Topcoat not calcined<br>(120° C. only) | 17 |

Example 4

A 1993 Nissan Altima radiator core (Nissan part number 21460-1E400) was heat treated in air to 400° C. for 16 hours and then a portion coated with Condea high surface area SBA-150 alumina (dry loading=0.86 g/in³) by pouring a water slurry containing the alumina through the radiator channels, blowing out the excess with an air gun, drying at room temperature with a fan, and then calcining to 400° C. The alumina precoat slurry was prepared as described in Example 3. The radiator was then coated sequentially in 2"×2" square patches with seven different CO destruction catalysts (Table II). Each coating was applied by pouring a water slurry containing the specific catalyst formulation through the radiator channels, blowing out the excess with an air gun, and drying at room temperature with a fan.

The Carulite® and 2% $Pt/Al_2O_3$ catalysts (Patch #4 and #6, respectively) were prepared according to the procedure described in Example 3. The 3% $Pt/ZrO_2/SiO_2$ catalyst (Patch #3) was made by first calcining 510 g of zirconia/silica frit (95% $ZrO_2$/5% $SiO_2$ —Magnesium Elektron XZO678/01) for 1 hour at 500° C. A catalyst slurry was then prepared by adding to 480 g of deionized water, 468 g of the resulting powder, 42 g of glacial acetic acid, and 79.2 g of a platinum salt solution (18.2% Pt) derived from $H_2Pt(OH)_6$ solubilized with an amine. The resulting mixture was milled on a ball mill for 8 hours to a particle size of 90% less than 3 µm.

The 3% $Pt/TiO_2$ catalyst (Patch #7) was prepared by mixing in a conventional blender 500 g of $TiO_2$ (Degussa P25), 500 g of deionized water, 12 g of concentrated ammonium hydroxide, and 82 g of a platinum salt solution (18.2% Pt) derived from $H_2Pt(OH)_6$ solubilized with an amine. After blending for 5 minutes to a particle size of 90% less than 5 µm, 32.7 g of Nalco 1056 silica sol and sufficient deionized water to reduce the solids content to ca. 22% was added. The resulting mixture was blended on a roll mill to mix all ingredients.

The 3% $Pt/Mn/ZrO_2$ catalyst slurry (Patch #5) was prepared by combining in a ball mill 70 g of manganese/zirconia frit comprising a coprecipitate of 20 weight percent manganese and 80 weight percent zirconium based on metal weight (Magnesium Elektron XZO719/01), 100 g of deionized water, 3.5 g of acetic acid and 11.7 g of a platinum salt solution (18.2% Pt) derived from $H_2Pt(OH)_6$ solubilized with an amine. The resulting mixture was milled for 16 hours to a particle size 90% less than 10 µm.

The 2% $Pt/CeO_2$ catalyst (Patch #1) was prepared by impregnating 490 g of alumina stabilized high surface area ceria (Rhone Poulenc) with 54.9 g of a platinum salt solution (18.2% Pt) derived from $H_2Pt(OH)_6$ solubilized with an amine and dissolved in deionized water (total volume—155mL). The powder was dried at 110° C. for 6 hours and calcined at 400° C. for 2 hours. A catalyst slurry was then prepared by adding 491 g of the powder to 593 g of deionized water in a ball mill and then milling the mixture for 2 hours to a particle size of 90% less than 4 µm. The 4.6% $Pd/CeO_2$ catalyst (Patch #2) was prepared similarly via incipient wetness impregnation using 209.5 g (180mL) of palladium tetraamine acetate solution.

After all seven catalysts were applied, the radiator was calcined for about 16 hours at 400° C. After attaching the radiator core to the plastic tanks, CO destruction performance of the various catalysts were determined by blowing an air stream containing CO (ca. 16ppm) through the radiator channels at a 5 mph linear face velocity (315,000/h space velocity) and then measuring the concentration of CO exiting the back face of the radiator. The radiator temperature was ca. 95° C., and the air stream had a dew point of approximately 35° F. Results are summarized in Table II.

Figure 9:
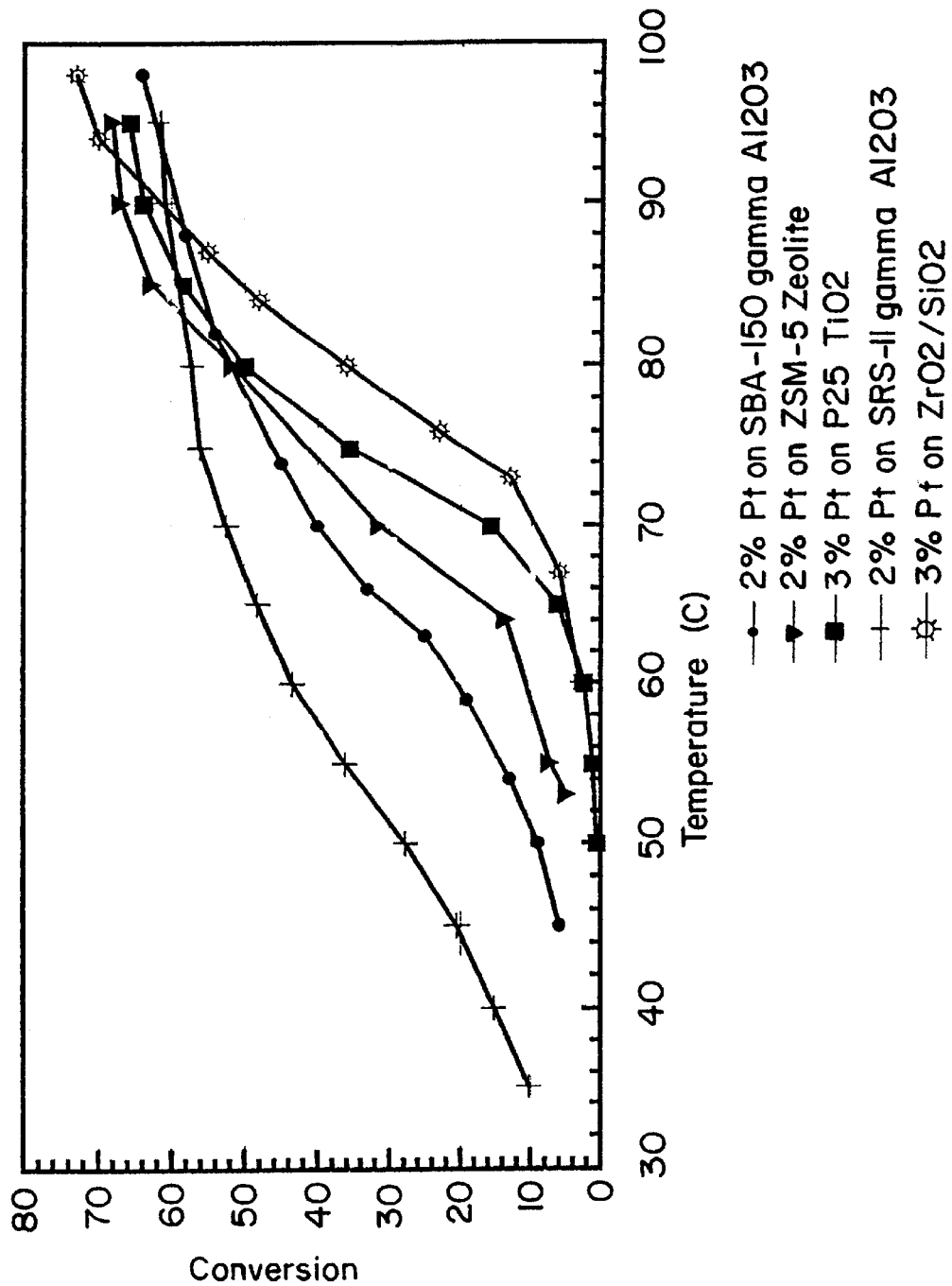
FIGS. 9–14 and 16–17 are graphs of CO conversion versus temperature for using different catalysts in Examples 4, 9–12, 14 and 15.

Ozone destruction performance was measured as described in Example 1 at 25° C., 0.25 ppm ozone, and a linear face velocity of 10 mph with a flow of 135.2 L/min and an hourly space velocity of 640,000/h. The air used had a dewpoint of 35° F. Results are summarized in Table II. FIG. 9 illustrates CO conversion v. temperature for Patch Nos. 3, 6 and 7.

The catalysts were also tested for the destruction of propylene by blowing an air stream containing propylene (ca. 10 ppm) through the radiator channels at a 5 mph linear face velocity, with a flow rate of 68.2 L/min and an hourly space velocity of 320,000/h, and then measuring the concentration of propylene exiting the back face of the radiator. The radiator temperature was ca. 95° C., and the air stream had a dew point of approximately 35° F. Results are summarized in Table II.

TABLE II

CO/HC/OZONE CONVERSION SUMMARY

| PATCH # | CATALYST | CARBON MONOXIDE CONVERSION (%)[1] | OZONE CONVERSION (%)[2] | PROPYLENE CONVERSION (%)[3] |
|---|---|---|---|---|
| 1 | 2% Pt/$CeO_2$ 0.7 g/in³ (24 g/ft³ Pt) | 2 | 14 | 0 |
| 2 | 4.6% Pd/$CeO_2$ 0.5 g/in³ (40 g/ft³ Pd) | 21 | 55 | 0 |
| 3 | 3% Pt/$ZrO_2$/$SiO_2$ 0.5 g/in³ (26 g/ft³ Pt) | 67 | 14 | 2 |
| 4 | Carulite 200 0.5 g/in³ 3% $SiO_2$/$Al_2O_3$ binder | 5 | 56 | 0 |
| 5 | 3% Pt/Mn/$ZrO_2$ 0.7 g/in³ (36 g/ft³ Pt) | 7 | 41 | 0 |
| 6 | 2% Pt/$Al_2O_3$ 0.5 g/in³ (17 g/ft³ Pt) | 72 | 8 | 17 |
| 7 | 3% Pt/$TiO_2$ 0.7 g/in³ (36 g/ft³ Pt) 3% $SiO_2$/$Al_2O_3$ binder | 68 | 15 | 18 |

[1]Test Conditions: 16 ppm CO; 95° C.; 5 mph face velocity; 68.2 L/min; LHSV (hourly space velocity) = 320,000/h; Air dewpoint = 35° F.
[2]Test Conditions: 0.25 ppm $O_3$; 25° C.; 10 mph face velocity; 135.2 L/min; LHSV (hourly space velocity) = 640,000/h; Air dewpoint = 35° F.
[3]Test Conditions: 10 ppm propylene; 95° C.; 5 mph face velocity; 68.2 L/min; LHSV (hourly space velocity) = 320,000/h; Air dewpoint = 35° F.

Example 5

This example summarizes the technical results from on-the-road vehicle testing conducted in February and March 1995 in the Los Angeles area. The purpose of the test was to measure catalytic ozone decomposition efficiency over a catalyzed radiator under actual driving conditions. The Los Angeles (LA) area was chosen as the most appropriate test site primarily due to its measurable ozone levels during this March testing period. In addition, specific driving routes are defined in the LA area which are typical of AM and PM peak and off-peak driving. Two different catalyst compositions were evaluated: 1) Carulite® 200 (CuO/$MnO_2$/$Al_2O_3$ purchased from Carus Chemical Company); and 2) Pd/Mn/$Al_2O_3$ (77 g/ft³ Pd) prepared as described in Example 3. Both catalysts were coated in patches onto a late model Cadillac V-6 engine aluminum radiator. The radiator was an aluminum replacement for the copper-brass OEM radiator which was on a Chevrolet Caprice test vehicle. The car was outfitted with ¼" Teflon® PTFE sampling lines located directly behind each catalyst patch and behind an uncoated portion of the radiator (control patch). Ambient (catalyst in) ozone levels were measured via a sampling line placed in front of the radiator. Ozone concentrations were measured with two Dasibi Model 1003AH ozone monitors located in the back seat of the vehicle. Temperature probes were mounted (with epoxy) directly onto each radiator test patch within a few inches of the sampling line. A single air velocity probe was mounted on the front face of the radiator midway between the two patches. Data from the ozone analyzers, temperature probes, air velocity probe, and vehicle speedometer were collected with a personal computer located in the trunk and downloaded to floppy disks.

Overall results from the test are summarized in Table III below. For each catalyst (Carulite® & Pd/Mn/$Al_2O_3$), results for cold idle, hot idle and on-the-road driving are reported. Data were collected on two separate trips to LA in February and March of 1995. The first trip was cut short after only a few days due to low ambient ozone levels. Although somewhat higher during the second trip in March, ambient levels still only averaged approximately 40 ppb. The last three days of testing (March 17–20) had the highest ozone encountered. Peak levels were approximately 100 ppb. In general, no trend in conversion vs. ozone concentration was noted.

Except for the cold idle results, those reported in Table III are averages from at least eleven different runs (the actual range of values appear in parentheses). Only data corresponding to inlet ozone concentration greater or equal to 30 ppb were included. Freeway data was not included since ambient levels dropped to 20 ppb or lower. Only two runs were completed for the cold idle tests. By cold idle refers to data collected immediately after vehicle startup during idle before the thermostat switches on and pumps warm coolant fluid to the radiator. Overall, ozone conversions were very good for both catalysts with the highest values obtained during hot idle. This can be attributed to the higher temperatures and lower face velocities associated with idling. Cold idle gave the lowest conversion due to the lower ambient temperature of the radiator surface. Driving results were intermediate of hot and cold idle results. Although the radiator was warm, temperature was lower and face velocity higher than those encountered with hot idle conditions. In general, ozone conversions measured for Carulite® were greater than those measured for Pd/Mn/$Al_2O_3$ (e.g. 78.1 vs. 63.0% while driving). However, for the hot idle and driving runs, the average temperature of the Carulite® catalyst was typically 40° F. greater than the Pd/Mn/$Al_2O_3$ catalyst while the average radiator face velocity was typically 1 mph lower.

Overall, the results indicate that ozone can be decomposed at high conversion rates under typical driving conditions.

TABLE III

ON-ROAD OZONE CONVERSION RESULTS*

| | OZONE CONVERSION (%) | TEMPERATURE (° F.) | FACE VELOCITY (mph) | VEHICLE SPEED (mph) |
|---|---|---|---|---|
| | Pd/Mn/Al$_2$O$_3$ | | | |
| Idle Cold | 48.2 (47.2–49.2) | 70.6 (70.5–70.8) | 9.0 (8.9–9.2) | 0.0 |
| Idle Hot | 80.6 (70.7–89.9) | 120.0 (104.7–145.2) | 7.4 (6.1–8.4) | 0.0 |
| Driving | 63.0 (55.5–69.9) | 104.3 (99.2–109.6) | 13.2 (12.2–14.9) | 23.3 (20.5–29.7) |
| | Carulite (CuO/MnO$_2$) | | | |
| Idle Cold | 67.4 (67.4–67.5) | 71.8 (70.8–72.9) | 8.2 (7.5–8.9) | 0.0 |
| Idle Hot | 84.5 (71.4–93.5) | 157.1 (134.8–171.2) | 7.5 (6.7–8.2) | 0.0 |
| Driving | 78.1 (72.3–83.8) | 143.7 (132.9–149.6) | 12.2 (11.2–13.5) | 19.2 (13.7–24.8) |

*Average values. Ranges appear in parentheses.

In general, the results of motor testing are consistent with fresh activity measured in the lab prior to installation of the radiator. At room temperature (~25° C.), 20% relative humidity (0.7% water vapor absolute), and a 10 mph equivalent face velocity, lab conversions for Pd/Mn/Al$_2$O$_3$ and Carulite® were 55 and 69% respectively. Increasing the RH to 70% at room temperature (~25° C.) (2.3% water vapor absolute) lowered conversions to 38 and 52%, respectively. Since the cold idle (70° F.) conversions measured at a 9 mph face velocity were 48 and 67% respectively, it would appear that the humidity levels encountered during the testing were low.

The face velocity of air entering the radiator was low. At an average driving speed of roughly 20 mph (typical of local driving), radiator face velocity was only approximately 13 mph. Even at freeway speeds in excess of 60 mph, radiator face velocity was only ca. 25 mph. The fan significantly affects control of air flowing through the radiator. While idling, the fan typically pulled about 8 mph.

Example 6

An 8 weight percent Pd on Carulite® catalyst was prepared by impregnating 100 g Carulite® 200 powder (ground up in a blender) to the point of incipient wetness with 69.0 g of a water solution containing palladium tetraamine acetate (12.6% Pd). The powder was dried overnight at 90° C. and then calcined to 450° C. or 550° C. for 2 hours. 92 g of the resulting calcined catalyst was then combined with 171 g of deionized water in a ball mill to create a slurry of 35% solids. After milling for 30 minutes to a particle size 90%≦9 μm, 3.1 g of National Starch x4260 acrylic latex binder (50% solids) was added, and the resulting mixture was milled for an additional 30 minutes to disperse the binder. Compositions containing 2,4 and 6 weight percent Pd on Carulite® catalysts were similarly prepared and evaluated.

The catalysts were evaluated for ozone decomposition at room temperature and 630,000/h space velocity using washcoated 300 cpsi (cells per square inch) ceramic honeycombs. The catalyst samples were prepared as recited above. Results are summarized in Table IV. As can readily be seen, the 4 and 8% Pd/Carulite® catalysts which were calcined to 450° C. gave equivalent initial and 45 minute ozone conversions (ca. 62 and 60%, respectively). These results are equivalent to those of Carulite® alone under the identical test conditions. The 2 and 4% Pd catalysts which were calcined to 550° C. gave significantly lower conversions after 45 minutes (47%). This is attributed to a loss in surface area at the higher temperature of calcination. The 6% catalyst was also calcined to 550° C. but did not show quite as large of an activity drop.

TABLE IV

OZONE RESULTS (300 cpsi Honeycomb, 630,000/h Space Velocity)

| CATALYST | LOADING (g/in$^3$) | CONVERSION (%) initial | CONVERSION (%) 45 Minutes |
|---|---|---|---|
| Pd on Carulite 200 | | | |
| 4% Pd/Carulite (calcined 450° C.) | 1.8 | 64 | 59 |
| 8% Pd/Carulite (calcined 450° C.) | 2.0 | 61 | 60 |
| 2% Pd/Carulite (calcined 550° C.) | 2.1 | 57 | 48 |
| 4% Pd/Carulite (calcined 550° C.) | 1.9 | 57 | 46 |
| 6% Pd/Carulite (calcined 550° C.) | 2.3 | 59 | 53 |

Example 7

A series of tests were conducted to evaluate a variety of catalyst compositions comprising a palladium component to treat air containing 0.25 ppm ozone. The air was at ambient conditions (23° C.; 0.6% water). The compositions were coated onto a 300 cell per inch ceramic (cordierite) flow through honeycomb at loadings of about 2 g of washcoat per cubic inch of substrate. The coated monoliths containing the various supported palladium catalysts were loaded into a 1" diameter stainless steel pipe, and the air stream was passed perpendicular to the open face of the honeycomb at a space velocity of 630,000/h. Ozone concentration was measured inlet and outlet of the catalyst. One alumina support used was SRS-II gamma alumina (purchased from Davison) characterized as described in Example 1 (surface area approximately 300 m$^2$/g). Also used was a low surface area theta alumina characterized by a surface area of approximately 58 m$^2$/g and an average pore radius of about 80 Angstrom. E-160 alumina is a gamma alumina characterized by a surface area of about 180 m$^2$/g and an average pore radius of about 47 Angstrom. Ceria used had a surface area about 120 m$^2$/g and an average pore radius of about 28 Angstrom. Also used was dealuminated Beta zeolite with a silica to alumina ratio of approximately 250 to 1 and a surface area about 430 m$^2$/g. Carbon, a microporous wood carbon characterized with a surface area of about 850 m$^2$/g, was also used as a support. Finally, a titania purchased from Rhone-Poulenc (DT51 grade) and characterized by a surface area of approximately 15 110 m$^2$/g was used as a support. Results are summarized in Table V which includes the relative weight percent of various catalyst components, the loading on the honeycomb, initial ozone conversion, and conversion after 45 minutes.

TABLE V

OZONE RESULTS - (300 cpsi Honeycomb, 630,000/h Space Velocity, 0.6% Water; ca. 0.25 ppm Ozone)

| CATALYST | LOADING (g/in$^3$) | CONVERSION (%) initial | CONVERSION (%) 45 Minutes |
|---|---|---|---|
| I.W. 8% Pd/5% Mn/Al$_2$O$_3$ | 1.8 | 60 | 55 |
| I.W. 8% Pd/5% Mn/Low Surface Area Al$_2$O$_3$ | 1.9 | 64 | 60 |
| 8% Pd/Low Surface Area Al$_2$O$_3$ | 1.9 | 56 | 44 |
| 8% Pd/E-160 Al$_2$O$_3$ | 2.2 | 61 | 57 |
| 4.6% Pd/CeO$_2$ | 1.99 | 59 | 58 |
| 8% Pd/BETA Zeolite (dealuminated) | 1.9 | 38 | 32 |
| 5% Pd/C | 0.5 | 63 | 61 |
| 8% Pd/DT-51 TiO$_2$ | 1.8 | 39 | 20 |

Example 8

Following is a preparation of Carulite® slurry which includes vinyl acetate latex binder and is used in coating radiators which results in excellent adhesion of the catalyst to an aluminum radiator.

1000 g of Carulite® 200, 1500 g of deionized water, and 50 g of acetic acid (5% based on Carulite®) were combined in a 1 gallon ball mill and milled for 4 hours to a particle size 90%≦7 μm. After draining the resulting slurry from the mill, 104 g (5% solids basis) of National Starch Dur-O-Set E-646 cross linking EVA copolymer (48% solids) was added. Thorough blending of the binder was achieved by rolling the slurry on a mill without milling media for several hours. Following coating of this slurry onto a piece of aluminum substrate (e.g., radiator), excellent adhesion (i.e., coating could not be wiped off) was obtained after drying for 30 minutes at 30° C. Higher temperatures of curing (up to 150° C.) can be utilized if desired.

Example 9

Figure 10:
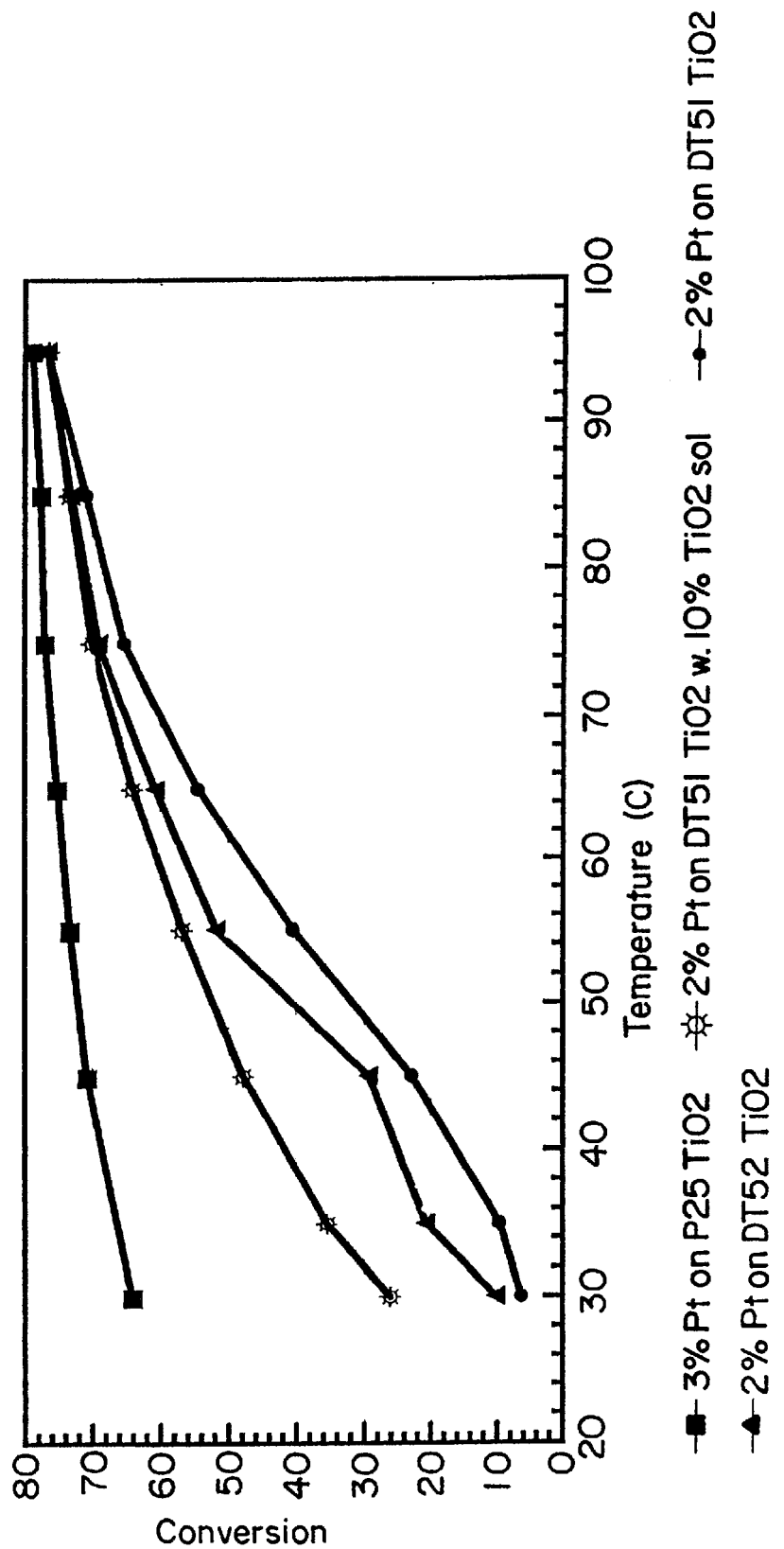

Carbon monoxide conversion was tested by coating a variety of titania supported platinum compositions onto ceramic honeycombs as described in Example 6. Catalyst loadings were about 2 g/in$^3$, and testing was conducted using an air stream having 16 ppm carbon monoxide (dew point 35° F.) at a space velocity of 315,000/h. The catalyst compositions were reduced on the honeycomb using a forming gas having 7% H$_2$ and 93% N$_2$ at 300° C. for 3 hours. Compositions containing TiO$_2$ included 2 and 3 weight percent platinum component on P25 titania; and 2 and 3 weight percent platinum component on DT52 grade titania. DT51 grade titania was purchased from Rhone-Poulenc and had a surface area of approximately 110 m$^2$/g. DT52 grade titania was a tungsten containing titania purchased from Rhone-Poulenc and which had a surface area of approximately 210 m$^2$/g. P25 grade titania was purchased from Degussa and was characterized as having a particle size of approximately 1 μm and a surface area of ca. 45–50 m$^2$/g. Results are illustrated in FIG. 10.

Example 10

Figure 11:
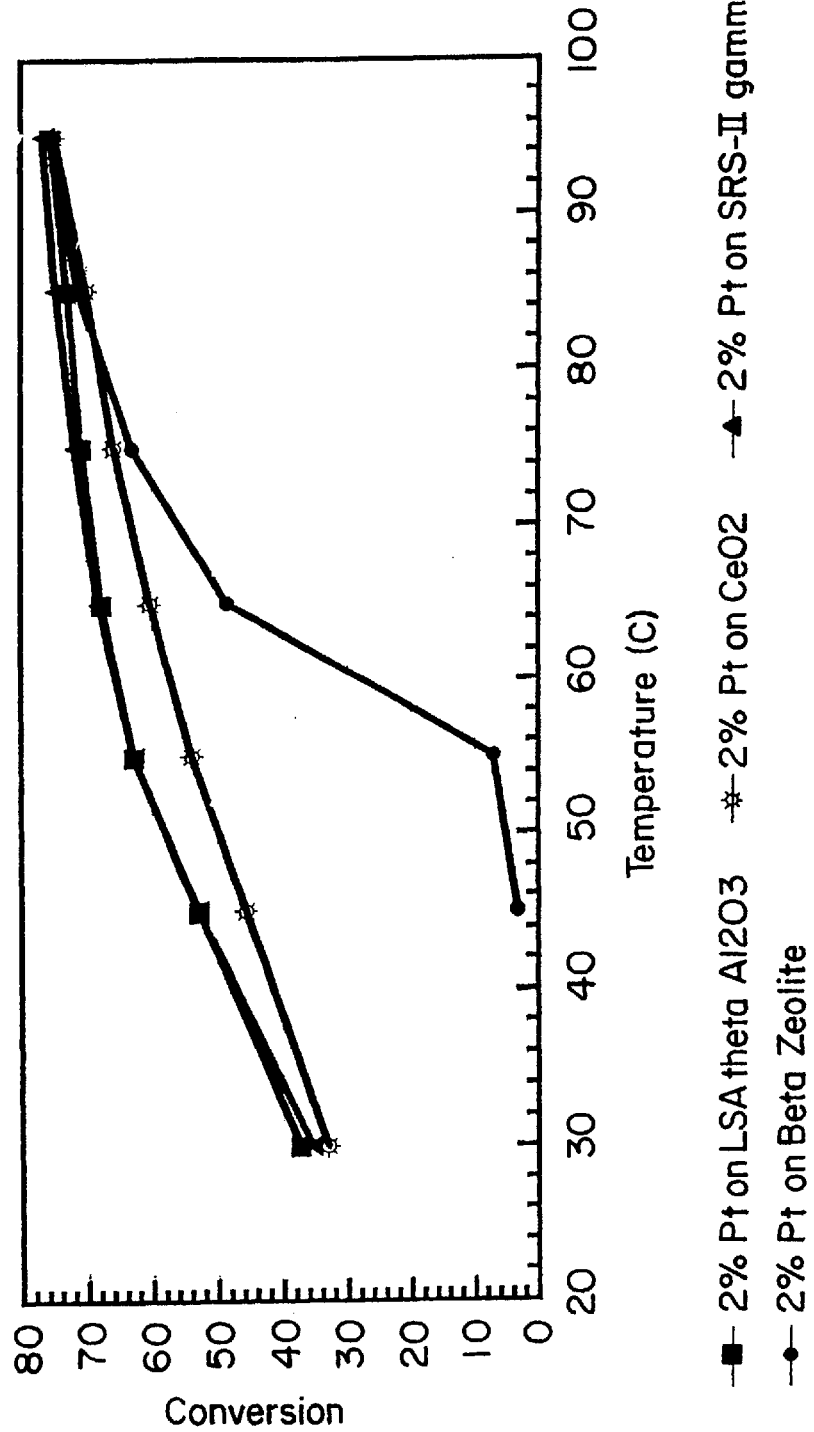

Example 10 relates to the evaluation of CO conversion for compositions containing alumina, ceria and zeolite. The supports were characterized as described in Example 7. Compositions evaluated included 2 weight percent platinum on low surface area theta alumina; 2 weight percent platinum and ceria; 2 weight percent platinum on SRS-II gamma alumina, and 2 weight percent platinum on Beta zeolite. Results are illustrated in FIG. 11.

Example 11

CO conversion was measured v. temperature for compositions containing 2 weight percent platinum on SRS-II gamma alumina and on ZSM-5 zeolite which were coated onto a 1993 Nissan Altima radiator as recited in Example 4 and tested using the same procedure to test CO as used in Example 4. Results are illustrated in FIG. 9.

Example 12

Figure 12:
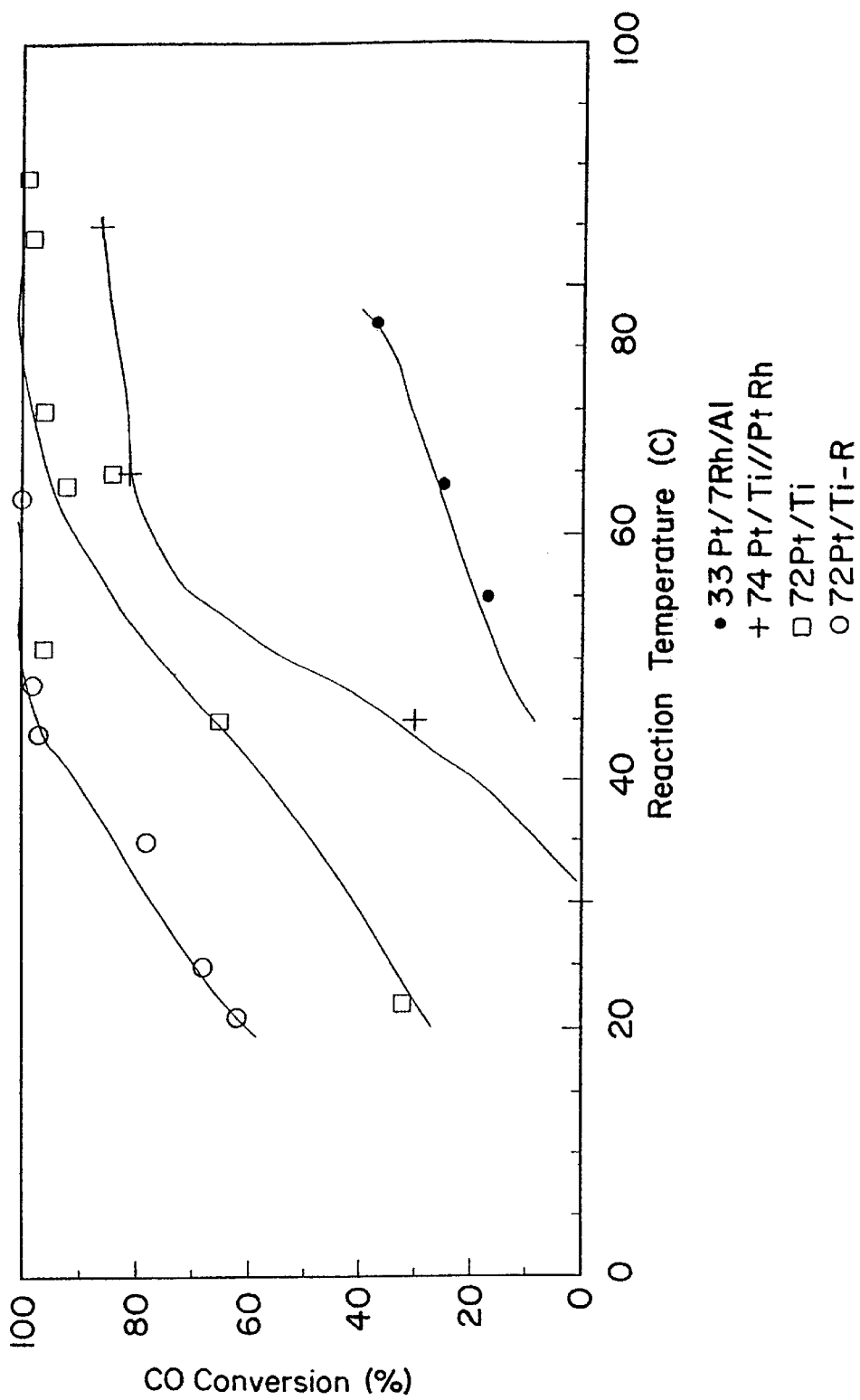

0.659 g of a solution of amine solubilized platinum hydroxide solution having 17.75 weight percent platinum (based on metallic platinum) was slowly added to 20 g of an 11.7 weight percent aqueous slurry of a titania sol in a glass beaker and stirred with a magnetic stirrer. A one-inch diameter by one-inch long 400 cells per square inch (cpsi) metal monolith cored sample was dipped into the slurry. Air was blown over the coated monolith to clear the channels and the monolith was dried for three hours at 110° C. At this time, the monolith was redipped into the slurry once again and the steps of air blowing the channels and drying at 110° C. was repeated. The twice coated monolith was calcined at 300° C. for two hours. The uncoated metal monolith weighed 12.36 g. After the first dipping, it weighed 14.06 g, after the first drying 12.6 g, after the second dipping 14.38 g and after calcination weighed 13.05 g indicating a total weight gain of 0.69 g. The coated monolith had 72 g/ft$^3$ of platinum based on the metal and is designated as 72 Pt/Ti. The catalyst was evaluated in an air stream containing 20 ppm carbon monoxide at a gas flow rate of 36.6 liters per minute. After this initial evaluation the catalyst core was reduced in a forming gas having 7% hydrogen and 93% nitrogen at 300° C. for 12 hours and the evaluation to treat an air stream containing 20 ppm carbon monoxide was repeated. The reduced coated monolith as designated as 72 Pt/Ti/R. The above recited slurry was then evaluated using a cored sample from a ceramic monolith having 400 cells per square inch (cpsi), which was precoated with 40 g per cubic foot, of 5:1 weight ratio of platinum to rhodium plus 2.0 g per cubic inch of ES-160 (alumina) and the core had 11 cells by 10 cells by 0.75 inches long monolith and designated as 33 Pt/7Rh/Al was dipped into the above recited slurry and air blown to clean the channels. This monolith was dried at 110° C. for three hours and calcined at 300° C. for two hours. The catalyst substrate including the first platinum and rhodium layer weighed 2.19 g. After the first dip it weighed 3.40 g and after calcination 2.38 g showing a total weight gain of 0.19 g which is equal to 0.90 g per cubic inch of the platinum/titania slurry. The dipped ceramic core contained 74 per cubic foot of platinum based on the platinum metal and designated as 74 Pt/Ti//Pt/Rh. Results are illustrated in FIG. 12.

Example 13

A platinum on titanium catalyst as described in the above referenced Example 12 has been used in an air stream containing 4 ppm propane and 4 ppm propylene. In an air stream at a space velocity of 650,000 standard hourly space velocity. The platinum and titanium catalyst had 72 g of platinum per cubic foot of total catalyst and substrate used.

It was evaluated on the ceramic honeycomb as recited in Example 13. The measured results for propylene conversion were 16.7% at 65° C.; 19% at 70° C.; 23.8% at 75° C.; 28.6% at 80° C.; 35.7% at 85° C.; 40.5% at 95° C. and 47.6% at 105° C.

Example 14

Example 14 is an illustration of a platinum component on a titania support. This Example illustrates the excellent activity of platinum supported on titania for carbon monoxide and hydrocarbon oxidation. The evaluation was carried out using a catalyst prepared from a colloidal titania sol to form a composition comprising 5.0 weight percent platinum component based on the weight of the platinum metal and titania. The platinum was added to titania in the form of amine solubilized platinum hydroxide solution. It was added to colloidal titania slurry or into titania powders to prepare a platinum and titania containing slurry. The slurry was coated onto a ceramic monolith having 400 cells per square inch (cpsi). Samples had coating amounts varying from 0.8–1.0 g/in. The coated monoliths were calcined for 300° C. for 2 hours in the air and then reduced. The reduction was carried out at 300° C. in a gas containing 7% hydrogen and 93% nitrogen for 12 hours. The colloidal titania slurry contained 10% by weight titania in an aqueous media. The titania had a nominal particle size of 2–5nm.

Carbon monoxide conversion was measured in an air stream containing 20 ppm CO. The flow rate of the carbon monoxide in various experiments range from space velocities of 300,000 VHSV to 650,000 VHSV at a temperature between ambient to 110° C. The air used was purified air from an air cylinder and where humidity was added the air was passed through a water bath. Where humidity was studied the relative humidity was varied from 0–100% humidity at room temperature (25° C.). The carbon monoxide containing air stream was passed through the ceramic monolith coated with the catalyst compositions using a space velocity of 650,000/h.

Figure 13:
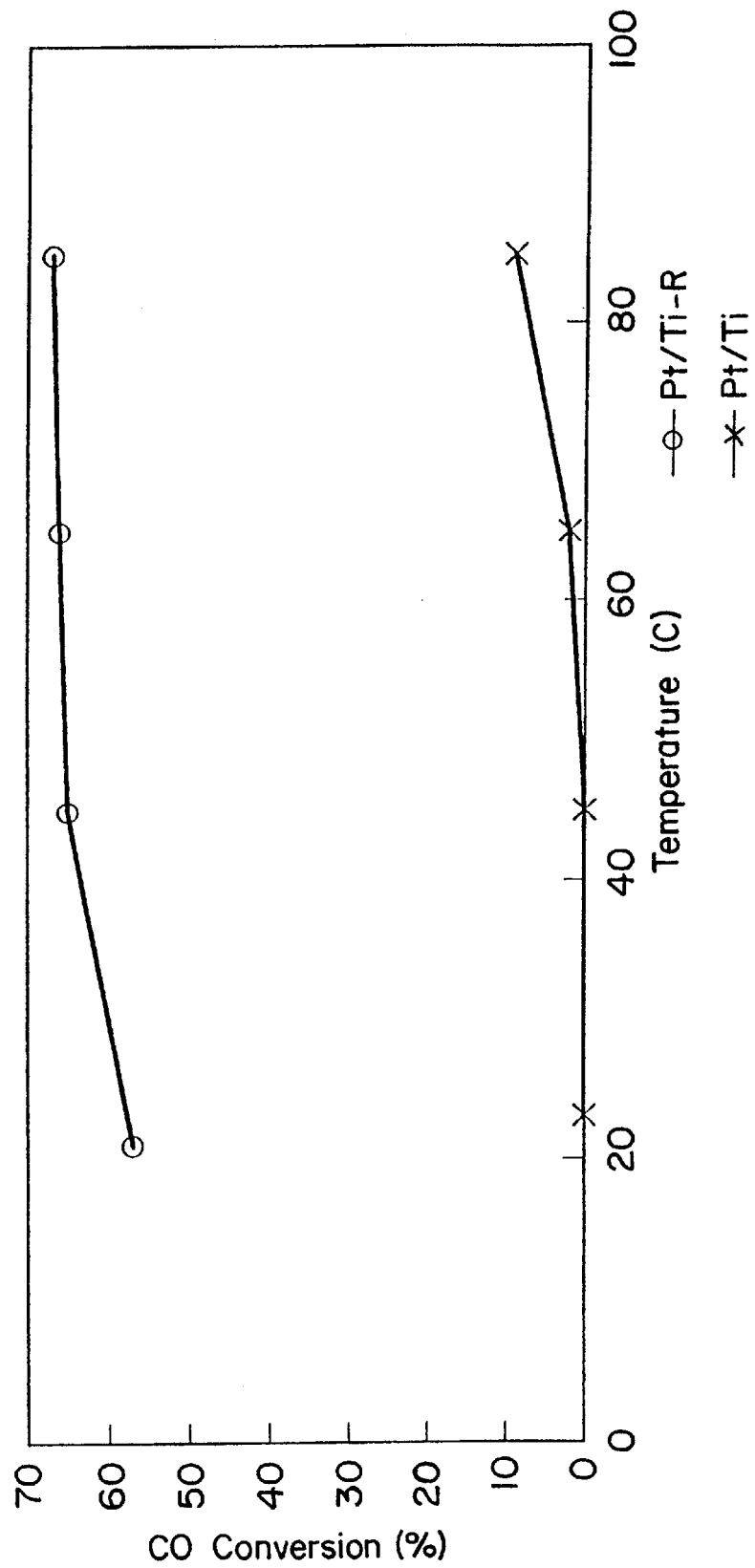

FIG. 13 represents a study using air with 20 ppm CO having to measure carbon monoxide conversion v. temperature comparing platinum supported on titania which has been reduced (Pt/Ti-R) at 300° C. using a reducing gas containing 7% hydrogen and 93% nitrogen for 12 hours as recited above with a non reduced platinum supported on titania catalyst (Pt/Ti) coating. FIG. 13 illustrates a significant advantage when using a reduced catalyst.

Figure 14:
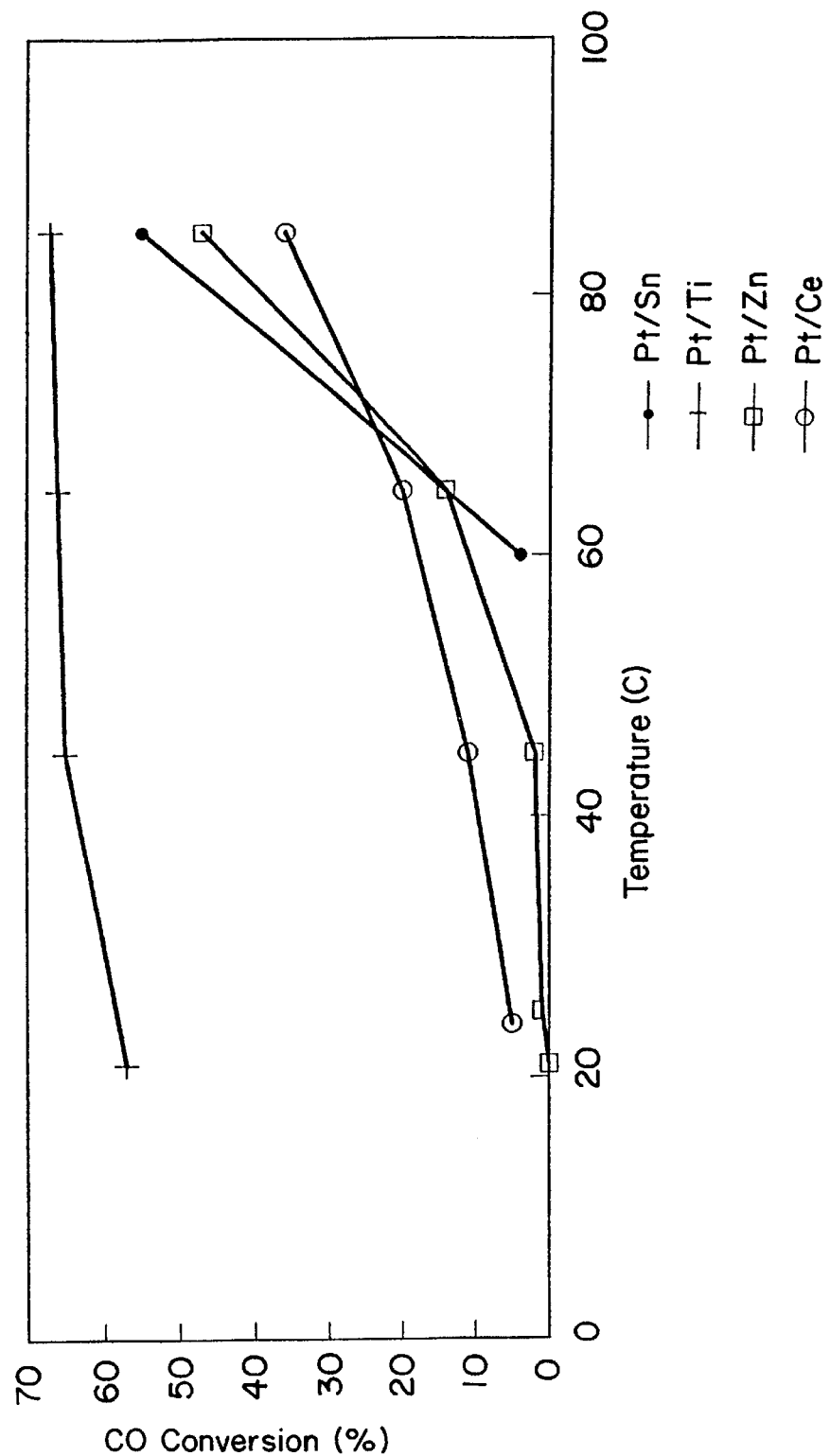

FIG. 14 illustrates a comparison of platinum on titania which has been reduced with varying supports including platinum on tin oxide (Pt/Sn), platinum on zinc oxide (Pt/Zn) and platinum on ceria (Pt/Ce) for comparative sake. All of the samples were reduced at the above indicated conditions. The flow rate of carbon monoxide in the air was 650,000 shsv. As can be seen, the reduced platinum on colloidal titania had significantly higher conversion results than platinum on the various other support materials.

Figure 15:
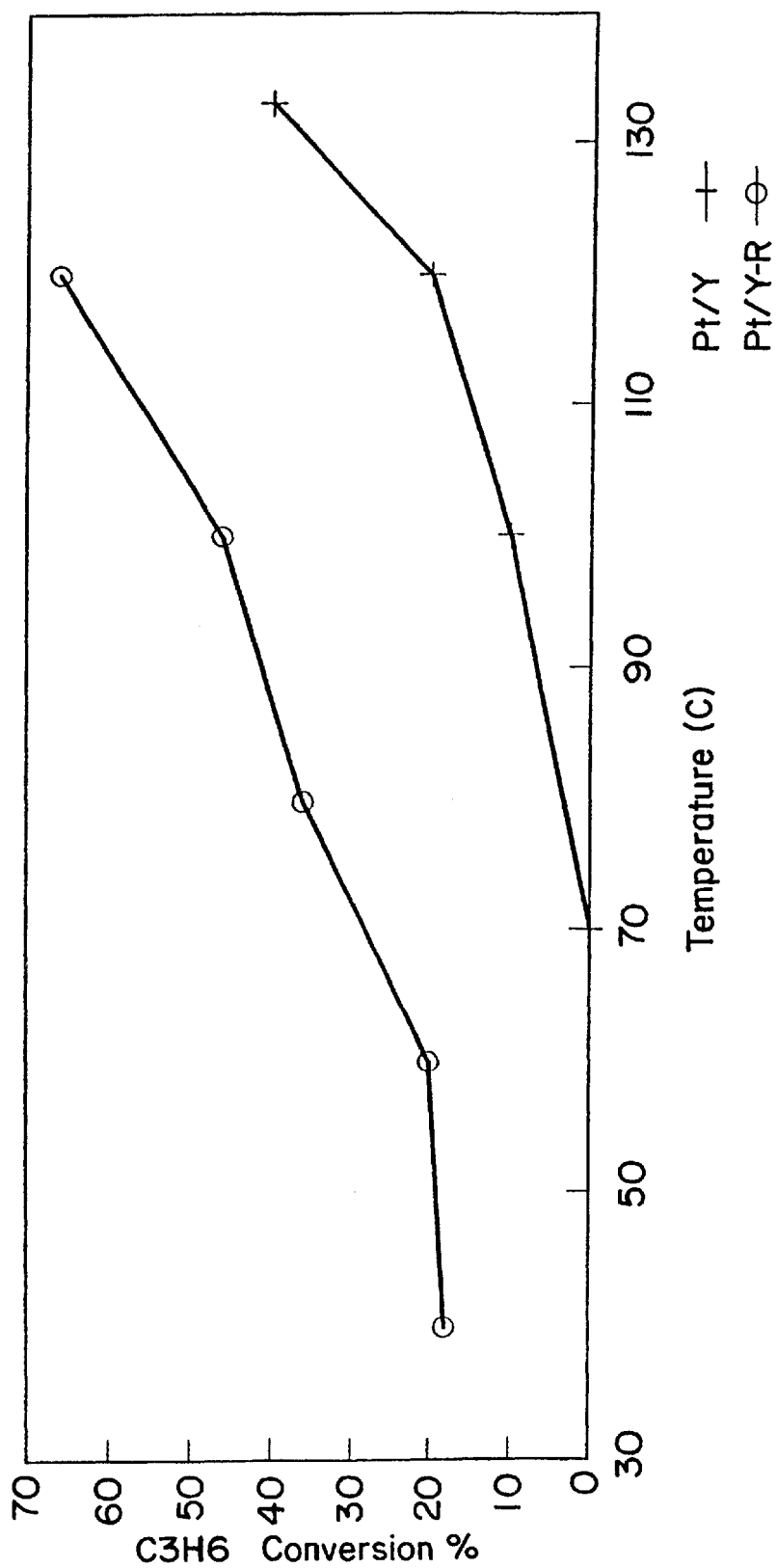
FIG. 15 is a graph of propylene conversion versus temperature based on Example 14.

Hydrocarbon oxidation was measured using a 6 ppm propylene air mixture. The propylene air stream was passed through the catalyst monolith at a space velocity of 300,000 vhsv at a temperature which varied from room temperature to 110° C. Propylene concentration was determined using a flame ionized detector before and after the catalyst. The results are summarized in FIG. 15. The support used was 5% by weight based on the weight of platinum metal and yttrium oxide $Y_2O_3$. The comparison was between reduced and non reduced catalyst. As shown in FIG. 15 reducing the catalyst resulted in a significant improvement in propylene conversion.

Figure 16:
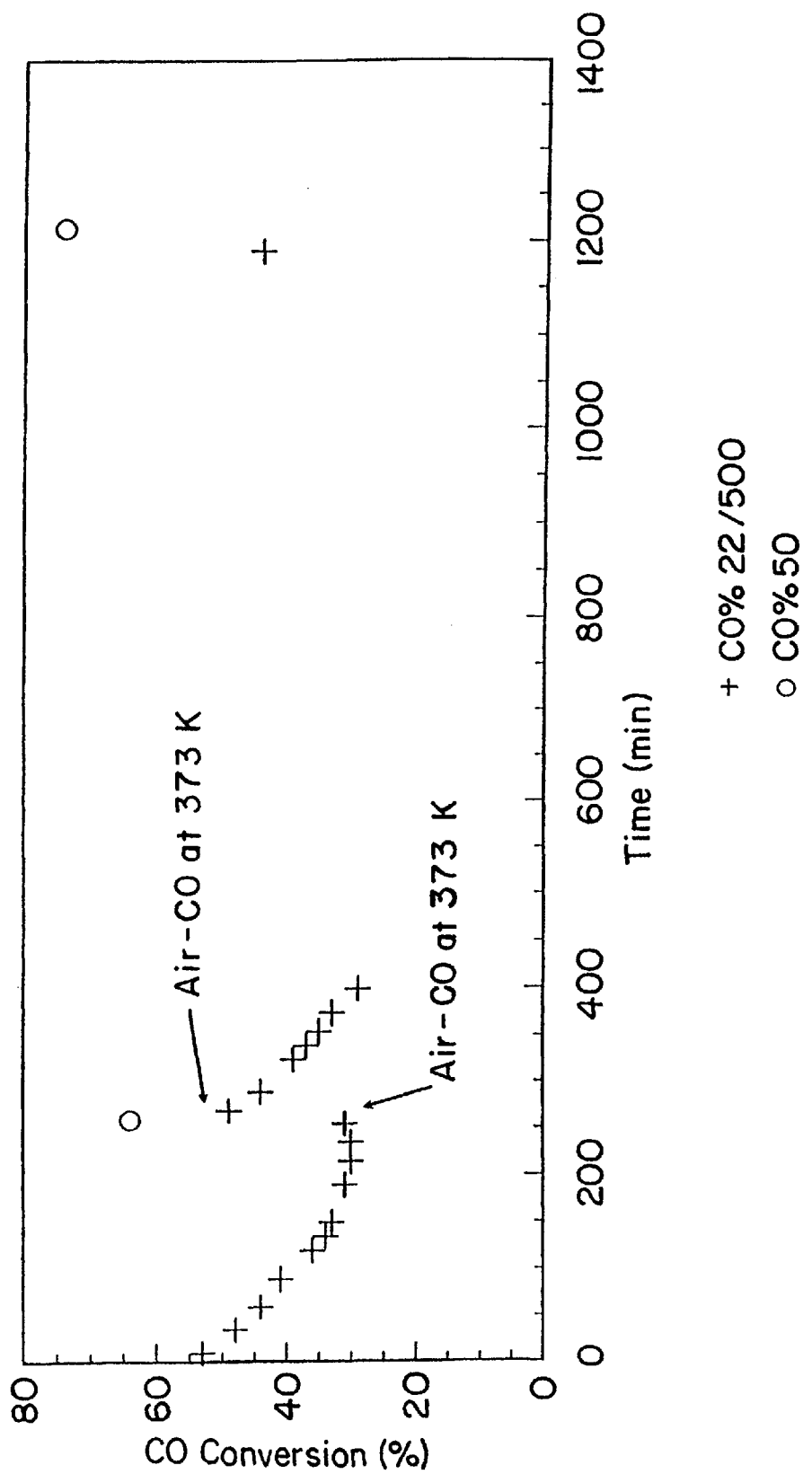

The above recited platinum supported on titania catalyst was reduced in a forming gas containing 7% hydrogen and 93% nitrogen at 500° C. for 1 hour. The conversion of carbon monoxide was evaluated in 0 percent relative humidity air at a flow rate of 500,000 vhsv. The evaluation was conducted to determine if the reduction of the catalyst was reversible. Initially, the catalyst was evaluated for the ability to convert carbon monoxide at 22° C. As shown in FIG. 16, the catalyst initially converted about 53% of the carbon monoxide and dropped down to 30% after approximately 200 minutes. At 200 minutes the air and carbon monoxide was heated to 50° C. and carbon monoxide conversion increased to 65%. The catalyst was further heated to 100° C. in air and carbon monoxide and held at 100° C. for one hour, and then cooled in air to room temperature (about 25° C.). Initially, the conversion dropped to about 30% in the period from about 225–400 minutes. The evaluation was continued at 100° C. to 1200 minutes at which time conversion was measured at about 40%. A parallel study was conducted at 50° C. At about 225 minutes the conversion was about 65%. After 1200 minutes, the conversion actually rose to about 75%. This Example shows that reduction of the catalyst permanently improves the catalysis activity.

Example 15

Example 15 is used to illustrate ozone conversion at room temperature for platinum and/or palladium components supported on a manganese oxide/zirconia coprecipitate. This Example also shows a platinum catalyst which catalyzes the conversion of ozone to oxygen and, at the same time, oxidize carbon monoxide and hydrocarbons. Manganese oxide/zirconia mixed oxide powders were made having 1:1 and 1:4 weight based on Mn and Zr metals. The coprecipitate was made in accordance with the procedure disclosed in U.S. Pat. No. 5,283,041 referenced above. 3% and 6% Pt on manganese/zirconia catalysts (1:4 weight basis of Mn to Zr) were prepared as described in Example 4. SBA-150 gamma alumina (10% based on the weight of the mixed oxide powder) was added as a binder in the form of a 40% water slurry containing acetic acid (5% by weight of alumina powder) and milled to a particle size 90%<10 µm. The 6% weight percent Pd catalyst was prepared by impregnating manganese/zirconia frit (1:1 weight basis of Mn to Zr) to the point of incipient wetness with a water solution containing palladium tetraamine acetate. After drying and then calcining the powder for two hours at 450° C., the catalyst was mixed in a ball mill with Nalco #1056 silica sol (10% by weight of catalyst powder) and enough water to create a slurry of approximately 35% solids. The mixture was then milled until the particle size was 90%≦10 µm. Various samples were reduced using a forming gas having 7% $H_2$ and 93% $N_2$ at 300° C. for 3 hours. Evaluations were conducted to determine the conversion of ozone on coated radiator minicores from a 1993 Altima radiator which were approximately ½ inch by ⅛ inch by 1 inch deep. The evaluation was conducted at room temperature using a one-inch diameter stainless steel pipe as described in Example 7 with house air (laboratory supplied air) at a 630,000/h space velocity with an inlet ozone concentration of 0.25 ppm. Results are provided on Table VI.

TABLE VI

SUMMARY OF FRESH ACTIVITY OZONE RESULTS - (39 cpsi Nissan Altima core, 630,000/h Space Velocity; 25°C.; 0.25 ppm ozone; House air - ca. 0.6% water)

| CORE NO. | CATALYST | LOADING (g/in$^3$) | CONVERSION (%) Initial | CONVERSION (%) 45 Minutes |
|---|---|---|---|---|
| 1 | 3% Pt/MnO$_2$/ZrO$_2$ (1:4) (calcined at 450° C.) | 0.7 | 70.7 | 65.8 |
| 2 | 3% Pt/MnO$_2$/ZrO$_2$ (1:4) (calcined at 450° C.; reduced at 300° C.) | 0.7 | 70.5 | 63.7 |
| 3 | 6% Pt/MnO$_2$/ZrO$_2$ (1:4) (calcined at 450° C.) | 0.68 | 68.2 | 62.3 |
| 4 | 6% Pt/MnO$_2$/ZrO$_2$ (1:4) (calcined 450° C.; reduced at 300° C.) | 0.66 | 66 | 55.8 |
| 5 | 6% Pd/MnO$_2$/ZrO$_2$ (1:1) w. 10% Nalco 1056 | 0.39 | 38.3 | 21.1 |
| 6 | MnO$_2$/ZrO$_2$ (1:1) w. 10% Nalco 1056 | 0.41 | 58.3 | 44.9 |
| 7 | MnO$_2$/ZrO$_2$ (1:1) w. 10% Nalco 1056 | 0.37 | 55.8 | 41.2 |
| 8 | 3% Pt/ZrO$_2$/SiO$_2$ (calcined 450° C.) | 0.79 | 27.4 | 10 |
| 9 | 3% Pt/ZrO$_2$/SiO$_2$ (calcined 450° C. and reduced at 300° C.) | 0.76 | 54.2 | 30.1 |

As can be seem from Table VI Cores 1 and 2 having only 3% platinum resulted in excellent ozone conversion initially and after 45 minutes both for reduced and unreduced catalyst. Cores 3 and 4 having a 6% platinum concentration also had excellent results but not quite as good as the 3% platinum results. Cores 5–7 illustrate a variety of other support materials used which resulted in conversion of ozone. Core 5 had palladium on a manganese oxide/zirconia coprecipitate and resulted in lower than expected but still significant ozone conversion. Cores 6 and 7 evaluations used the coprecipitate without precious metal and also resulted in significant ozone conversions but here again not as good as when using platinum as a catalyst. Core 8 was platinum on a zirconia/silica support which was calcined but not reduced and Core 9 was platinum on zirconia/silica support which was reduced. Both Cores 8 and 9 gave some conversion but yet not as good as the conversion obtained with platinum on the coprecipitate.

Figure 17:
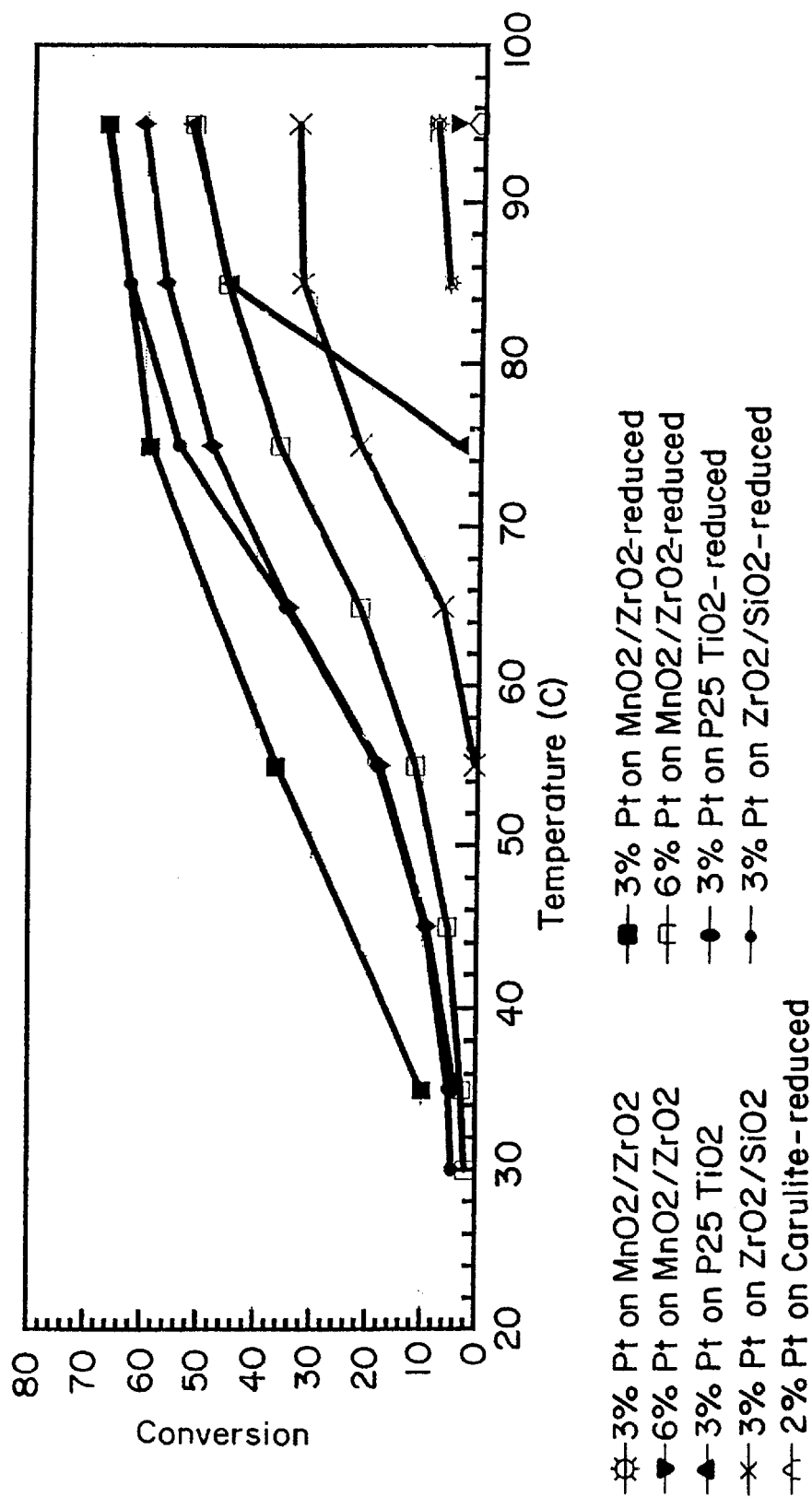

In addition, carbon monoxide conversion was evaluated on 39 cpsi radiator minicores, as recited, for 3% and 6% platinum on manganese/zirconia supports. Reduced and unreduced samples were evaluated. For illustrative purposes, platinum on zirconia/silica supports and platinum on Carulite® reduced and unreduced are also presented. As can be seen from FIG. 17, the results of 3% reduced platinum on manganese/zirconia support were higher when compared to the other embodiments.

Example 16 (Comparative)

Ozone conversion was measured over an uncoated 1995 Ford Contour radiator at room temperature and 80° C. by blowing an air stream containing ozone (0.25 ppm) through the radiator channels at a 10 mph linear velocity (630,000/h space velocity) and then measuring the concentration of ozone exiting the back face of the radiator. The air stream had a dew point of approximately 35° F. Heated coolant was not circulated through the radiator, but the air stream was heated as necessary with heating tape to achieve the desired radiator temperature. Additional testing was completed with an uncoated 0.75" (L)x0.5" (W)x1.0" (D) Ford Taurus radiator "mini-core" in a 1" diameter stainless steel pipe as described in Example 7. The air stream was heated with heating tape to achieve the desired radiator temperature. For both tests, no decomposition of ozone was observed up to 120° C.

Example 17

Figure 18:
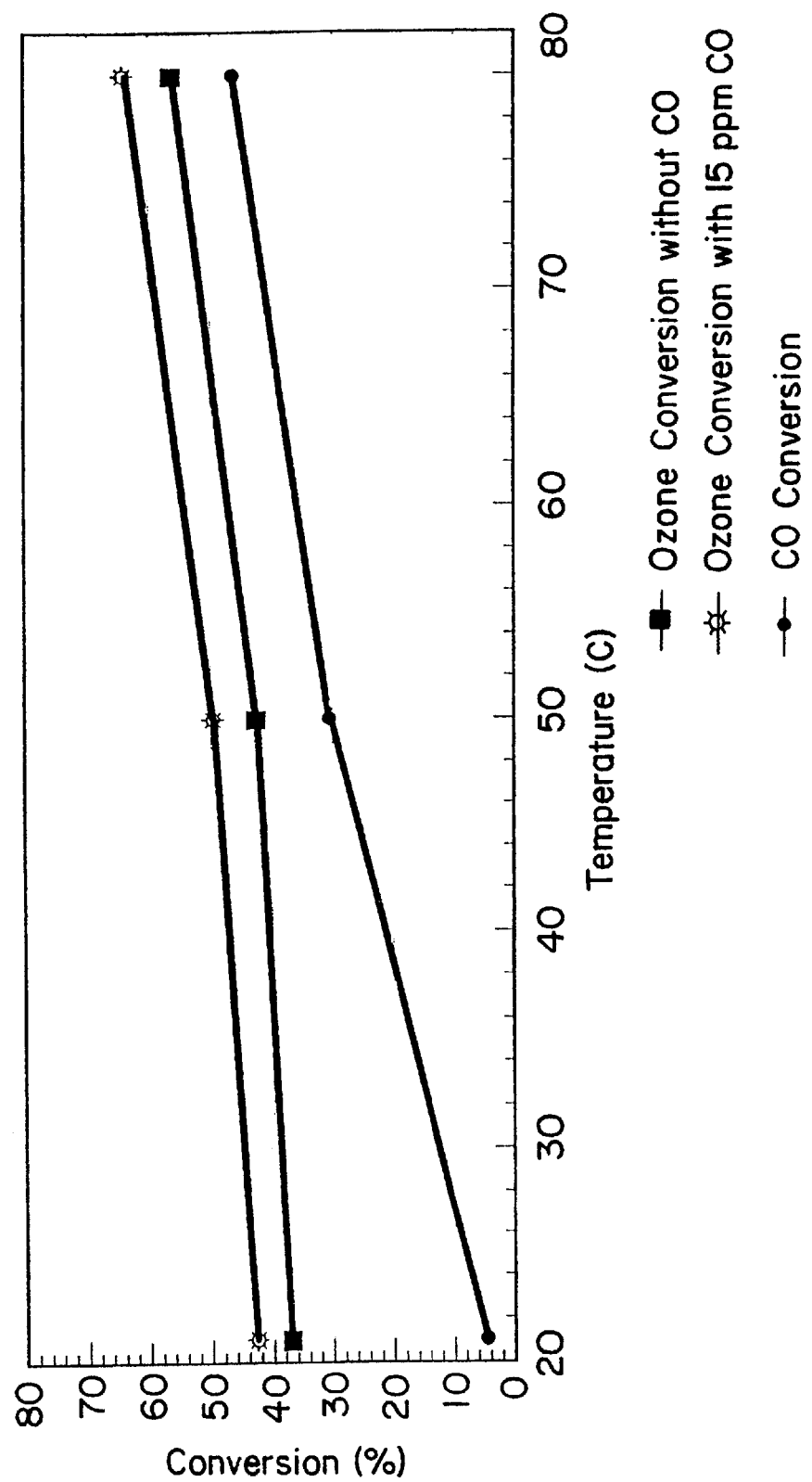
FIG. 18 is a graph of ozone conversion versus temperature based on Example 17.

Ozone conversion was measured at various temperatures for a reduced 3% Pt/TiO$_2$ catalyst in the absence and in the presence of 15 ppm CO. Degussa P25 grade titania was used as the support and was characterized as having a particle size of approximately 1 $\mu$m and a surface area of ca. 45–50 m$^2$/g. The catalyst was coated onto a 300 cpsi ceramic (cordierite) honeycomb and was reduced on the honeycomb using a forming gas having 7% H$_2$ and 93% N$_2$ at 300° C. for 3 hours. Testing was accomplished as described previously in Example 7. The air stream (35° F. dewpoint) was heated with heating tape to achieve the desired temperature. As can be seen in FIG. 18, an approximate 5% enhancement in absolute ozone conversion was observed from 25 to 80° C. The presence of CO improves the conversion of ozone.

Example 18

100 g of Versal GL alumina obtained from LaRoche Industries Inc. was impregnated with about 28 g of Pt amine hydroxide (Pt(A)salt) diluted in water to about 80 g of solution. 5 g of acetic acid was added to fix the Pt onto the alumina surface. After mixing for half hour, the Pt impregnated catalyst was made into a slurry by adding water to make about 40% solids. The slurry was ballmilled for 2 hours. The particle size was measured to be 90% less than 10 microns. The catalyst was coated onto a 1.5" diameter by 1.0" length 400 cpsi ceramic substrate to give a washcoat loading after drying of about 0.65 g/in$^3$. The catalyst was then dried at 100° C. and calcined at 550° C. for 2 hours. This catalyst was tested for C$_3$H$_6$ oxidation at temperatures between 60 and 100° C. in dry air as described in Example 21.

Some of calcined Pt/Al$_2$O$_3$ sample described above was also reduced in 7%H2/N2 at 400° C. for 1 hour. The reduction step was carried out by ramping the catalyst temperature from 25 to 400° C. at a H2/N2 gas flow rate of 500 cc/min. The ramp temperature was about 5° C./min. The catalyst was cooled down to room temperature and the catalyst was tested for C$_3$H$_6$ oxidation as described in Example 21.

Example 19

6.8 g of ammonium tungstate was dissolved in 30 cc of water and the pH adjusted to 10 and the solution impregnated onto 50 g of Versal GL alumina (LaRoche Industries Inc.). The material was dried at 100° C. and calcined for 2 hours at 550° C. The approximately 10% by metal weight of W on $Al_2O_3$ was cooled to room temperature and impregnated with 13.7 g of Pt amine hydroxide (18.3% Pt). 2.5 g of acetic acid was added and mixed well. The catalyst was then made into a slurry containing 35% solid by adding water. The slurry was then coated over a 400 cpsi, 1.5"–1.0" diameter ceramic substrate resulting, after drying, in having a catalyst washcoat loading of 0.79 g/in$^3$. The coated catalyst was then dried and calcined at 550° C. for 2 hours. The catalyst was tested calcined in $C_3H_6$ and dry air in the temperature range 60 to 100° C.

Example 20

6.8 g of perrhenic acid (36% Re in solution) was further diluted in water to make 10 g percent perrhenic acid solution. The solution was impregnated onto 25 g of Versal GL alumina. The impregnated alumina was dried and the powder calcined at 550° C. for 2 hours. The impregnated 10 weight percent based metal of Re on $Al_2O_3$ powder was then further impregnated with 6.85 g of Pt amine hydroxide solution (Pt metal in solution was 18.3%). 5 g of acetic acid was added and mixed for a half hour. A slurry was made by adding water to make 28% solid. The slurry was ballmilled for 2 hours and coated onto 1.5" diameter x 1.0" length 400 cpsi ceramic substrate to give a catalyst washcoat loading of 0.51 g/in$^3$ after drying. The catalyst coated substrate was dried at 100° C. and calcined at 550° C. for 2 hours. The catalyst was tested in the calcined form using 60 ppm $C_3H_6$ and dry air in the temperature range of 60 to 100° C.

Example 21

The catalyst of Examples 18, 19 and 20 were tested in a microreactor. The size of the catalyst samples was 0.5" diameter and 0.4" length. The feed was composed of 60 ppm $C_3H_6$ in dry air in the temperature range of 25 to 100° C. The $C_3H_6$ was measured at 60, 70, 80, 90 and 100° C. at steady sate condition. Results are summarized in Table VII.

TABLE VII

SUMMARY RESULTS OF C3H6 CONVERSION

| | Catalyst Name | | | |
|---|---|---|---|---|
| % C3H6 Conversion @ | Pt/Al$_2$O$_3$ Calcined (Ex. 18) | Pt/Al$_2$O$_3$ Calcined and reduced (Ex. 18) | Pt/ 10% W/ Al$_2$O$_3$ Calcined (Ex. 19) | Pt/10% Re/ Al$_2$O$_3$ Calcined (Ex. 20) |
| 60° C. | 0 | 10 | 9 | 11 |
| 70° C. | 7 | 22 | 17 | 27 |
| 80° C. | 20 | 50 | 39 | 45 |
| 90° C. | 38 | 70 | 65 | 64 |
| 100° C. | 60 | 83 | 82 | 83 |

It is clear from the Table that addition of W or Re oxide has enhanced the activity of the Pt/Al$_2$O$_3$ in the calcined form. The $C_3H_6$ conversion of the calcined Pt/Al$_2$O$_3$ was enhanced significantly when catalyst was reduced at 400° C. for 1 hour. The enhanced activity was also observed for the calcined catalyst by incorporation of W or Re oxides.

Example 22

This is an example of preparing high surface area cryptomelane using $MnSO_4$.
Molar ratios: $KMnO_4$: $MnSO_4$: acetic acid were 1:1.43: 5.72
Molarities of Mn in solutions prior to mixing were:
0.44 M $KmnO_4$
0.50 M $MnSO_4$
FW $KMnO_4$=158.04 g/mol
FW $MnSO_4.H_2O$=169.01 g/mol
FW $C_2H_4O_2$=60.0 g/mol
The following steps were conducted:
1. Made a solution of 3.50 moles (553 grams) of $KMnO_4$ in 8.05 L of D.I. water and heated to 68° C.
2. Made 10.5 L of 2N acetic acid by using 1260 grams of glacial acetic acid and diluting to 10.5 L with D.I. water. Density of this solution is 1.01 g/mL.
3. Weighed out 5.00 moles (846 grams) of manganous sulfate hydrate ($MnSO_4.H_2O$) and dissolved in 10,115 g of the above 2N acetic acid solution and heated to 40° C.
4. Added the solution from 3. to the solution from 1. over 15 minutes while continuously stirring. After addition was complete, began heating the slurry according to the following heat-up rate:

| | |
|---|---|
| 1:06 pm | 69.4° C. |
| 1:07 pm | 71.2° C. |
| 1:11 pm | 74.5° C. |
| 1:15 pm | 77.3° C. |
| 1:18 pm | 80.2° C. |
| 1:23 pm | 83.9° C. |
| 1:25 pm | 86.7° C. |
| 1:28 pm | 88.9° C. |

5. At 1:28 pm approximately 100 mL of slurry was removed from the vessel and promptly filtered on a BUchner funnel, washed with 2 L of D.I. water, and then dried in an oven at 100° C. The sample was determined to have a BET Multi-Point surface area of 259 m$^2$/g.

Example 23

This is an example of preparing high surface area cryptomelane using $Mn(CH_3COO)_2$.
Molar ratios: $KMnO_4$: $Mn(CH_3CO_2)_2$: acetic acid were 1:1.43:5.72
FW $KMnO_4$=158.04 g/mol Aldrich Lot #08824MG
FW $Mn(CH_3CO_2)_2.H_2O$=245.09 g/mol Aldrich Lot #08722HG
FW $C_2H_4O_2$=60.0 g/mol
1. Made a solution of 2.0 moles (316 grams) of $KMnO_4$ in 4.6 L of D.I. water and heated to 60° C. by heating on hot plates.
2. Made up 6.0 of 2N acetic acid by using 720 grams of glacial acetic acid and diluting to 6.0 L with D.I. water. Density of this solution is 1.01 g/mL.
3. Weighed out 2.86 moles (700 grams) of manganese (II) acetate tetrahydrate [$Mn(CH_3CO_2)_2.4H2O$] and dissolved in 5780 g of the above 2N acetic acid solution (in the reactor vessel). Heated to 60° C. in the reactor vessel.
4. Added the solution from 1. to the solution from 3. while maintaining the slurry at 62–63° C. After complete addition, gently heated the slurry according to the following:

82.0° C. at 3:58 pm
86.5° C. at 4:02 pm
87.0° C. at 4:06 pm
87.1° C. at 4:08 pm
shut off heat
then quenched the slurry by pumping 10 L of D.I. water into the vessel. This cooled the slurry to 58° C. at 4:13 pm. The slurry was filtered on Büchner funnels. The resulting filter cakes were reslurried in 12 L of D.I. water then stirred overnight in a 5 gallon bucket using a mechanical stirrer. The washed product was refiltered in the morning then dried in an oven at 100° C. The sample was determined to have a BET Multi-Point surface area of 296 m$^2$/g. The resulting cryptomelane is characterized by the XRD pattern of FIG. 20. It is expected to have an IR spectrum similar to that shown in FIG. 19.

Example 24

Following is a description of the ozone testing method for determining percent ozone decomposition used in this Example. A test apparatus comprising an ozone generator, gas flow control equipment, water bubbler, chilled mirror dew point hygrometer, and ozone detector was used to measure the percent ozone destroyed by catalyst samples. Ozone was generated in situ utilizing the ozone generator in a flowing gas stream comprised of air and water vapor. The ozone concentration was measured using the ozone detector and the water content was determined utilizing the dew point hygrometer. Samples were tested as 25° C. using inlet ozone concentrations of 4.5 to 7 parts per million (ppm) in a gas stream flowing at approximately 1.5 L/minute with a dew point between 15° C. and 17° C. Samples were tested as particles sized to −25/+45 mesh held between glass wool plugs in a ¼" I.D. Pyrex® glass tube. Tested samples filled a 1 cm portion of the glass tube.

Sample testing generally required between 2 to 16 hours to achieve a steady state of conversion. Samples typically gave close to 100% conversion when testing began and slowly decreased to a "leveled off" conversation that remained steady for extended periods of time (48 hours). After a steady state was obtained, conversions were calculated from the equation: % ozone conversion=[(1-(ozone concentration after passing over catalyst)/(ozone concentration before passing over catalyst)]*100.

Ozone destruction testing on the sample of Example 22 showed 58% conversion.

Ozone destruction testing on the sample of Example 23 showed 85% conversion.

Example 25

This example is intended to illustrate that the method of Example 23 generated "clean" high surface area cryptomelane for which the ozone destruction performance was not further enhanced by calcination and washing. A 20 gram portion of the sample represented by Example 23 was calcined in air at 200° C. for 1 hour, cooled to room temperature, then washed at 100° C. in 200 mL of D.I. water by stirring the slurry for 30 minutes. The resulting product was filtered and dried at 100° C. in an oven. The sample was determined to have BET Multi-Point surface area of 265 m$^2$/g. Ozone destruction testing on the sample showed 85% conversion. A comparison to the testing of the sample of Example 23 demonstrated that no benefit in ozone conversion was realized from the washing and calcination of the sample of Example 23.

Example 26

Samples of high surface area cryptomelane were obtained from commercial suppliers and modified by calcination and/or washing. As received and modified powders were tested for ozone decomposition performance according to the method of Example 24 and characterized by powder X-ray diffraction, infrared spectroscopy, and BET surface area measurements by nitrogen adsorption.

Example 26a

A commercially supplied sample of high surface area cryptomelane (Chemetals, Inc., Baltimore, Md.) was washed for 30 minutes in D.I. water at 60° C., filtered, rinsed, and oven-dried at 100° C. Ozone conversion of the as received sample was 64% compared to 79% for the washed material. Washing did not change the surface area or crystal structure of this material (223 m$^2$/g cryptomelane) as determined by nitrogen adsorption and powder X-ray diffraction measurements, respectively. However, infrared spectroscopy showed the disappearance of peaks at 1220 and 1320 wavenumbers in the spectrum of the washed sample indicating the removal of sulfate group anions.

Example 26b

Commercially supplied samples of high surface area cryptomelane (Chemetals, Inc., Baltimore, Md.) were calcined at 300° C. for 4 hours and 400° C. for 8 hours. Ozone conversion of the as received material was 44% compared to 71% for the 300° C. calcined sample and 75% for the 400° C. calcined sample. Calcination did not significantly change the surface area or crystal structure of the 300° C. or 400° C. samples (334 m$^2$/g cryptomelane). A trace of $Mn_2O_3$ was detected in the 400° C. sample. Calcination causes dehydroxylation of these samples. Infrared spectroscopy show a decrease in the intensity of the band between 2700 and 3700 wavenumbers assigned to surface hydroxyl groups.

Example 27

The addition Pd black (containing Pd metal and oxide) to high surface area cryptomelane is found to significantly enhance ozone decomposition performance. Samples were prepared comprising Pd black powder physically mixed with powders of (1) a commercially obtained cryptomelane (the 300° C. calcined sample described in Example 26b) and (2) the high surface area cryptomelane synthesized in Example 23 calcined at 200° C. for 1 hour. The samples were prepared by mixing, in a dry state, powder of Pd black and cryptomelane in a 1:4 proportion by weight. The dry mixture was shaken until homogeneous in color. An amount of D.I. water was added to the mixture in a beaker to yield 20–30% solids content, thus forming a suspension. Aggregates in the suspension were broken up mechanically with a stirring rod. The suspension was sonicated in a Bransonic® Model 5210 ultrasonic cleaner for 10 minutes and then oven dried at 120–140° C. for approximately 8 hours.

The ozone conversion for the commercially obtained cryptomelane calcined at 300° C. was 71% as measured on the powder reactor (Example 26b). A sample of this product was mixed with 20 weight percent Pd black yielded 88% conversion.

The cryptomelane sample prepared as in Example 23 calcined at 200° C. had 85% conversion. Performance improved to 97% with 20 weight percent Pd black added.

Example 28

1500 g of high surface area manganese dioxide (cryptomelane purchased from Chemetals) and 2250 g of deionized water were combined in a one gallon ball mill and milled for 1.5 hours to a particle size 90%≦7 μm. After draining the resulting slurry from the mill into a separate 1 gallon container, sufficient KOH (20% solution in DI water) was added to raise the pH to ca. 9.5. Additional KOH was added over the next several days to maintain a pH of 9.5. Subsequently, 294 g (10% solids basis) of National Starch x-4280 acrylic latex polymer (51% solids) was added. Thorough blending of the binder was achieved by rolling the container containing the slurry on a two roll mill. The container contained no milling media such as ceramic milling balls. Slurry made according to this process was coated onto a variety of substrates and exhibited excellent adhesion. Such substates included a porous monolithic support (eg. ceramic honeycomb) onto which the coating was applied by dipping the honeycomb into the slurry. The slurry was also spray coated onto an aluminum radiator. It was also dip coated on to small radiator minicores of the type recited above. Additionally, polyfiber filter media of the type used to filter air was coated by dipping or spraying. Typically, the samples were coated with loadings which could vary from 0.15 to 1.5 grams per cubic inch. The samples were air dried at 30° C. until dry, typically for at least two hours. Excellent catalyst adhesion was attained in each case (i.e. coating could not be wiped off). Higher temperatures of drying (up to 150° C.) can be utilized if desired. The latex cures during drying.

Example 29

To 96.56 g of the ball milled catalyst slurry obtained in Example 28 (before KOH addition) was added 3.20 g (3% solids basis) of Rhone-Poulenc Colloid 226 polymeric dispersant. After rolling the mixture on a roll mill for several hours, 7.31 g (10% solids basis) of National Starch x-4280 acrylic latex polymer (51% solids) was added. As in Example 28, thorough blending of the binder was achieved by rolling the container containing the slurry on a two roll mill. The container contained no milling media such as ceramic milling balls. Slurry made according to this process was coated onto a variety of substrates and exhibited excellent adhesion. Such substates included a porous monolithic support (eg. ceramic honeycomb) onto which the coating was applied by dipping the honeycomb into the slurry. The slurry was also dip coated on to small radiator minicores of the type recited above. Typically, the samples were coated with loadings which could vary from 0.15 to 1.5 grams per cubic inch. The samples were air dried at 30° C. until dry, typically for at least two hours. Excellent catalyst adhesion was attained in each case (i.e. coating could not be wiped off). Higher temperatures of drying (up to 150° C.) can be utilized if desired. The latex cures during drying.

Example 30

Figure 21:
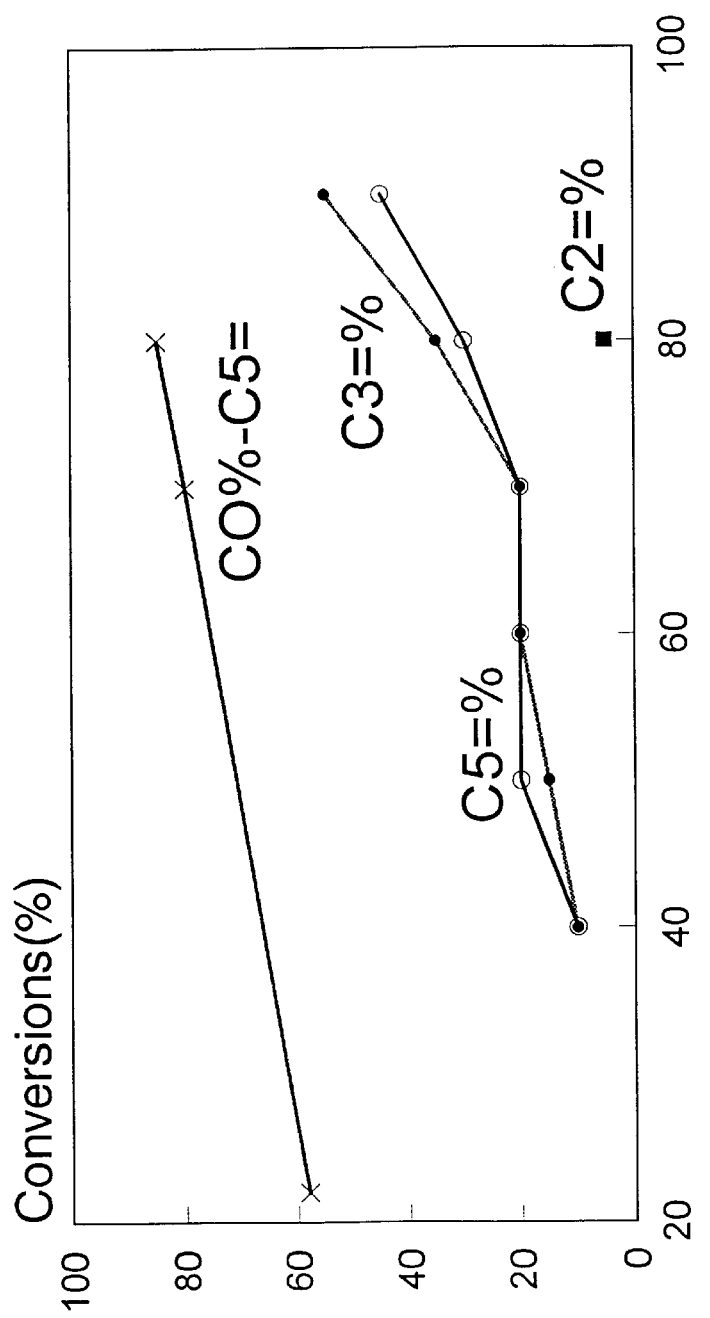
FIG. 21 is a graph of CO and hydrocarbon conversion versus temperature based on Example 30.

8.9 grams of D.I. water was added to 1.1 grams of TiO2 nano powder in a beaker. An ammonia/water concentrate was added to adjust the pH to 9.5. A solution of amine solubilized platinum hydroxide having 17.75 weight percent platinum (based on metallic platinum) was slowly added, with mixing to obtain 5% by weight of platinum on titania. Then a solution of palladium nitrate containing 20% by weight based on palladium metal was added, with mixing to obtain 14.3% palladium on the titania. A one-inch diameter by one-inch long 400 cells per square inch (cpsi) metal monolith cored sample was dipped into the slurry. Air was blown over the coated monolith to clear the channels and the monolith was dried for three hours at 110° C. At this time, the monolith was redipped into the slurry once again and the steps of air blowing the channels and drying at 110° C. was repeated. The twice coated monolith was calcined at 300° C. for two hours. After this initial evaluation the catalyst core was reduced in a forming gas having 7% hydrogen and 93% nitrogen at 300° C. for 12 hours. The catalyst was evaluated in an air stream containing 20 ppm carbon monoxide and 20 ppm of hydrocarbons based on $C_1$. The hydrocarbons were evaluated in the presence of the 20 ppm CO. The hydrocarbons evaluated were ethylene $C_2=$; propylene $C_3=$; and pentene $C_5=$ at a gas flow rate of 36.6 liters per minute which corresponds to 300,000 standard hourly space velocity (SHSV). The air stream was at 30% relative humidity (RH). Results are illustrated in FIG. 21.

What is claimed is:

1. A method of applying a mixture to a substrate comprising the steps of:
    forming a mixture comprising water and a particulate catalytically-active material, the catalytically-active material comprising a manganese component having a BET $N_2$ surface area of greater than 150 m²/g, and wherein approximately 90% of the particles are less than 8 micrometers;
    adding to the mixture a dispersant comprising a compound selected from the group consisting of a polymer containing carboxylic acid groups, an ester of the polymer and a salt of the polymer;
    adding to the mixture a polymeric binder selected from the group consisting of an acrylic polymer and a poly(vinyl) acetate; and
    after adding the dispersant and polymeric binder, applying the mixture to a motor vehicle contacting surface.

2. The method of claim 1, wherein the slurry is applied by spray coating, brushing, or dipping.

3. The method of claim 2, wherein the slurry is applied by spray coating.

4. The method as recited in claim 1 wherein the atmosphere contacting surface is selected from the group consisting of the outer surface of an air conditioner condenser, a radiator, a radiator fan, an air charge cooler, a wind deflector, engine oil cooler, a transmission oil cooler and a power steering fluid cooler.

5. The method of as recited in claim 1 further comprising adjusting the pH of the mixture to at least 8.5.

6. A method of forming a slurry comprising the steps of:
    forming a mixture comprising water and a particulate catalytically-active material, the catalytically-active material comprising a manganese component having a BET $N_2$ surface area of greater than 150 m²/g, and wherein approximately 90% of the particles are less than 8 micrometers;
    adding to the mixture a dispersant comprising a compound selected from the group consisting of a polymer containing carboxylic acid groups, an ester of the polymer and a salt of the polymer; and
    adding to the mixture a polymeric binder selected from the group consisting of an acrylic polymer and a poly(vinyl) acetate.

7. The method of claim 6, wherein the dispersant is a dicarboxylic acid ester or salt derivative.

8. The method of claim 7, wherein the dispersant is a maleic acid/isobutylene copolymer.

9. The method of claim 8, wherein the dispersant is a salt of a maleic acid/isobutylene copolymer.

10. The method of claim 9, wherein the dispersant is a sodium salt of a maleic acid/isobutylene copolymer.

11. The method of claim 6, wherein the dispersant is a polymeric acrylate.

12. The method of claim 11, wherein the dispersant is a salt of a polymeric acrylate.

13. The method of claim 12, wherein the dispersant is a sodium salt of a polyacrylate/methacrylate copolymer.

14. The method of as recited in claim 6 further comprising adjusting the pH of the mixture to at least 8.5.

15. The method of claims 14, 6, 11, 12, 13, 7, 8, 9, or 10, wherein the binder is an acrylic latex binder or an ethylene vinyl acetate binder.

16. The method as recited in claims 14, 6 or 1 wherein the catalytically active material further comprises a platinum group metal component.

17. The method as recited in claim 16 further comprising the step of calcining the catalytically active material prior to adding the polymeric binder.

18. The method as recited in claim 16 further comprising the step of reducing the catalytically active material.

19. The method as recited in claims 14, 6, or 1 wherein the manganese component is $MnO_2$.

20. The method as recited in claim 48 wherein the $MnO_2$ is $\alpha\text{-}MnO_2$.

21. The method as recited in claim 20 wherein the $\alpha\text{-}MnO_2$ is selected from the group consisting of hollandite, cryptomelane, manjiroite and coronadite.

22. The method as recited in claim 21 wherein the $\alpha\text{-}MnO_2$ is cryptomelane having a surface area of about from 200 to 350 $m^2/g$.

23. The method as recited in claim 20 wherein the $\alpha\text{-}MnO_2$ comprises up to 2% by weight of silica.

24. The method of claims 14, 6 or 1 wherein the mixture further comprises thickeners, biocides, and antioxidants.

25. A composition made by the method of claims 14, 6, 11, 12, 13, 7, 8, 9, or 10.

26. The composition of claim 25, wherein the binder is an acrylic latex binder or an ethylene vinyl acetate binder.

27. The composition of claim 26 further comprising at least one additive selected from the group consisting of a thickener, a biocide, and an antioxidant.

28. A catalytic slurry for adhering to a substrate comprising:

a particulate catalytically-active material comprising a manganese component having a BET $N_2$ surface area of greater than 150 $m^2/g$, and wherein approximately 90% of the particles are less than 8 micrometers;

a dispersant comprising a compound selected from the group consisting of a polymer containing carboxylic acid groups, an ester of the polymer and a salt of the polymer;

a polymeric binder selected from the group consisting of an acrylic polymer and a poly(vinyl) acetate; and water.

\* \* \* \* \*